(12) United States Patent
Nagahama et al.

(10) Patent No.: US 12,300,833 B2
(45) Date of Patent: May 13, 2025

(54) BATTERY PACK

(71) Applicant: MAKITA CORPORATION, Anjo (JP)

(72) Inventors: Tatsuya Nagahama, Anjo (JP); Kazuya Tanaka, Anjo (JP)

(73) Assignee: MAKITA CORPORATION, Anjo (JP)

(*) Notice: Subject to any disclaimer, the term of this patent is extended or adjusted under 35 U.S.C. 154(b) by 745 days.

(21) Appl. No.: 17/036,356

(22) Filed: Sep. 29, 2020

(65) Prior Publication Data
US 2021/0098755 A1 Apr. 1, 2021

(30) Foreign Application Priority Data

Sep. 30, 2019 (JP) ................ 2019-180792
Sep. 30, 2019 (JP) ................ 2019-180793
Sep. 30, 2019 (JP) ................ 2019-180795

(51) Int. Cl.
*H01M 10/42* (2006.01)
*H01M 50/10* (2021.01)
*H01M 50/213* (2021.01)
*H01M 50/30* (2021.01)
(Continued)

(52) U.S. Cl.
CPC ....... *H01M 50/213* (2021.01); *H01M 10/425* (2013.01); *H01M 50/10* (2021.01); *H01M 50/394* (2021.01); *H01M 50/543* (2021.01); *H01M 50/572* (2021.01); *H01M 2220/30* (2013.01)

(58) Field of Classification Search
CPC ............. H01M 50/204; H01M 50/213; H01M 50/233; H01M 50/247; H01M 50/262; H01M 50/284; H01M 10/425
See application file for complete search history.

(56) References Cited

U.S. PATENT DOCUMENTS 5,558,949 A 9/1996 Iwatsuki et al.
5,661,392 A 8/1997 Imazeki
(Continued)

FOREIGN PATENT DOCUMENTS

CN 102306721 A 1/2012
CN 202924141 U 5/2013
(Continued)

OTHER PUBLICATIONS

Unpublished U.S. Appl. No. 17/036,411.
(Continued)

*Primary Examiner* — Brian R Ohara
*Assistant Examiner* — Brent C Thomas
(74) *Attorney, Agent, or Firm* — J-TEK LAW PLLC; Jeffrey D. Tekanic; Scott T. Wakeman

(57) ABSTRACT

A battery pack (2; 402; 602) includes an outer case (12; 412; 612), which comprises an upper-part case (14; 414) and a lower-part case (15; 415) fixed to the upper-part case (14; 414), and a cell case (80; 480; 780; 980), which is housed in the outer case (12; 412; 612). An engaging part (30) is provided on one of the upper-part case (14; 414) and the cell case (80; 480; 780; 980). An engaged part (110), with which the engaging part (30) engages, is provided on or in the other of the upper-part case (14; 414) and the cell case (80; 480; 780; 980).

27 Claims, 44 Drawing Sheets

(51) Int. Cl.
H01M 50/543 (2021.01)
H01M 50/572 (2021.01)

(56) References Cited

U.S. PATENT DOCUMENTS

| | | | |
|---|---|---|---|
| 6,227,322 B1 * | 5/2001 | Nishikawa | B60R 16/04 |
| | | | 180/68.5 |
| 6,350,149 B1 | 2/2002 | Nakane | |
| 6,627,345 B1 | 9/2003 | Zemlok et al. | |
| 8,684,106 B2 | 4/2014 | Hanawa et al. | |
| 9,318,729 B2 | 4/2016 | Ogura | |
| 9,601,729 B2 | 3/2017 | Naito | |
| 9,847,562 B2 | 12/2017 | Kondo | |
| 10,348,110 B2 | 7/2019 | Kondo et al. | |
| 2004/0081885 A1 | 4/2004 | Ziegler et al. | |
| 2005/0287426 A1 | 12/2005 | Kim et al. | |
| 2006/0091858 A1 | 5/2006 | Johnson et al. | |
| 2006/0110656 A1 | 5/2006 | Moores et al. | |
| 2008/0061738 A1 | 3/2008 | Hanawa et al. | |
| 2008/0084181 A1 | 4/2008 | Griffin | |
| 2008/0102355 A1 | 5/2008 | Moores et al. | |
| 2008/0286642 A1 | 11/2008 | Naito et al. | |
| 2009/0229957 A1 | 9/2009 | Nishimiya et al. | |
| 2009/0246615 A1 | 10/2009 | Park | |
| 2010/0092850 A1 | 4/2010 | Ueda et al. | |
| 2010/0112435 A1 | 5/2010 | Hanawa et al. | |
| 2010/0129701 A1 | 5/2010 | Murayama et al. | |
| 2010/0156350 A1 | 6/2010 | Murayama et al. | |
| 2010/0248016 A1 | 9/2010 | Hanawa et al. | |
| 2011/0005793 A1 | 1/2011 | Hanawa et al. | |
| 2011/0025269 A1 | 2/2011 | Funabashi et al. | |
| 2011/0250476 A1 | 10/2011 | Taga | |
| 2011/0250780 A1 | 10/2011 | Fukumoto et al. | |
| 2011/0253402 A1 | 10/2011 | Aradachi et al. | |
| 2011/0293998 A1 | 12/2011 | Sato et al. | |
| 2012/0045667 A1 | 2/2012 | Yoneda et al. | |
| 2012/0045671 A1 | 2/2012 | Miller et al. | |
| 2012/0100400 A1 | 4/2012 | Kang et al. | |
| 2012/0127676 A1 | 5/2012 | Warmuth et al. | |
| 2013/0143452 A1 | 6/2013 | Yoshikawa | |
| 2013/0196204 A1 * | 8/2013 | Song | H01M 50/507 |
| | | | 429/158 |
| 2013/0224539 A1 | 8/2013 | Hayashi et al. | |
| 2013/0230757 A1 | 9/2013 | Sakakibara | |
| 2014/0106195 A1 | 4/2014 | Milbourne et al. | |
| 2014/0248519 A1 | 9/2014 | Nishikawa et al. | |
| 2014/0302353 A1 | 10/2014 | Ogura | |
| 2014/0302376 A1 | 10/2014 | Naito | |
| 2014/0302377 A1 | 10/2014 | Naito | |
| 2015/0075831 A1 | 3/2015 | Hanawa et al. | |
| 2015/0249237 A1 | 9/2015 | Naito | |
| 2015/0325826 A1 | 11/2015 | Verhaag et al. | |
| 2016/0006005 A1 | 1/2016 | Sakakibara | |
| 2016/0240901 A1 | 8/2016 | Kondo | |
| 2016/0241065 A1 | 8/2016 | Kondo et al. | |
| 2016/0329532 A1 | 11/2016 | Nishimura et al. | |
| 2017/0187010 A1 | 6/2017 | Hayashi et al. | |
| 2018/0130980 A1 | 5/2018 | Ogura et al. | |
| 2018/0241017 A1 | 8/2018 | Nakamura et al. | |
| 2018/0262150 A1 | 9/2018 | White et al. | |
| 2019/0259984 A1 * | 8/2019 | Nishikawa | H01M 50/20 |
| 2019/0280501 A1 | 9/2019 | Kondo et al. | |
| 2020/0203682 A1 * | 6/2020 | Bannai | H01M 10/0525 |
| 2021/0098756 A1 | 4/2021 | Naito et al. | |
| 2021/0098757 A1 | 4/2021 | Nagahama | |

FOREIGN PATENT DOCUMENTS

| | | |
|---|---|---|
| CN | 104103783 A | 10/2014 |
| CN | 104600236 A | 5/2015 |
| CN | 205028937 U | 2/2016 |
| CN | 107068922 A | 8/2017 |
| CN | 207038655 U | 2/2018 |
| CN | 207416528 U | 5/2018 |
| EP | 1548859 A2 | 6/2005 |
| EP | 1548859 B1 | 6/2007 |
| EP | 2830122 B1 | 2/2016 |
| JP | H08115712 A | 5/1996 |
| JP | H11288744 A | 10/1999 |
| JP | 2000164182 A | 6/2000 |
| JP | 2001256940 A | 9/2001 |
| JP | 2003217537 A | 7/2003 |
| JP | 2005026190 A | 1/2005 |
| JP | 2005209369 A | 8/2005 |
| JP | 2007172981 A | 7/2007 |
| JP | 2010050044 A | 3/2010 |
| JP | 2010129188 A | 6/2010 |
| JP | 2011222171 A | 11/2011 |
| JP | 2011222459 A | 11/2011 |
| JP | 2013114782 A | 6/2013 |
| JP | 2013191288 A | 9/2013 |
| JP | 2014170635 A | 9/2014 |
| JP | 2014175193 A | 9/2014 |
| JP | 2014203660 A | 10/2014 |
| JP | 2014203661 A | 10/2014 |
| JP | 2014203703 A | 10/2014 |
| JP | 2016018604 A | 2/2016 |
| JP | 2016018605 A | 2/2016 |
| JP | 2016149841 A | 8/2016 |
| JP | 2016207517 A | 12/2016 |
| JP | 2017188300 A | 10/2017 |
| JP | 2018054000 A | 4/2018 |
| JP | 2018063913 A | 4/2018 |
| JP | 2018106796 A | 7/2018 |
| KR | 200484087 Y1 | 7/2017 |
| WO | 2006067919 A2 | 6/2006 |
| WO | 2013140951 A1 | 9/2013 |
| WO | 2017073201 A1 | 5/2017 |
| WO | 2017126285 A1 | 7/2017 |
| WO | 2017221536 A1 | 12/2017 |
| WO | 2019044069 A1 | 3/2019 |

OTHER PUBLICATIONS

Unpublished U.S. Appl. No. 17/036,435.
Extended European Search Report from the European Patent Office dated Feb. 23, 2021 in related application No. EP 20198597, including European Search Opinion and examined claims 1-15.
Extended European Search Report from the European Patent Office dated Feb. 24, 2021 in related application No. EP 20 198 595, including European Search Opinion and examined claims 1-15.
Office Action from the United States Patent Office mailed Jan. 24, 2022 in U.S. Appl. No. 17/036,435.
Office Action from the United States Patent Office mailed Dec. 23, 2021 in related U.S. Appl. No. 17/036,411, including examined claims 1-19.
Office Action from the Japanese Patent Office dispatched Apr. 19, 2023 in counterpart Japanese application No. JP2019-180793, and machine translation thereof.
Office Action from the Japanese Patent Office dispatched Apr. 4, 2023 in counterpart Japanese application No. JP2019-180792, and machine translation thereof.
Office Action from the Japanese Patent Office dispatched Apr. 4, 2023 in counterpart Japanese application No. JP2019-180795, and machine translation thereof.
Search Report from the Japanese Patent Office dated Mar. 22, 2023 in counterpart Japanese application No. 2019-180793, and machine translation thereof.
Search Report from the Japanese Patent Office dated Mar. 29, 2023 in counterpart Japanese application No. 2019-180792, and machine translation thereof.
Search Report from the Japanese Patent Office dated Mar. 29, 2023 in counterpart Japanese application No. 2019-180795, and machine translation thereof.
Office Action mailed Dec. 15, 2023, in related U.S. Appl. No. 17/036,435.
Office Action and Search Report from the Chinese Patent Office dispatched Nov. 16, 2023 in counterpart application No. 202010862538.9, and machine translation thereof.

(56) References Cited

OTHER PUBLICATIONS

Office Action and Search Report from the Chinese Patent Office dispatched Nov. 20, 2023 in counterpart application No. 202010863135.6, and machine translation thereof.
Office Action from the Chinese Patent Office dispatched Mar. 19, 2024 in counterpart application No. 202010862538.9, and translation thereof.
Office Action from the Chinese Patent Office dispatched Mar. 21, 2024 in counterpart application No. 202010863135.6, and translation thereof.
Communication from the European Patent Office dated Jan. 9, 2025, in counterpart EP application No. 20 198 597.5, including grounds for rejection and examined claims 1-13.
Office Action from the Japanese Patent Office dispatched Jan. 21, 2025, in counterpart Japanese application No. 2023-188373, and translation thereof.

* cited by examiner

FIG. 1A
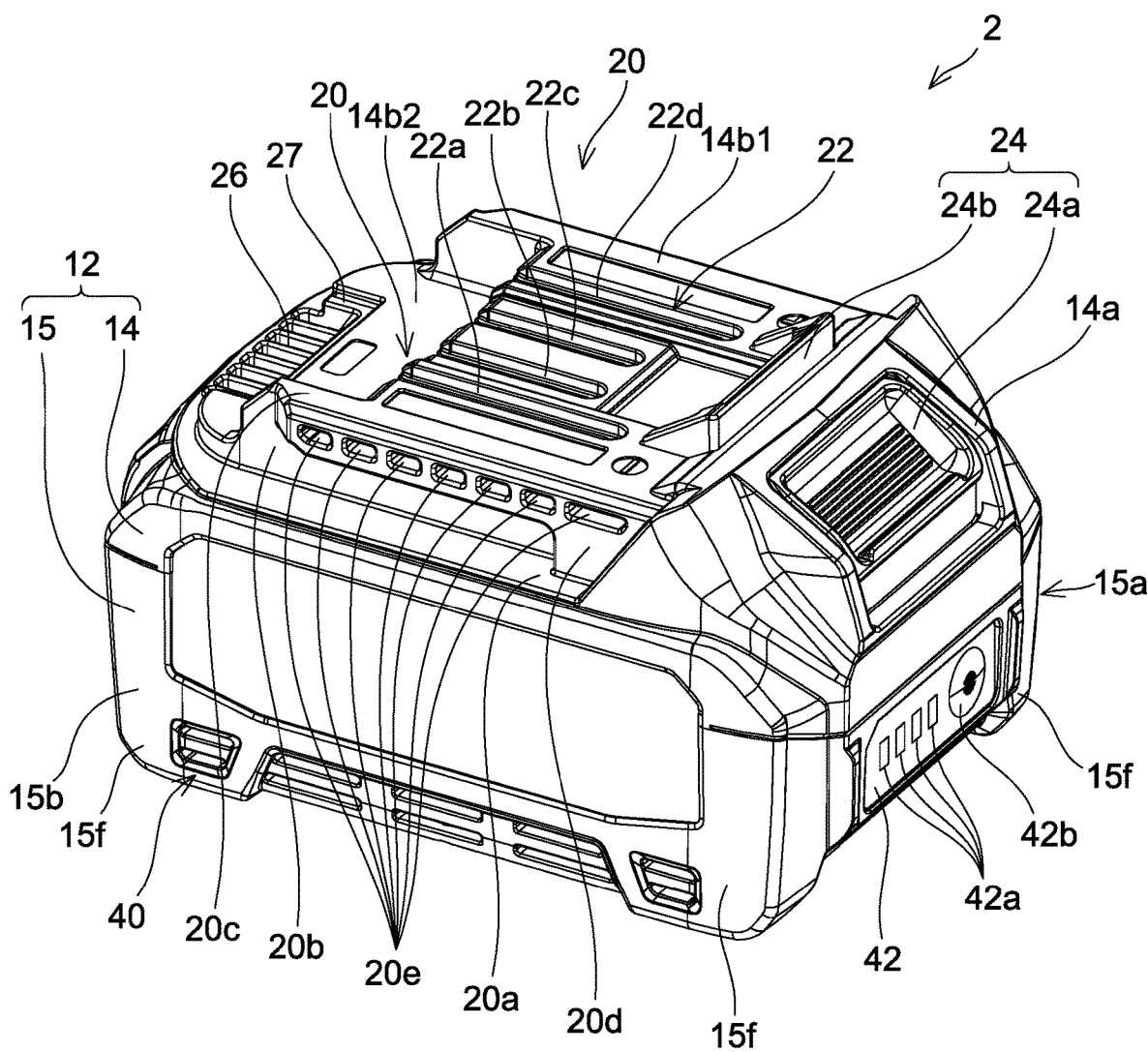
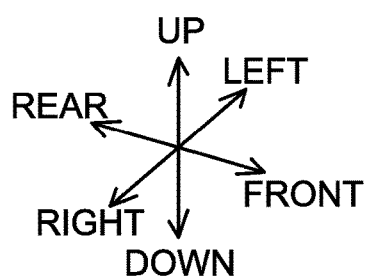

FIG. 1C
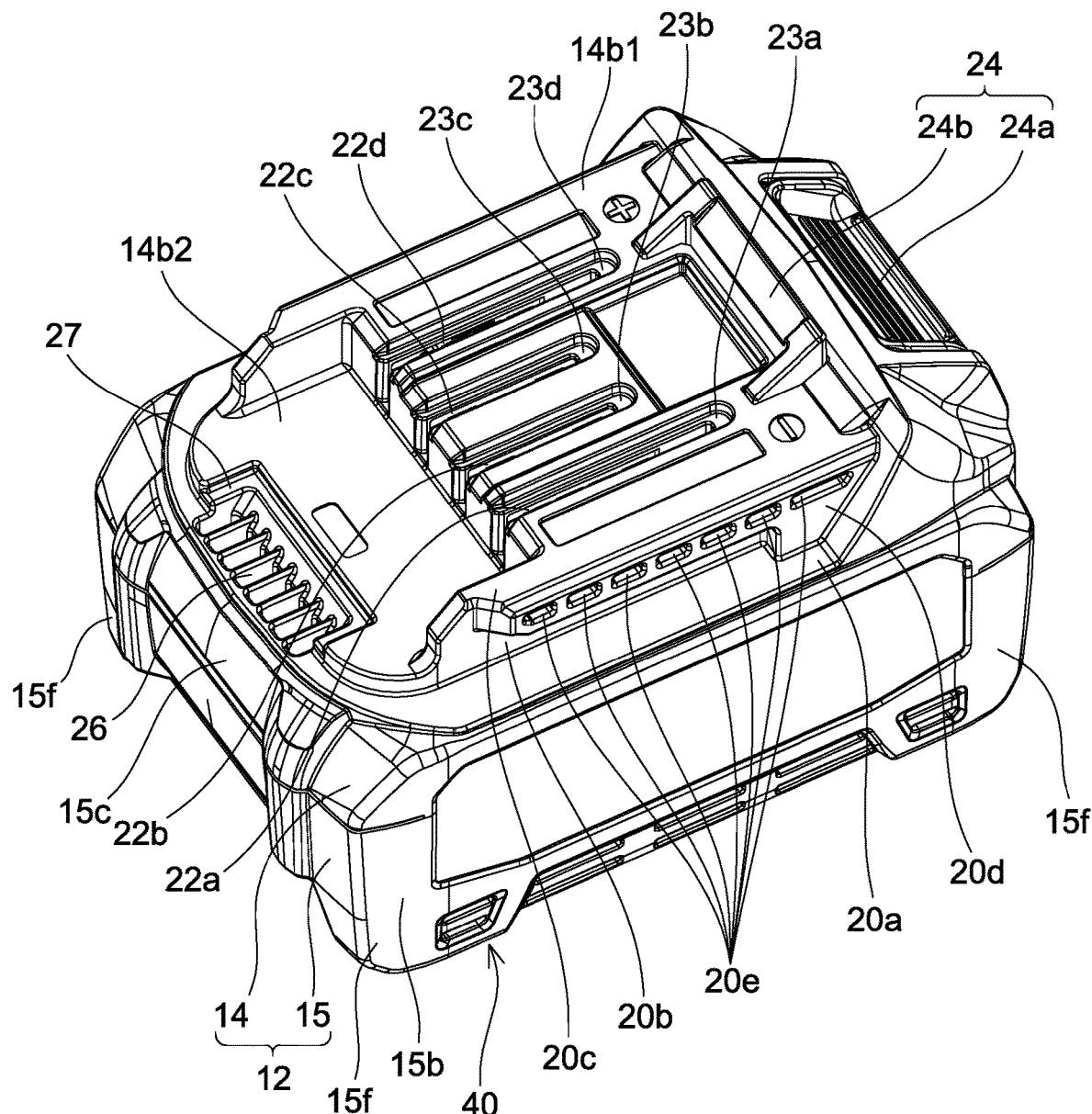
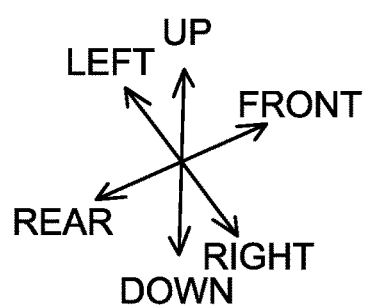

FIG. 3
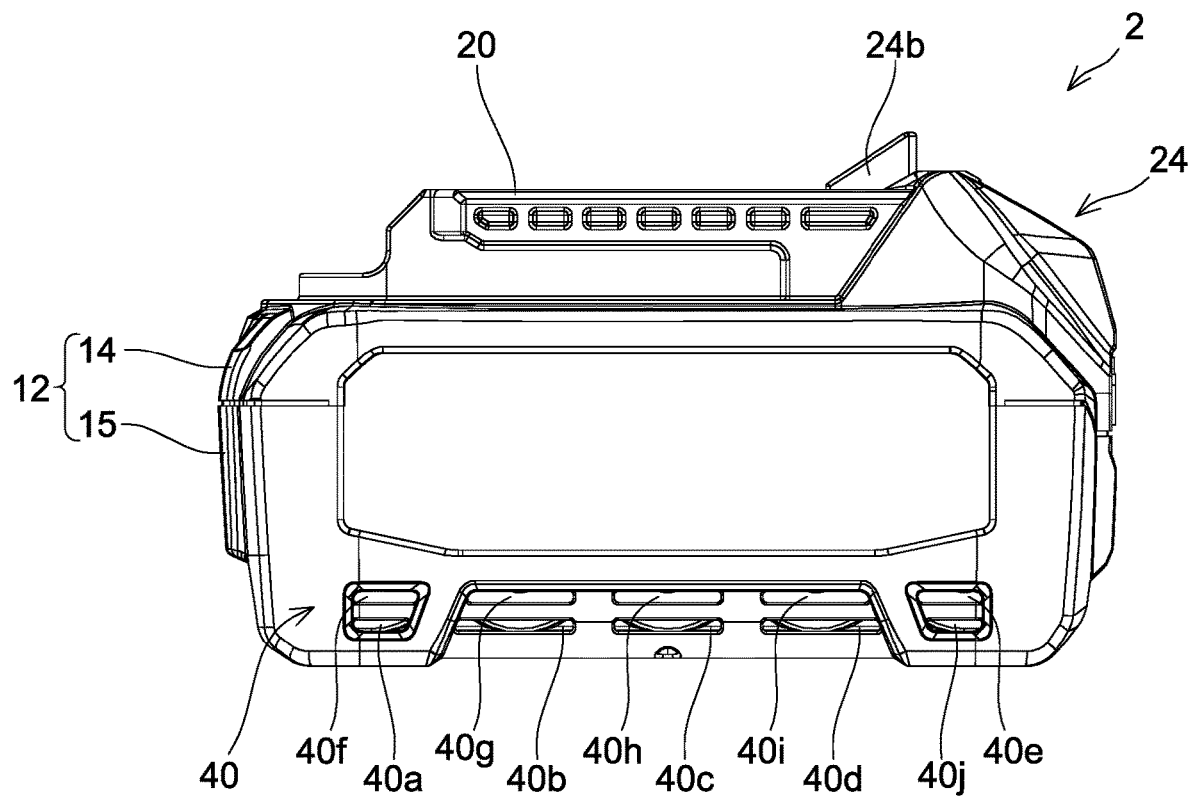
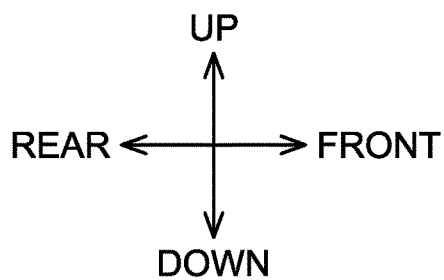

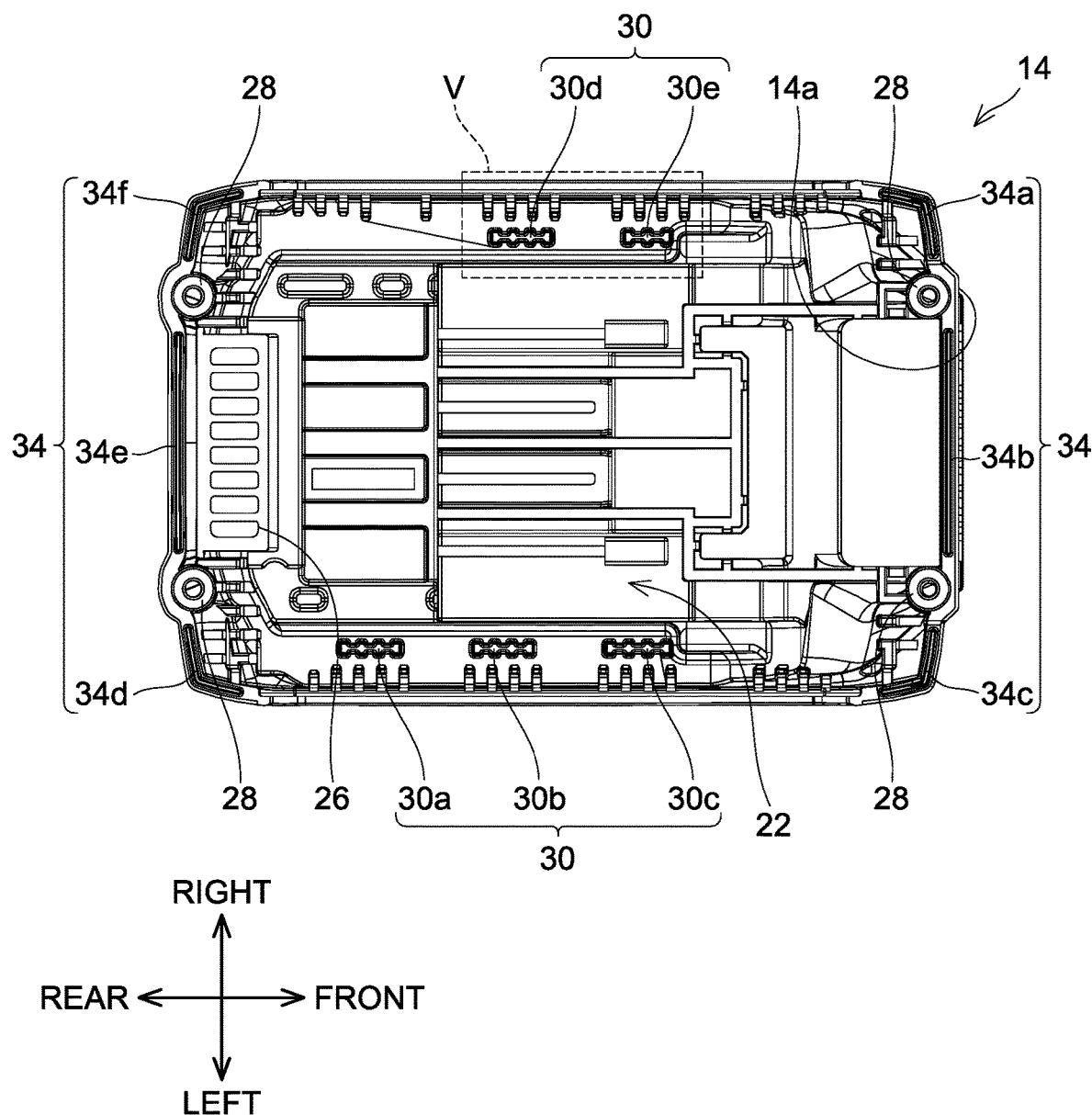

FIG. 4C
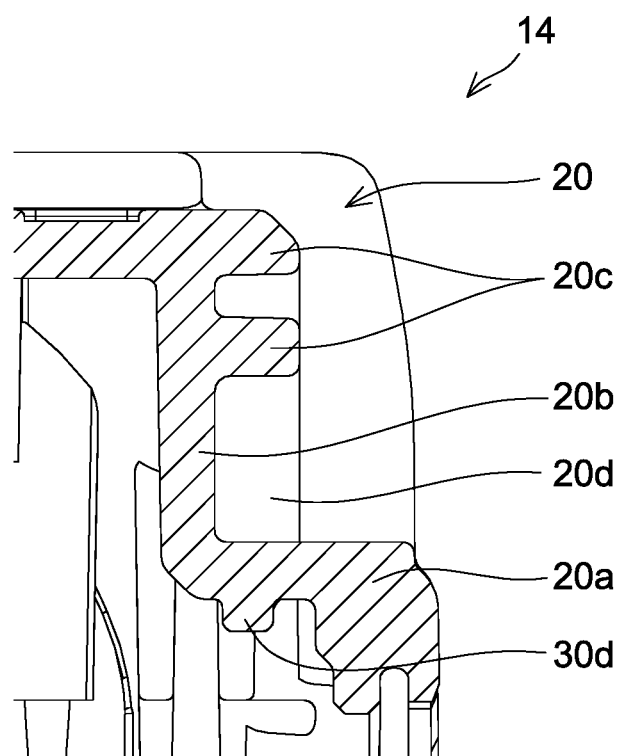
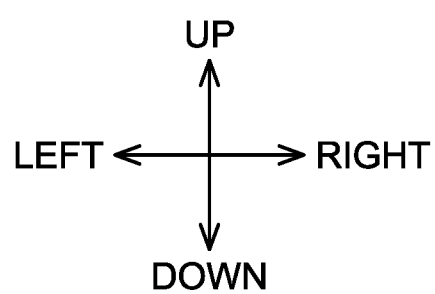

FIG. 11C
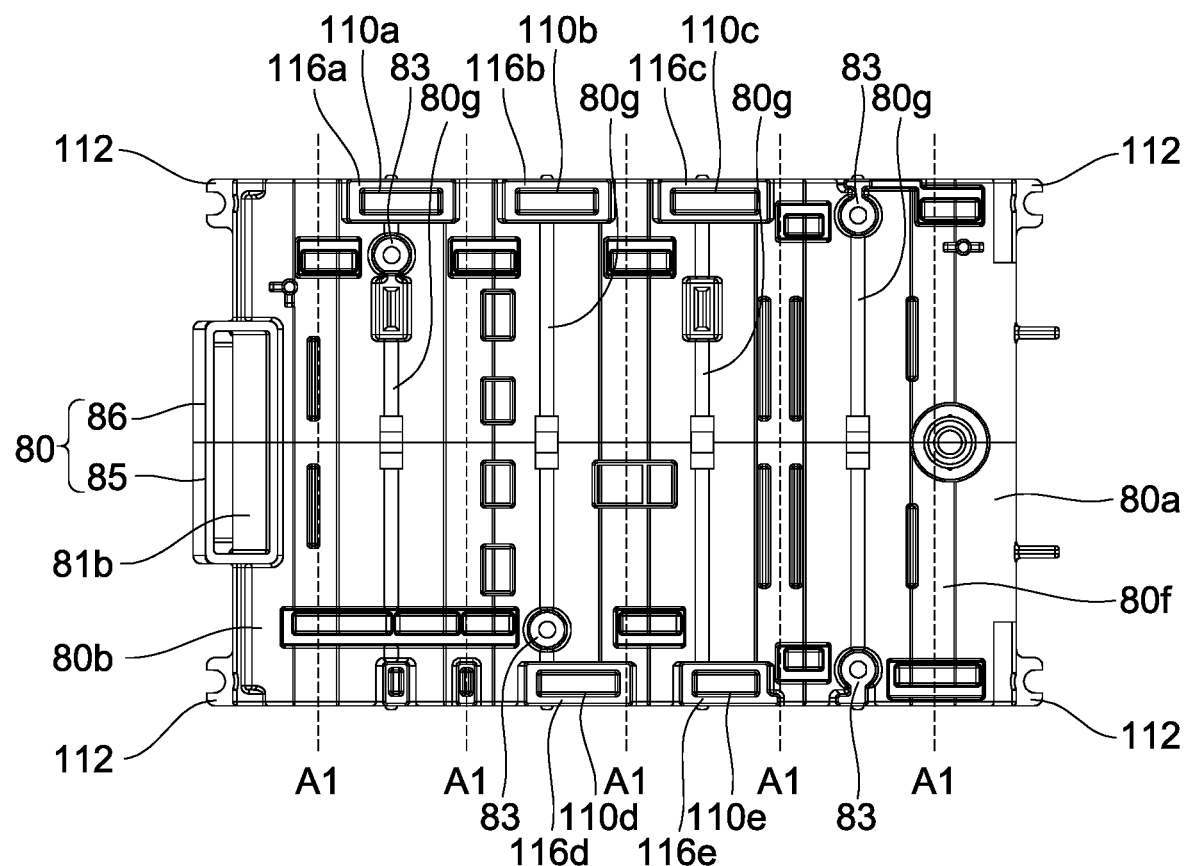
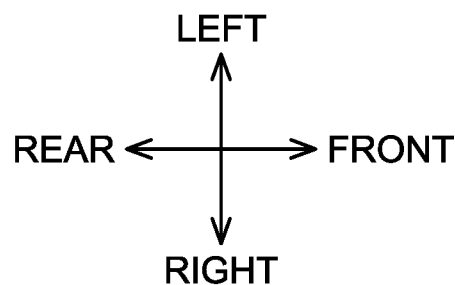

FIG. 12B
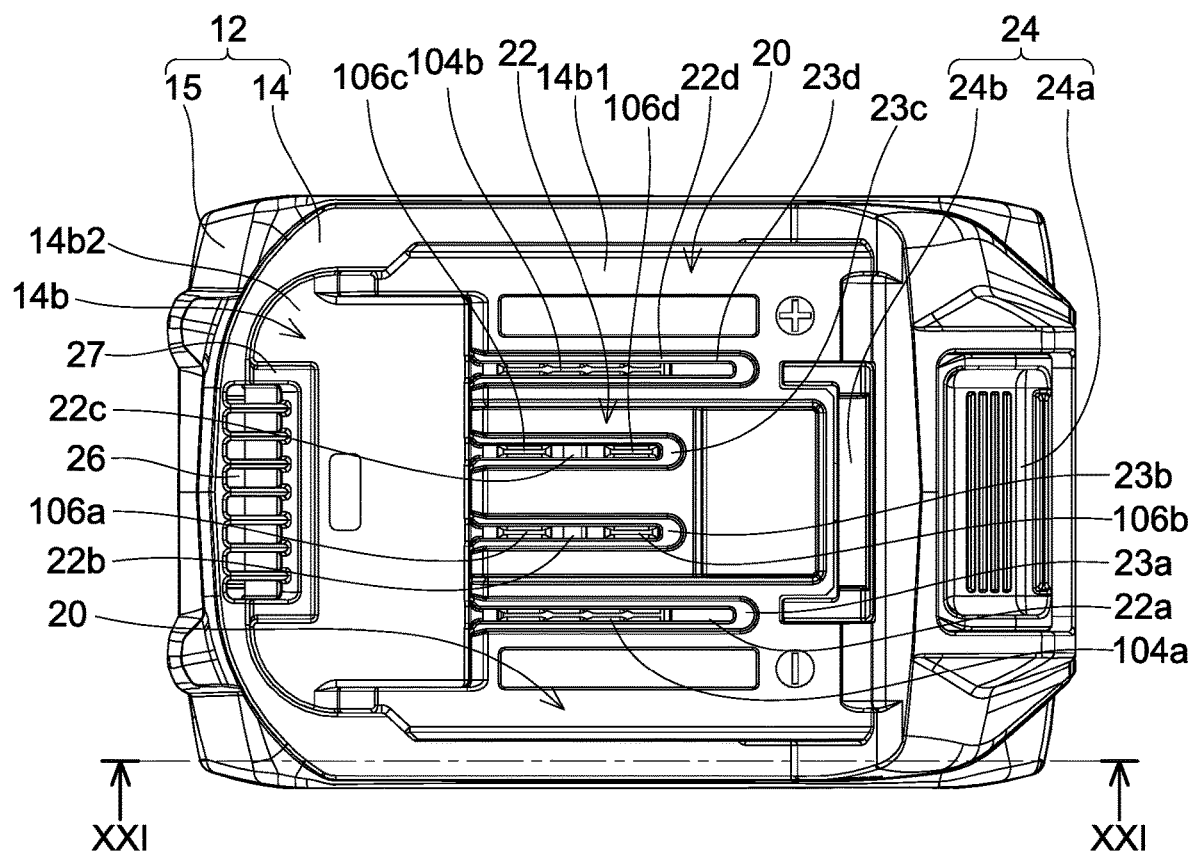
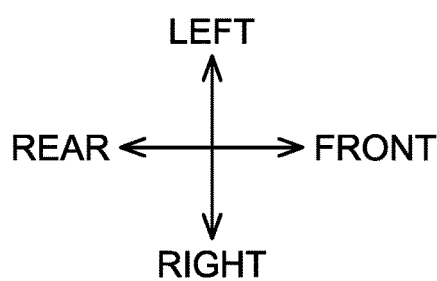

FIG. 15
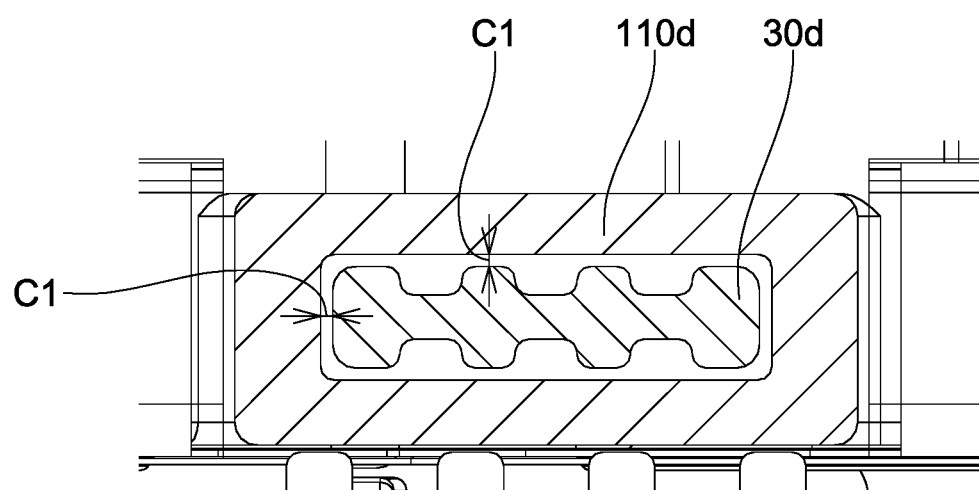
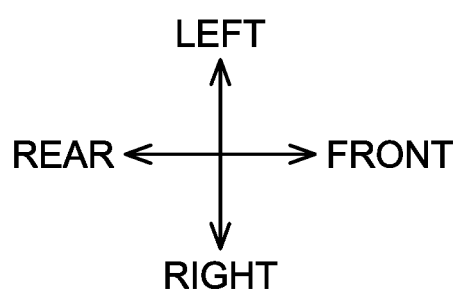

FIG. 20
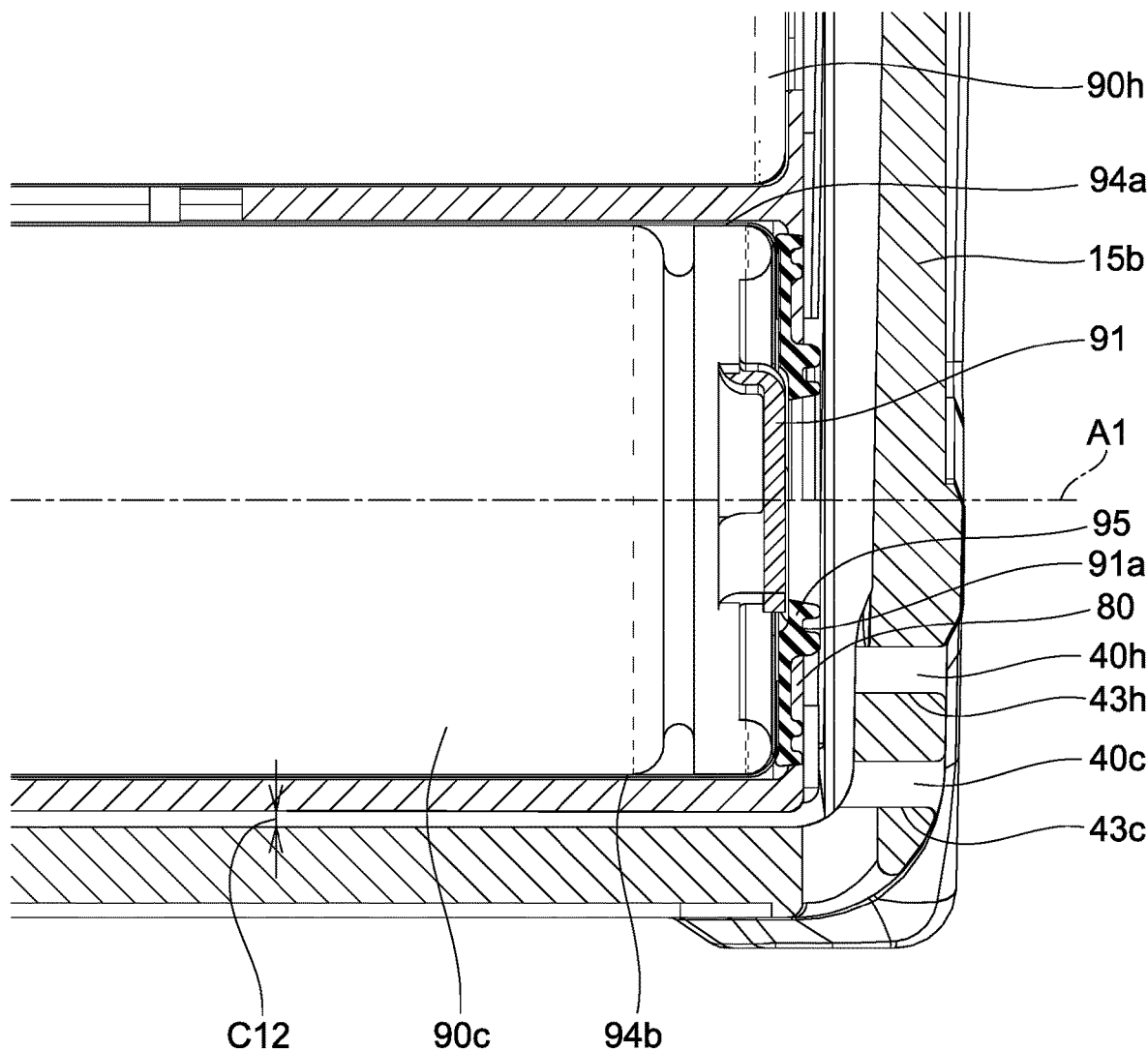
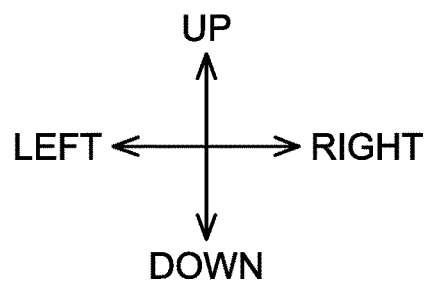

FIG. 22
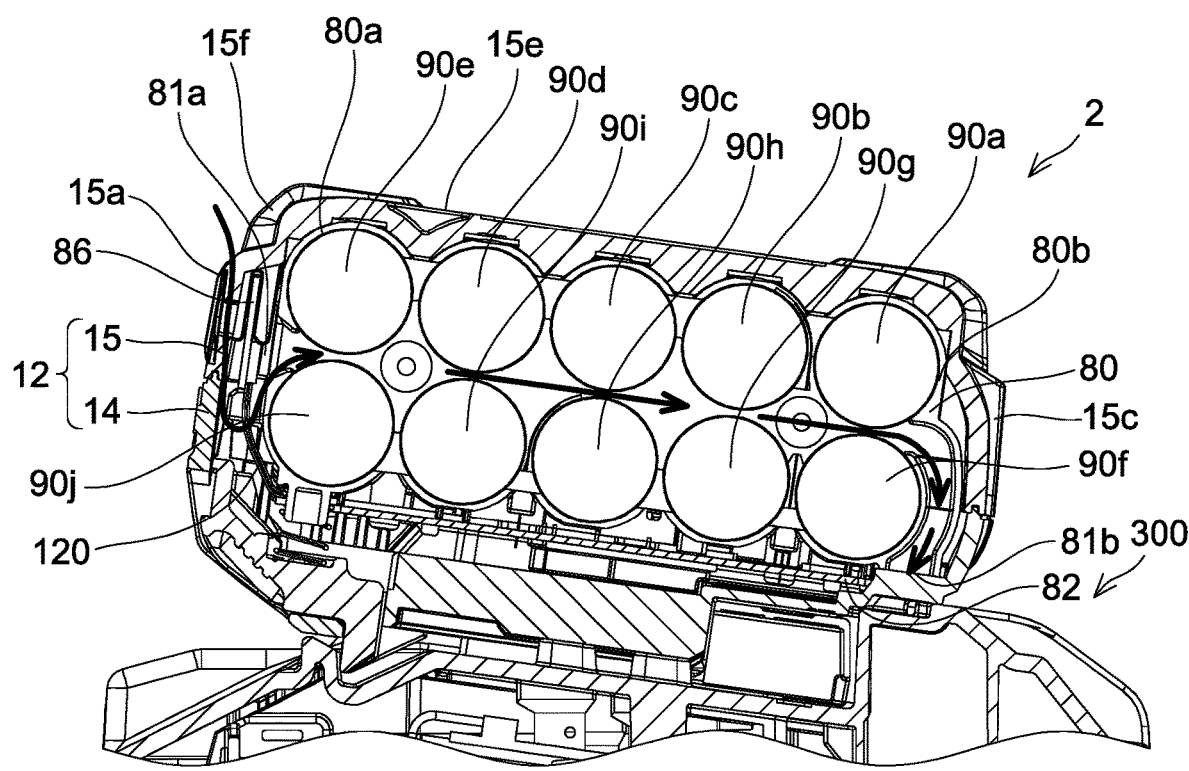
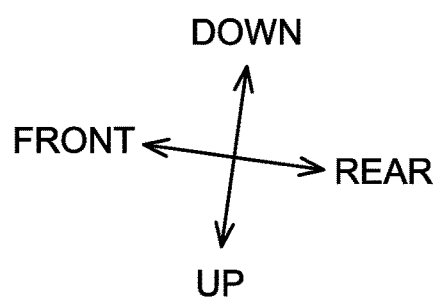

FIG. 23
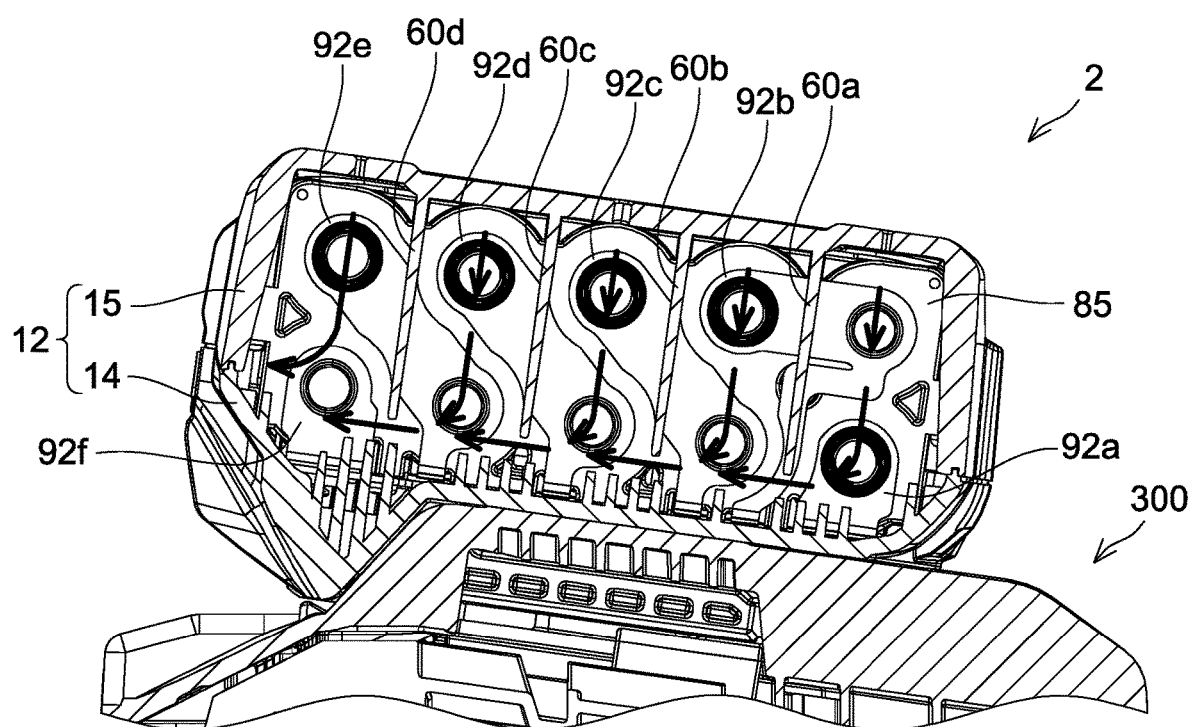
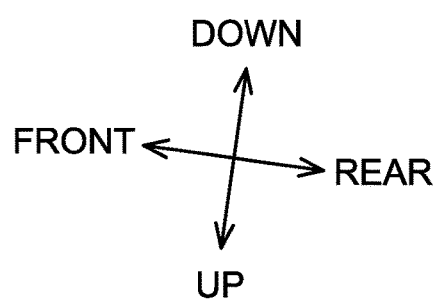

FIG. 24A
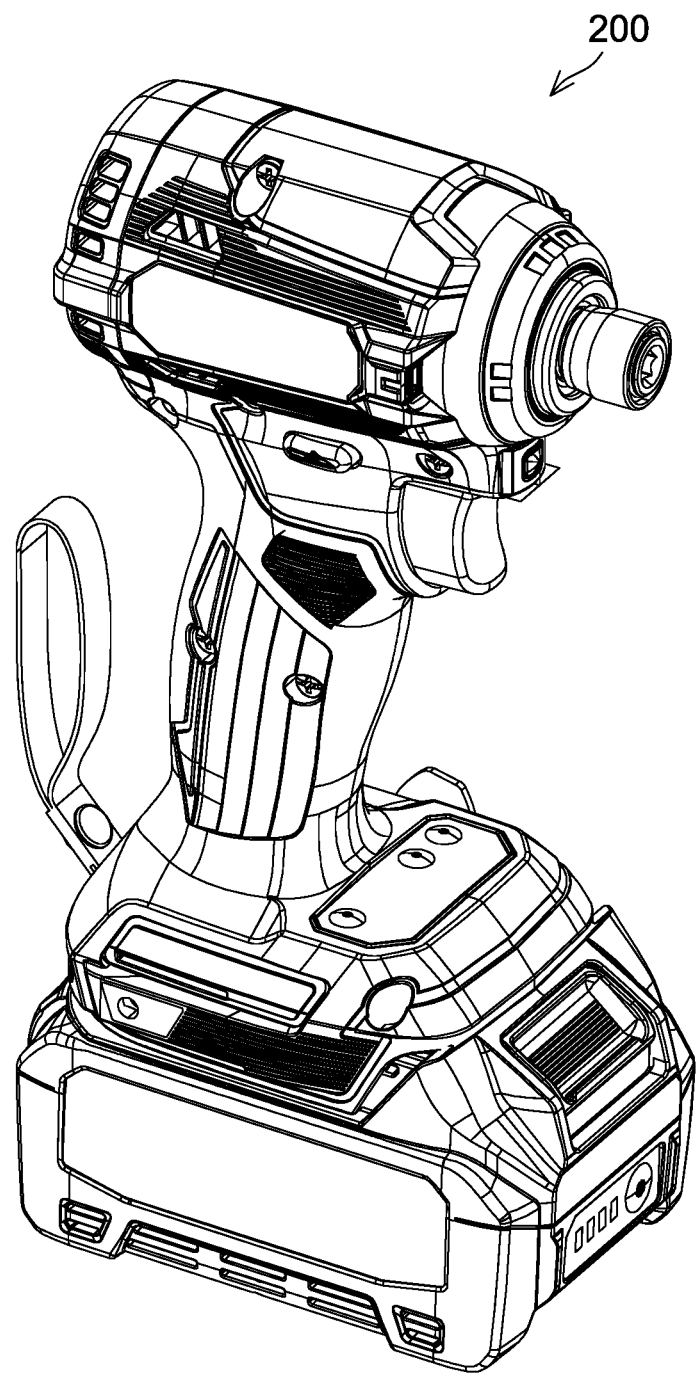
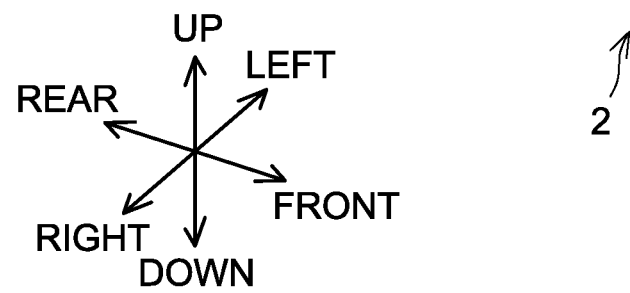

FIG. 25A
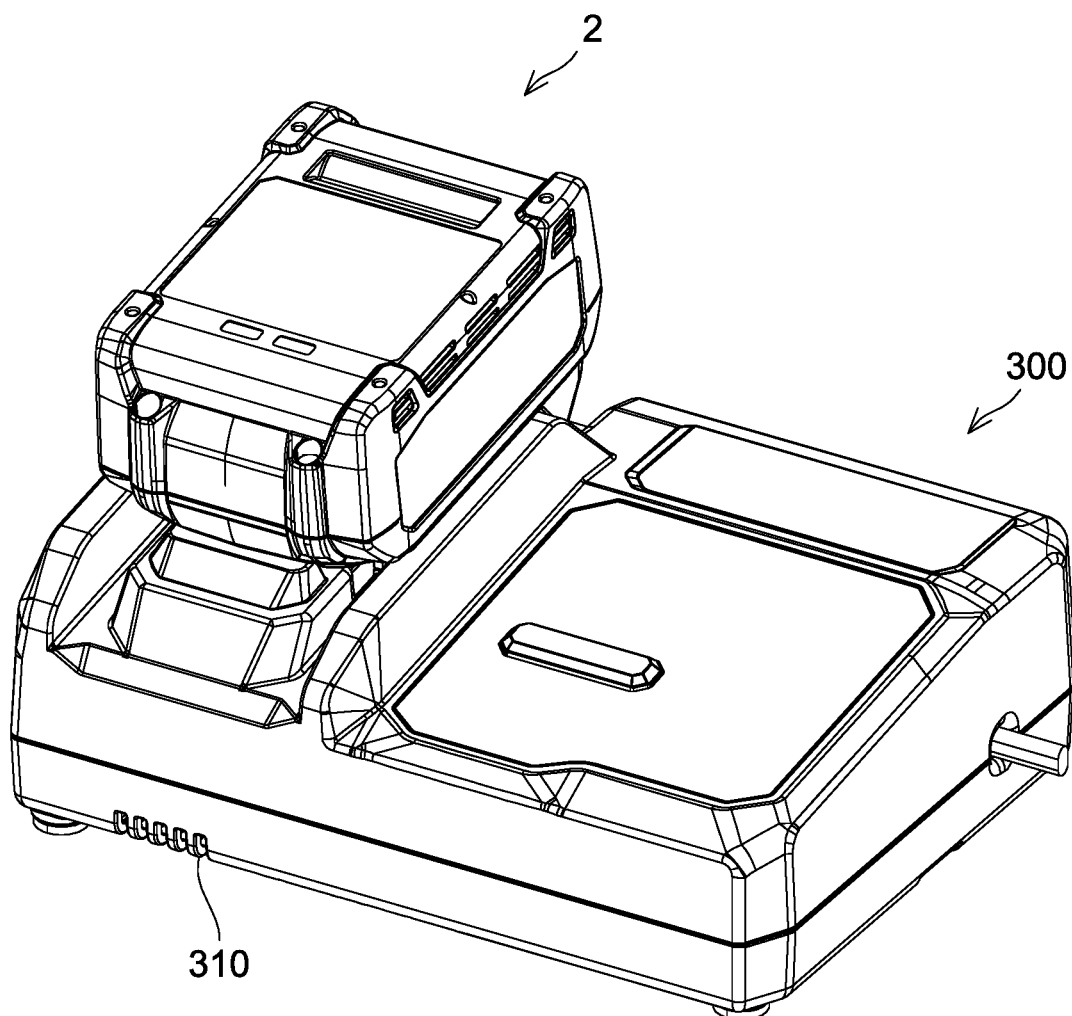
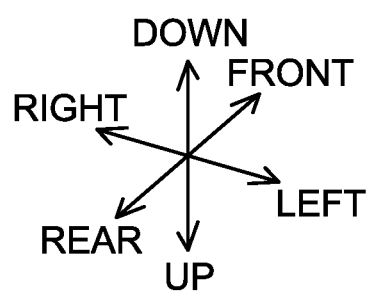

FIG. 25B
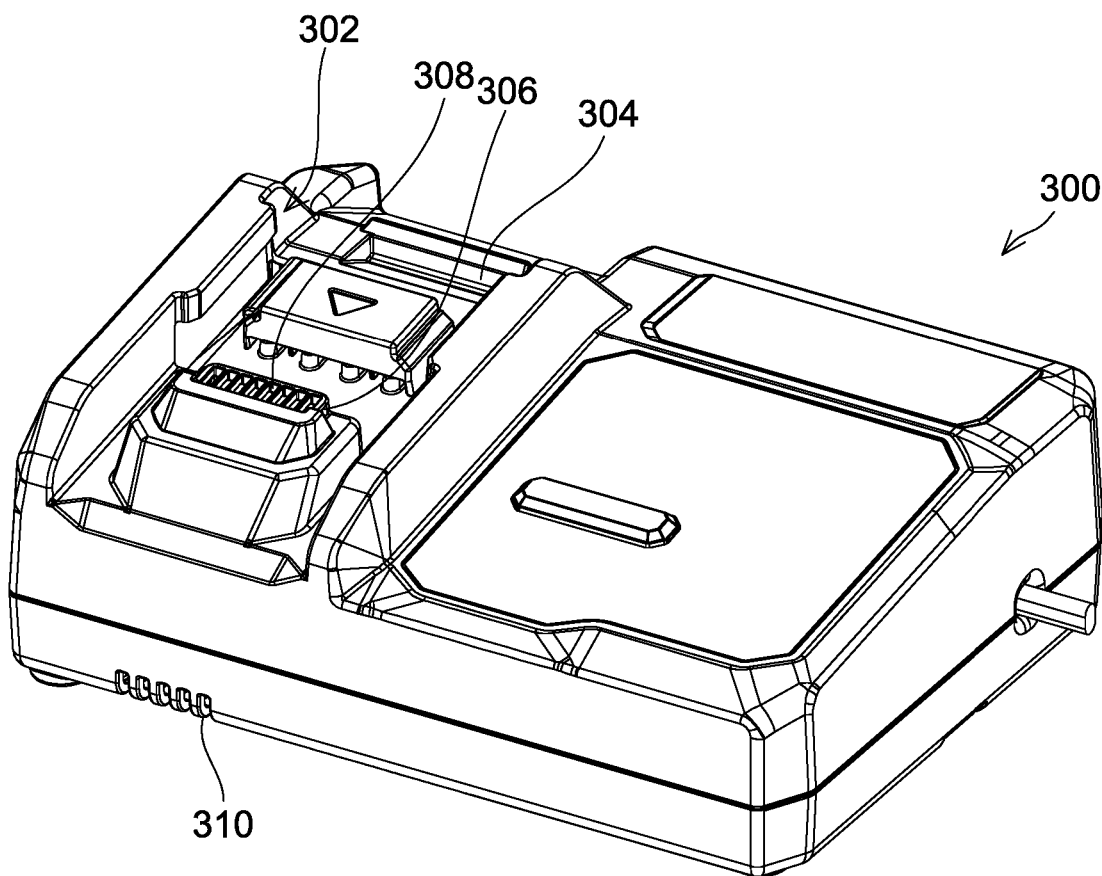
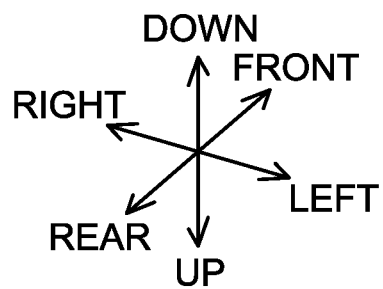

FIG. 26
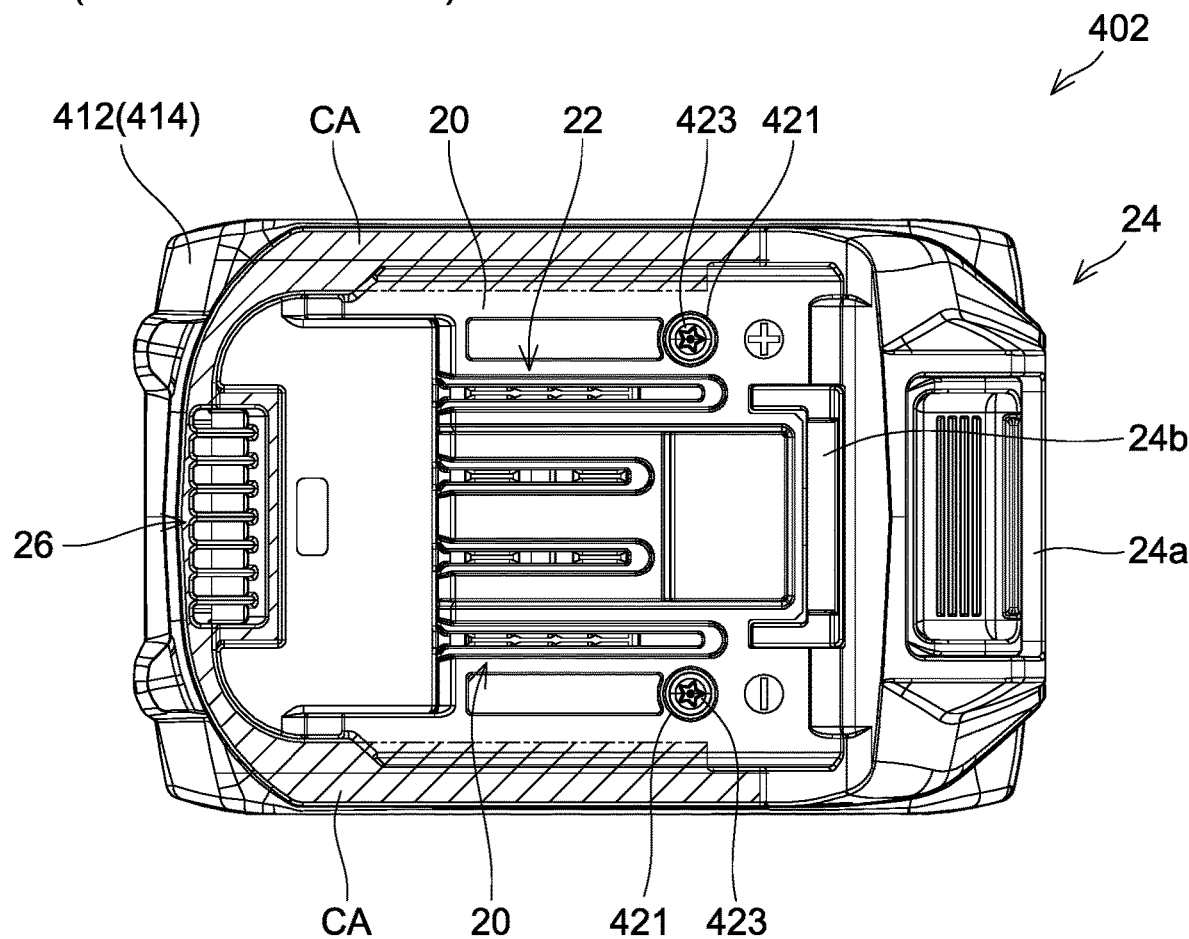
(Second Embodiment)
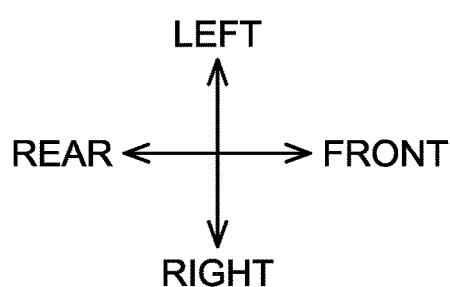

FIG. 27
( Second Embodiment )
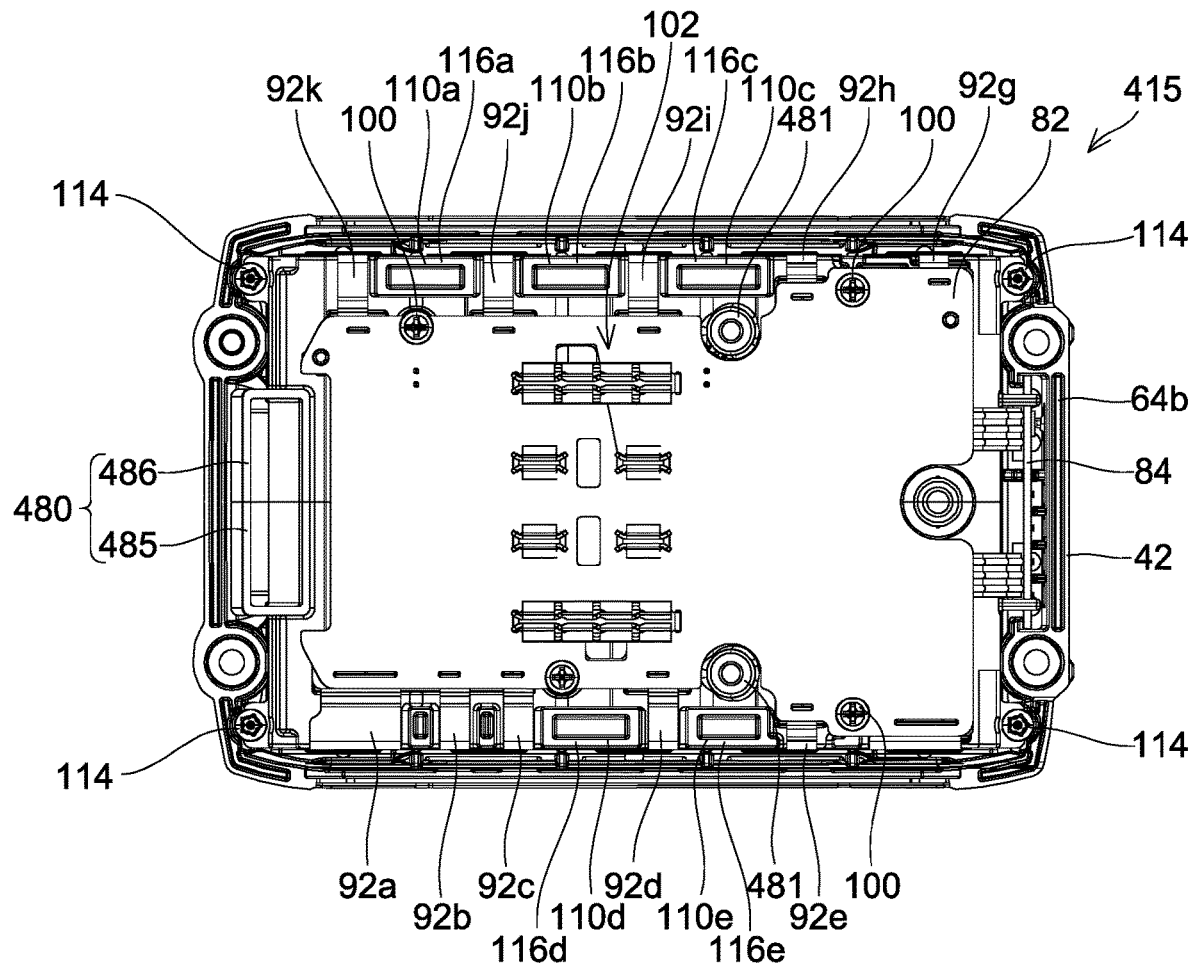
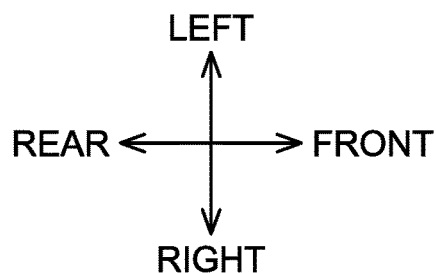

(Third Embodiment)

FIG. 29C
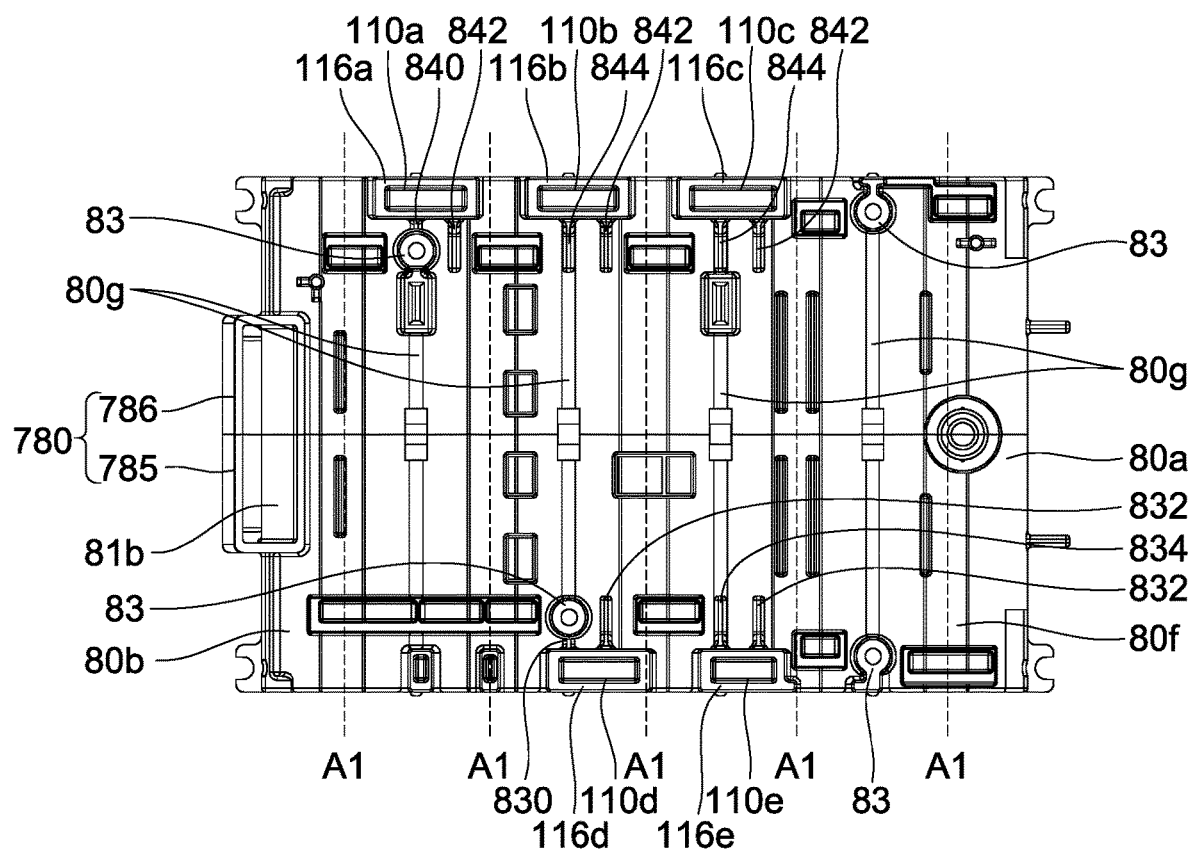
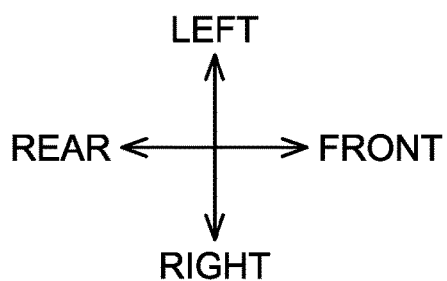

FIG. 30
( Fifth Embodiment )
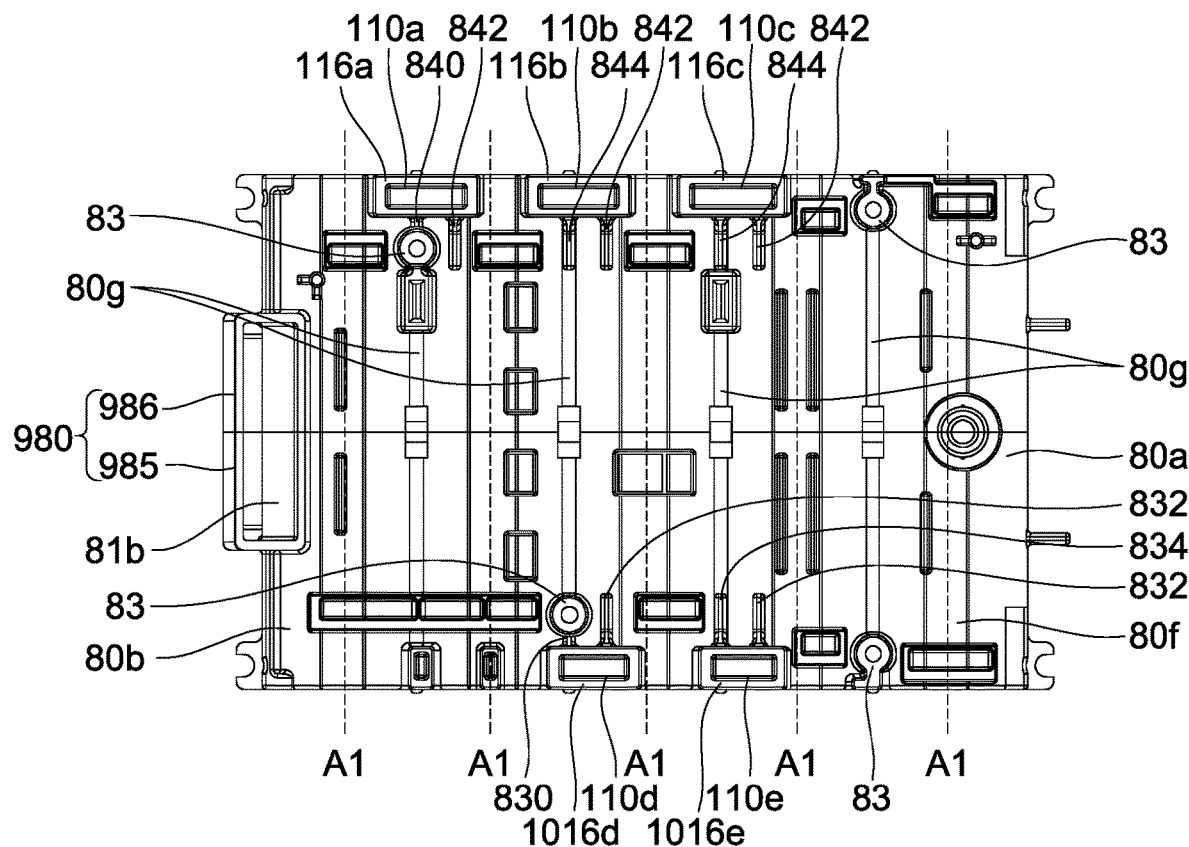
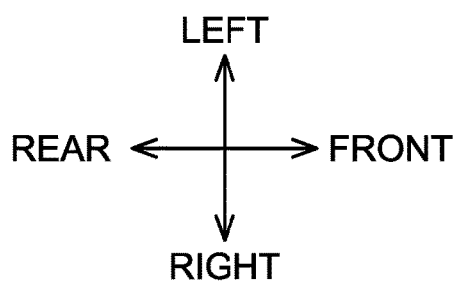

(Eighth Modified Example)

BATTERY PACK

CROSS-REFERENCE TO RELATED APPLICATIONS

This application claims priority to Japanese patent application nos. 2019-180792, 2019-180793 and 2019-180795, all filed on Sep. 30, 2019, the contents of each of which are fully incorporated herein by reference.

TECHNICAL FIELD

The subject matter disclosed by the present specification generally relates to battery packs, such as, e.g., battery packs for power tools and outdoor power equipment.

BACKGROUND ART

Japanese Laid-open Patent Publication 2014-203703 and its family member US 2014/302353 disclose a battery pack that comprises an outer case, which comprises an upper-part case and a lower-part case fixed to the upper-part case, and a cell case, which is housed inside the outer case.

SUMMARY OF THE INVENTION

In battery packs designed for power tools, a control board (circuit board) is typically mounted upward of the cell case such that the control board does not make contact with the upper-part case while the cell case is housed in the outer case. Nevertheless, if an impact is imparted to the outer case (e.g., in case a user accidentally drops the battery pack), then mispositioning between the upper-part case and the cell case may occur, and thereby the upper-part case may adversely come into contact with the control board.

It is one non-limiting object of the present teachings to disclose techniques for reducing the likelihood of mispositioning (misalignment) between an upper-part case and a cell case, e.g., in the event that the battery pack is dropped.

In one aspect of the present teachings, a first battery pack disclosed in the present specification may comprise an outer case, which comprises an upper-part case (upper case) and a lower-part case (lower case) fixed to the upper-part case, and a cell case (battery cell case), which is housed in the outer case. One or more engaging parts may be provided on or in one of the upper-part case and the cell case; and one or more engaged parts, with which the (respective) engaging part(s) engage(s), may be provided on or in the other of the upper-part case and the cell case. Preferably, a plurality of engaging parts and a plurality of matching (corresponding, complementary) engaged parts are provided.

In such a first battery pack, the engaging part(s), which is (are) provided on or in one of the upper-part case and the cell case, engage(s) with the engaged part(s), which is (are) provided on or in the other of the upper-part case and the cell case. Consequently, even if mispositioning between the upper-part case and the lower-part case were to occur, the likelihood of mispositioning between the upper-part case and the cell case can be reduced.

In another aspect of the present teachings, a second battery pack disclosed in the present specification may comprise an outer case, which comprises an upper-part case (upper case) and a lower-part case (lower case) fixed to the upper-part case, and a cell case (battery cell case), which is housed in the outer case. The upper-part case may comprise a pair of slide rails that receives (and holds or retains) an external apparatus (e.g., a power tool or outdoor power equipment) by sliding the external apparatus relative to the slide rails; and one or more fixing part(s), which fix(es) (secure(s)) the upper-part case and the cell case to one another and is (are) provided on or in the upper-part case inward (e.g., laterally inward) of a contact area (or contact areas). In the contact area(s), the external apparatus contacts the battery pack while the external apparatus is mounted on the second battery pack.

In such a second battery pack, the upper-part case and the cell case are fixed by the fixing part(s). Consequently, even if mispositioning between the upper-part case and the lower-part case were to occur, the likelihood of mispositioning between the upper-part case and the cell case can be reduced.

It is noted that features of the above-mentioned first and second battery packs may be combined to create additional battery packs according to the present teachings.

BRIEF DESCRIPTION OF THE DRAWINGS

FIG. 1A is an oblique view, viewed from the front, the right, and above, of a battery pack 2 according to a first embodiment of the present teachings.

FIG. 1C is an oblique view, viewed from the rear, the right, and above, of the battery pack 2 according to the first embodiment.

FIG. 3 is a right view, viewed from the right, of the battery pack 2 according to the first embodiment.

FIG. 4A is a bottom view, viewed from below, of an upper-part case 14 according to the first embodiment.

FIG. 4C is a cross-sectional view, viewed from the rear, of a slide rail 20 of the upper-part case 14 according to the first embodiment.

FIG. 11C is a top view, viewed from above, of the cell case 80 according to the first embodiment.

FIG. 12B is a top view, viewed from above, of the battery pack 2 according to the first embodiment.

FIG. 15 is an enlarged view of the broken-line area XV in FIG. 14.

FIG. 20 is a cross-sectional view, viewed from the rear, of the battery pack 2 according to the first embodiment.

FIG. 22 is a cross-sectional view, viewed from the left, of the state in which the battery pack 2 according to the first embodiment is mounted on a charger 300.

FIG. 23 is a cross-sectional view, viewed from the left, of the state in which the battery pack 2 according to the first embodiment is mounted on the charger 300.

FIG. 24A is an oblique view, viewed from the right, above, and the front, of the state in which the battery pack 2 according to the first embodiment is mounted on a power tool 200.

FIG. 25A is an oblique view, viewed from the left, below, and the rear, of the state in which the battery pack 2 according to the first embodiment is mounted on the charger 300.

FIG. 25B is an oblique view, viewed from the left, the rear, and below, of the charger 300.

FIG. 26 is a top view of a battery pack 402 according to a second embodiment of the present teachings.

FIG. 27 is a top view that shows the state in which, in the second embodiment, the battery module 10 and the lower-part case 15 are fixed to one another.

FIG. 29C is a top view, viewed from above, of the cell case 780 according to the fourth embodiment.

FIG. 30 is a top view, viewed from above, of a cell case 980 according to a fifth embodiment of the present teachings.

DETAILED DESCRIPTION OF EMBODIMENTS OF THE PRESENT TEACHINGS

Figure 1B:
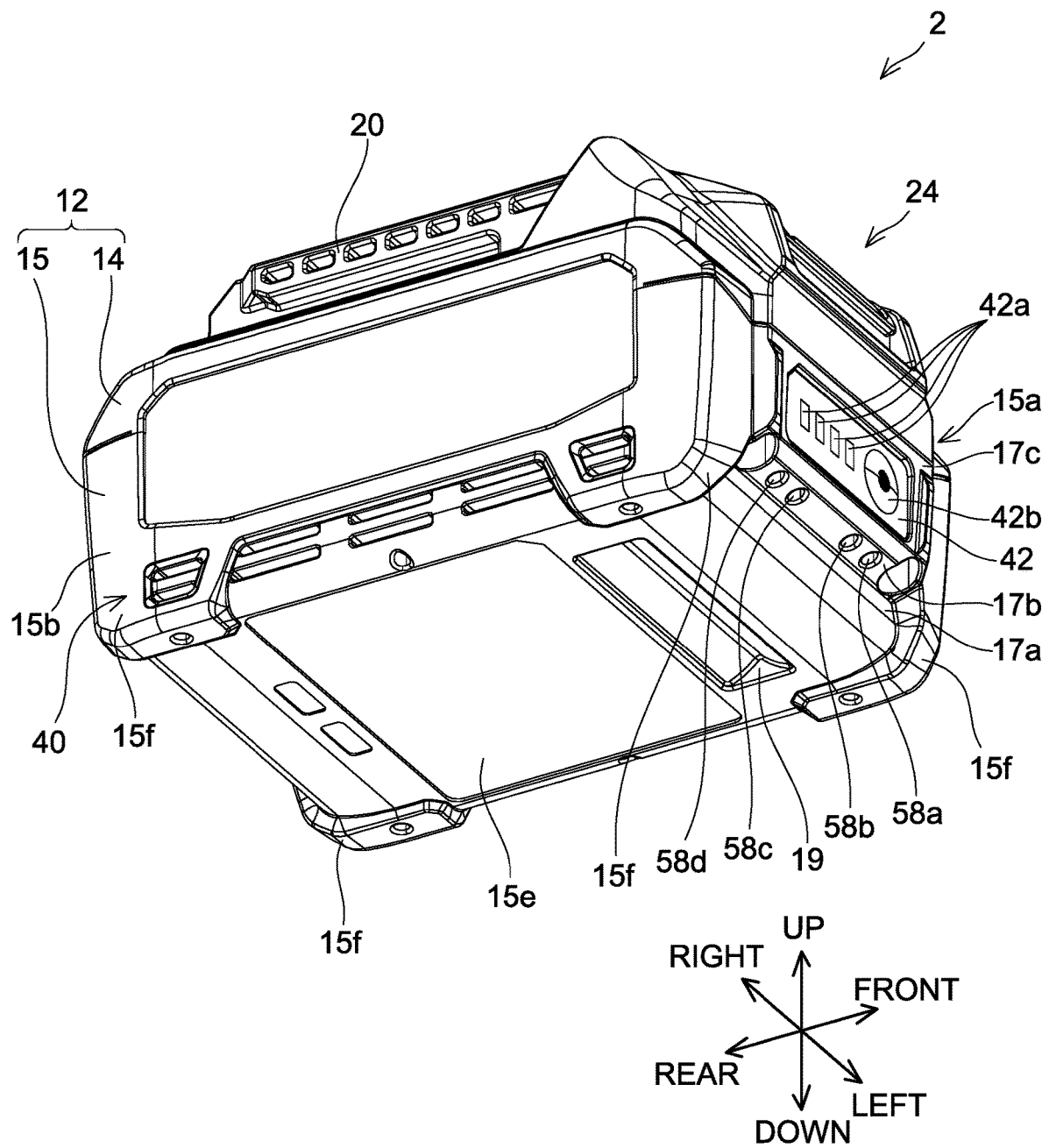
FIG. 1B is an oblique view, viewed from the front, the right, and below, of the battery pack 2 according to the first embodiment.

In one or more of the above-described aspects of the present teachings, the engaging part(s) may be or include one or more first ridge parts (portion(s)), and the engaged part(s) may be or include one or more corresponding first recessed parts (first recess(es)) that (each) has a shape that matches (corresponds to, is complementary to, fits around) the (respective, corresponding) first ridge part(s). Preferably, the engaging part(s) and the engaged part(s) have corresponding, matching or complementary shapes that are shape-fit (form-fit, engineering fit) or interlocked with each other such that movement of the engaging part relative to the engaged part in directions perpendicular to an extension (protruding) direction of the engaging part is restricted (blocked). However, preferably movement in the extension (protruding) direction of the engaging part is not restricted or impeded.

If the first ridge part(s) and the first recessed part(s) do not have complex shapes, they can be formed (manufactured) easily. Accordingly, it becomes easier to manufacture a battery pack, in which the likelihood of mispositioning between an upper-part case and a cell case can be reduced.

In one or more embodiments, one or more protruding part(s) may be provided on the upper-part case or the cell case, and the first recessed part(s) may be (respectively) provided on or in the protruding part(s). A reinforcing part may extend away from the (each) protruding part. That is, the reinforcing part is preferably physically attached to (e.g., integral with) the protruding part and extends in a direction perpendicular to the protruding direction of the protruding part.

If an impact is imparted to the outer case of the battery pack as a result, for example, of a user having dropped the battery pack, then there is a possibility that the protruding part(s) will deform. If the protruding part(s) thus deform(s) adversely, then mispositioning (misalignment) between the upper-part case and the cell case may occur. However, in the above-mentioned configuration, the stiffness (robustness) of the protruding part(s) is increased by the (respective) reinforcing part(s). Accordingly, the likelihood of deformation of the protruding part(s), on (in) which the first recessed part(s) is (are respectively) provided, can be reduced, and the likelihood of mispositioning between the upper-part case and the cell case can be reduced.

In one or more embodiments, the first ridge part(s) may be provided on the upper-part case, and the first recessed part(s) may be provided on (in) the cell case.

According to the above-mentioned configuration, it is easier to ensure a sufficient thickness of the upper-part case than in an embodiment in which the first recessed part(s) is (are) provided on (in) the upper-part case. Accordingly, the stiffness of the upper-part case can be increased, and the likelihood of deformation of the upper-part case can be reduced.

In one or more embodiments, the battery pack may further comprise a plurality of battery cells housed in the cell case and lined up in parallel relative to a bottom surface of a lower-part case. One or more of the protruding part(s) may be provided on an upper surface of the cell case, and one or more the first recessed part(s) may be (respectively) provided on (in) the protruding part(s). The upper surface of the cell case may have a shape that conforms to side (cylindrical) surfaces of the battery cells. One or more hollow parts may be provided on the upper surface of the cell case between a (each) pair of adjacent battery cells. The protruding part(s) may be provided such that it (they respectively) span(s) the hollow part(s) when the cell case is viewed from above (i.e. in plan view) and may be provided (extend) only between the longitudinal-direction axes of the (each) pair of adjacent battery cells. In other words, the length of the protruding part(s) in the front-rear direction of the battery pack is preferably shorter than distance between the longitudinal-direction axes of the (each) pair of adjacent battery cells, and the (each) protruding part does not overlap or intersect any longitudinal-direction axis of any of the battery cells.

It is necessary to provide a clearance between the protruding part(s) of the cell case and the upper-part case when the cell case and the upper-part case are in the state of being connected together. Consequently, if the height of the protruding part(s) were to (hypothetically) be made large, then the height of the surface of the upper-part case opposing the protruding part(s) would also have to be made large. Because the upper surface of the cell case has a shape that conforms to the side surfaces of the battery cells, the upper surface of the cell case becomes lower the farther away it gets from the longitudinal-direction axes of the battery cells. According to the above-mentioned configuration, if a plurality of the protruding parts is provided and the lengths of protruding parts in an up-down direction are the same, the positions of upper ends of the protruding parts can be made lower than in an embodiment in which the protruding parts are provided upward of the longitudinal-direction axes of the battery cells. Accordingly, it is possible to design the battery pack in a compact manner in the up-down direction of the battery pack.

In one or more embodiments, in the hollow part(s), the reinforcing part(s) may extend away from the protruding part(s). In other words, the reinforcing part(s) may extend along or within the (respective) hollow part(s), preferably integrally with the hollow part(s).

The longer the reinforcing part(s) in the up-down direction, the more that the stiffness (robustness against deformation) of the protruding part(s) can be increased. Nevertheless, if the position of the upper end(s) of the reinforcing part(s) becomes high, then the surface of the upper-part case that opposes the reinforcing part(s) must likewise be made commensurately high. According to the above-mentioned configuration, if a plurality of the protruding parts is provided and the lengths of reinforcing parts in the up-down direction are the same, the position of the upper ends of the reinforcing parts can be made lower than in an embodiment in which the reinforcing parts are provided upward of the longitudinal-direction axes of the battery cells. Accordingly, it is possible to design the battery pack in a compact manner in the up-down direction, and the likelihood of deformation of the protruding part(s), on which the first recessed part(s) is (are) provided, can be reduced.

In one or more embodiments, the first ridge part(s) may (each) be provided with (may have) one or more thick-wall parts (portions) and one or more thin-wall parts (portions). The size (dimension, thickness) of the thick-wall part(s) in a direction orthogonal to the protruding direction of the first ridge part(s) may be greater than the size (dimension, thickness) of the thin-wall part(s) in the (same) direction orthogonal to the protruding direction.

Due to the effects of shrinkage, which occurs when the first ridge part(s) is (are) formed, it is difficult to form the first ridge part(s) such that the size (dimension, thickness) of the first ridge part(s) is constant in the direction orthogonal to the protruding direction. However, by providing the thick-wall part(s) and the thin-wall part(s) according to the above-mentioned configuration, it is possible to reliably (accurately) form the first ridge part(s) with the intended shape.

In one or more embodiments, one or more second ridge part(s) (portion(s)) may be provided in or on one of the upper-part case and the lower-part case, and one or more corresponding second recessed parts (second recess(es)), which have a shape that matches (corresponds to, is complementary to, fits around) the (respective) second ridge part(s), may be formed in or on the other of the upper-part case and the lower-part case. When the upper-part case and the lower-part case are fixed to one another, the (first) clearance between the first ridge part(s) and the first recessed part(s) is preferably greater than the (second) clearance between the second ridge part(s) and the second recessed part(s). Preferably, the second ridge parts and the second recessed parts have corresponding, matching or complementary shapes that are shape-fit (form-fit, engineering fit) or interlocked with each other such that movement of the second ridge part relative to the second recess part in directions perpendicular to an extension (protruding) direction of the second ridge part is restricted (blocked). However, preferably movement in the extension (protruding) direction of the second ridge part is not restricted or impeded.

If the (second) clearance between the second ridge part(s) and the second recessed part(s) is used to position the upper-part case relative to the lower-part case, then this (second) clearance is preferably small, in order to tightly restrict the range of possible relative movement between the upper-part case and the lower-part case in a plane defined by the front-rear direction and the left-right direction (i.e. a plane parallel to a bottom surface of the outer case). On the other hand, the (first) clearance between the first ridge part(s) and the first recessed part(s) is designed to reduce the likelihood of mispositioning between the upper-part case and the cell case, e.g., in the event that the battery pack is accidentally dropped. More specifically, in the event that a slight mispositioning (misalignment) between the upper-part case and the cell case has occurred, a further increase in the mispositioning (misalignment) between the upper-part case and the cell case is reduced by virtue of the first ridge part(s) and the first recessed part(s) making contact with one another. In other words, the first recessed part(s) restrict(s) the range of movement of the first ridge part(s), and thereby the range of movement of the upper-case part relative to the cell case, e.g., in the event that the battery pack is dropped. Consequently, the (first) clearance between the first ridge part(s) and the first recessed part(s) can be made greater than the (second) clearance between the second ridge part(s) and the second recessed part(s). According to the above-mentioned configuration, the upper-part case and the cell case can be assembled easily.

In one or more embodiments, the upper-part case may comprise one or more slide rails that receive(s) an external apparatus, such as a power tool or outdoor power equipment, by sliding the external apparatus relative to the slide rail(s). The engaging part(s) or the engaged part(s) provided on or in the upper-part case may be provided in the vicinity of the slide rail(s).

For example, if the user drops the external apparatus while the battery pack is mounted thereon, then the battery pack may be the first part that hits the ground. In this case, a large impact force may act on the slide rail(s) of the battery pack, which receive(s) (hold) the external apparatus. Consequently, there is a possibility that mispositioning between the upper-part case and the lower-part case will occur. However, by providing the engaging part(s) or the engaged part(s) in the vicinity of the slide rail(s) according to the above-mentioned configuration, the likelihood of mispositioning between the upper-part case and the cell case can be reduced in a more reliable (robust) manner.

In addition, in typical battery pack designs, the slide rail(s) protrude(s) upward from the upper surface of the upper-part case. Consequently, if, for example, the user drops the battery pack alone, it is possible that the slide rail(s) will hit the ground first. In this case, within the upper-part case, the greatest impact force will act on the slide rail(s). However, by providing the engaging part(s) or the engaged part(s) in the vicinity of the slide rail(s) in accordance with the above-mentioned configuration, the likelihood of mispositioning between the upper-part case and the cell case can be reduced in a more reliable (robust) manner.

In one or more embodiments, the engaging part(s) or the engaged part(s), which is (are) provided on the upper-part case, may be provided downward of the slide rail(s).

For example, if the user drops the external apparatus, on which such a battery pack is mounted and the battery pack hits the ground first, a large impact force may act on the slide rail(s) of the battery pack, which receive(s) (hold) the external apparatus. However, according to the above-mentioned configuration, the likelihood of mispositioning between the upper-part case and the cell case can be reduced in a more reliable (robust) manner in the above-mentioned configuration of the engaging part(s) and engaging part(s).

In one or more embodiments, the battery pack may further comprise a plurality of battery cells, which is housed in the cell case, and a plurality of lead plates (conductive plates) connected to the battery cells and disposed spaced apart from one another in a direction orthogonal to the longitudinal direction of the battery cells. The lead plates electrically connect the battery cells. The engaging part(s) or the engaged part(s) provided on the cell case may be provided between (each) two adjacent lead plates. More specifically, the (each) engaging part and the (each) engaged part is preferably disposed above (in the up-down direction) a gap between two adjacent lead plates. It is noted that the lead plates may generally extend diagonal to the up-down direction with diagonally-extending gaps therebetween. Therefore, at the closest distance between the gap(s) on the one side and the engaging part(s)/engaged part(s) on the other side, the engaging part(s)/engaged part(s) are directly adjacent to the gap(s).

To prevent short circuits, the lead plates are disposed spaced apart from each other such that the distance between the lead plates does not become too short. According to the above-mentioned configuration, regions (gaps) between the lead plates can be utilized effectively by placing the engaging part(s)/engaged part(s) at or even in such regions (gaps). Accordingly, the battery pack can be designed in a compact manner in the up-down direction in such an embodiment as well.

In addition, as was described above, a second battery pack disclosed in the present specification may comprise the outer case, which comprises the upper-part case and the lower-part case to which the upper-part case is fixed, and the cell case, which is housed in the outer case. The upper-part case may comprise the slide rail(s) that receive(s) (hold(s)) the external apparatus by sliding the external apparatus relative to the slide rail(s); and one or more fixing parts, which fix(es) the upper-part case and the cell case to one another, may be provided inward of a contact area (or contact areas), where the external apparatus and the battery pack contact one another while the external apparatus is mounted on the second battery pack.

In one or more embodiments, the external apparatus may be a work tool, such as a power tool or outdoor power equipment.

If the user drops the work tool, on which the battery pack is mounted, then the battery pack may hit the ground first. In this case, a large impact force may act on the battery pack. However, because the upper-part case and the cell case are fixed to one another by the fixing part in the above-mentioned configuration, even if the user drops the work tool on which the battery pack is mounted, the likelihood of mispositioning between the upper-part case and the cell case can be reduced.

In one or more embodiments, the fixing part(s) may be provided inward of (between) the slide rails.

According to the above-mentioned configuration, the region between the pair of the slide rails can be utilized effectively, thereby enabling the size of the battery pack to be reduced.

First Embodiment

A battery pack 2 according to the first embodiment of the present teachings is explained below, with reference to the drawings. As shown in FIG. 24A, the battery pack 2 can be mounted on a power tool 200 in a detachable manner. In FIG. 24A, the power tool 200 is a power driver, but the power tool 200 may be, for example, a power drill, a power grinder, a power circular saw, a power chain saw, a power reciprocating saw, a power lawnmower, a power brush cutter, a power blower, etc. When mounted on the power tool 200, the battery pack 2 supplies electric power to the power tool 200. In addition, as shown in FIG. 25A, the battery pack 2 can be mounted on a charger 300 in a detachable manner. When mounted on the charger 300, the battery pack 2 is supplied with electric power from the charger 300. It is noted that, in the explanation below, when the battery pack 2 is being mounted on the power tool 200 or the charger 300, the direction in which the power tool 200 or the charger 300 is located, when viewed from the battery pack 2, is called "upward", and the direction opposite thereof is called "downward". In addition, when the battery pack 2 is being mounted on the power tool 200 or the charger 300, the direction in which the battery pack 2 is slid is called "rearward"; and when the battery pack 2 is being removed from the power tool 200 or the charger 300, the direction in which the battery pack 2 is slid is called "forward". That is, in the explanation below, the front-rear direction corresponds to a sliding direction, in which the battery pack 2 is slid relative to the power tool 200 or the charger 300.

As shown in FIG. 1 to FIG. 13B, the battery pack 2 comprises a battery module 10 (refer to FIG. 9) and an outer case (outer shell) 12 (refer to FIG. 1), which houses the battery module 10. The entirety of the outer case 12 is formed substantially in a rectangular-parallelepiped shape and is divided into an upper-part case (or simply "upper case" or even "upper case half") 14 and a lower-part case (or simply "lower case" or even "lower case half") 15. As shown in FIG. 2, the upper-part case 14 and the lower-part case 15 are fixed to one another by four screws 18.

Configuration of Upper-Part Case 14

As shown in FIG. 1A, slide rails 20, a terminal-receiving part 22, a hook 24, and a vent 26 are formed on or in the upper-part case 14.

The slide rails 20 extend in the front-rear direction and are respectively disposed on left- and right-end portions of an upper portion of the upper-part case 14. As shown in FIG. 1A, the right-side slide rail 20 comprises a base part 20a, an upward-extending part 20b, a first rightward-extending part 20c, and a second rightward-extending part 20d. Furthermore, the left-side slide rail 20 comprises a base part 20a, an upward-extending part 20b, a first leftward-extending part 20c, and a second leftward-extending part 20d. As shown in FIG. 4C, the upward-extending part 20b of the right-side slide rail 20 extends upward from a left end of the base part 20a. The first rightward-extending part 20c extends rightward from the upward-extending part 20b. A lower end of the first rightward-extending part 20c is located upward of the upper end of the base part 20a. A right end of the first rightward-extending part 20c is located leftward of a right end of the base part 20a. The second rightward-extending part 20d extends rightward from the upward-extending part 20b. A right end of the second rightward-extending part 20d coincides with the location of the right end of the first rightward-extending part 20c in a left-right direction. As shown in FIG. 1A, the second rightward-extending part 20d is connected to the base part 20a. A plurality of slots (recessed parts) 20e is provided on (in) the first rightward-extending part 20c and the second rightward-extending part 20d and the slots 20e are lined up (colinear) in the front-rear direction. When the battery pack 2 is being mounted on or removed from the power tool 200 or the charger 300, the slide rails 20 slidably engage with slide rails (not shown) of the power tool 200 or with slide rails 302 (refer to FIG. 25B) of the charger 300. Specifically, the slide rails (not shown) of the power tool 200 or the slide rails 302 of the charger 300 respectively slide between the base part 20a and the first rightward-extending part 20c of the right-side slide rail 20 and between the base part 20a and the first leftward-extending part 20c of the left-side slide rail 20.

Figure 24B:
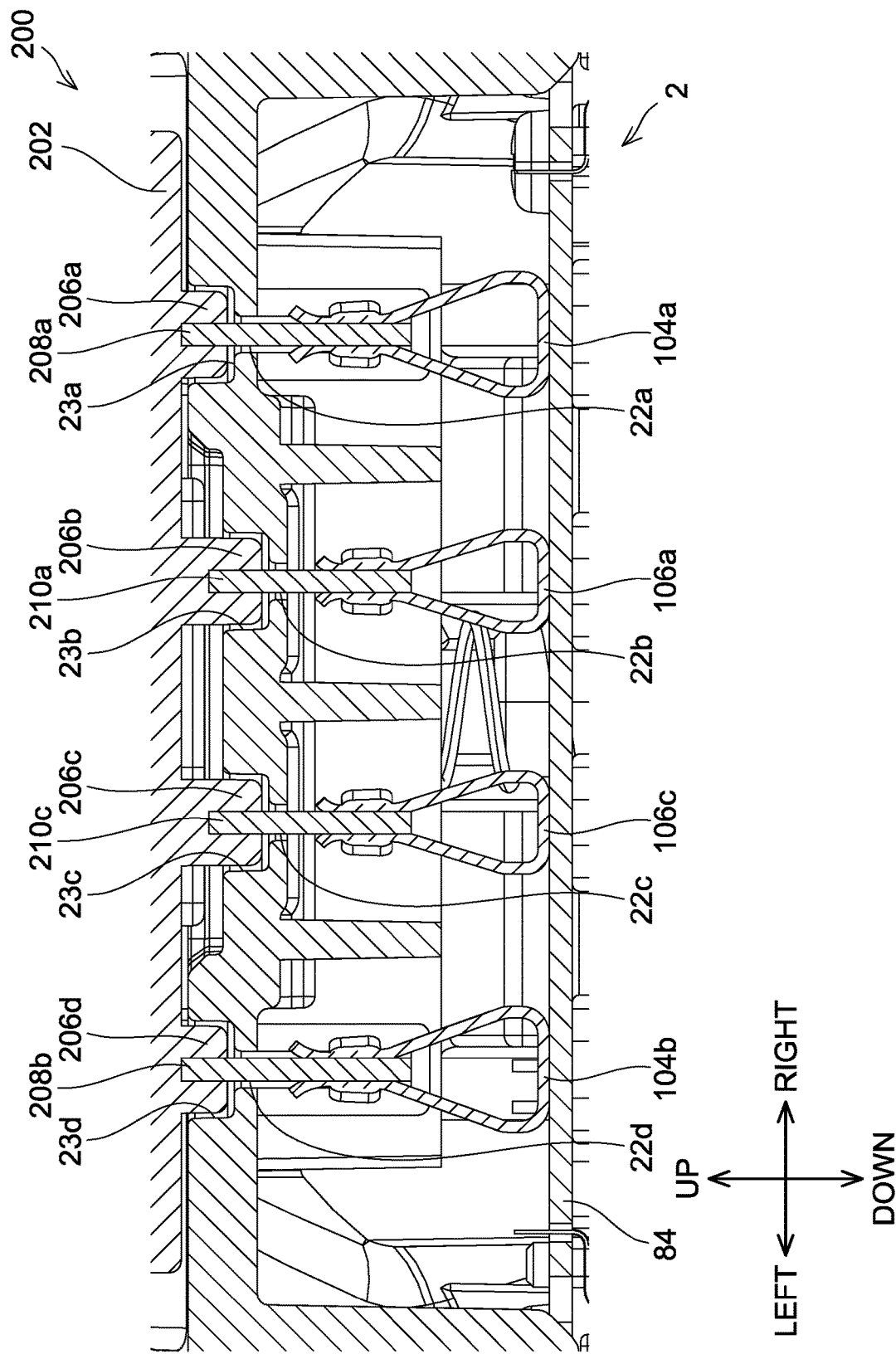
FIG. 24B is a cross-sectional view, viewed from the rear, of the state in which the battery pack 2 according to the first embodiment is mounted on the power tool 200.

The terminal-receiving part 22 comprises four terminal-opening parts (terminal openings) 22a-22d, which are provided on a forward-upper surface 14b1 of an upper wall 14b of the upper-part case 14. The terminal-opening parts 22a-22d are disposed between the left and right slide rails 20. Therefore, when the battery pack 2 is being mounted on the power tool 200 or on the charger 300, the terminal-opening parts 22a-22d respectively receive terminals 208a, 208b, 210a, 210c (refer to FIG. 24B) of the power tool 200 or terminals (not shown) of the charger 300. The terminal-opening parts 22a-22d are provided in the order of, from the right-side slide rail 20 to the left-side slide rail 20, the (first) terminal-opening part 22a, the (second) terminal-opening part 22b, the (third) terminal-opening part 22c, and the (fourth) terminal-opening part 22d. As shown in FIG. 1C, FIG. 12B, and FIG. 24B, battery-side channels (recessed parts, steps) 23a-23d are provided such that they respectively surround the terminal-opening parts 22a-22d. The terminal-opening parts 22a-22d and the battery-side channels 23a-23d each have a U shape when the battery pack 2 is viewed from above (i.e. in plan view of the battery pack 2). The bases or bottom surfaces of the respective battery-side channels 23a-23d are provided (extend) slightly downward of (parallel to) the forward-upper surface 14b1 of the outer case 12. That is, the forward-upper surface 14b1 and the battery-side channels 23a-23d each have a step shape.

The hook 24 is disposed on a front-upper portion of the upper-part case 14. The hook 24 is made of synthetic resin (polymer) and integrally comprises a manipulatable part (button) 24a and a projection (protruding part) 24b. The manipulatable part 24a is provided on a front surface 14a of the upper-part case 14. The hook 24 is held, such that it is moveable in the up-down direction, by the upper-part case 14. The hook 24 is biased in the upward direction by a compression spring (not shown) and moves downward when the manipulatable part 24a or the projection 24b is manually pressed downward. When the battery pack 2 has been mounted on the power tool 200 or the charger 300, the projection 24b engages with a housing (not shown) of the power tool 200 or with a housing 304 (refer to FIG. 25B) of the charger 300, and thereby fixes the battery pack 2 to the power tool 200 or the charger 300. When the battery pack 2 is to be removed from the power tool 200 or the charger 300, the user presses the manipulatable part 24a downward, and thereby the projection 24b moves downward. In this state, by sliding the battery pack 2 relative to the power tool 200 or the charger 300, the battery pack 2 can be removed from the power tool 200 or the charger 300. The manipulatable part 24a has a shape that is hollowed inward. Consequently, when the user hooks his or her finger in the manipulatable part 24a and presses the manipulatable part 24a downward, the manipulatable part 24a can be pressed downward without the finger slipping.

The vent 26 is provided rearward of the slide rails 20. The vent 26 is provided in a rear part of a rearward-upper surface 14b2 of the outer case 12. The rearward-upper surface 14b2 is located downward of the forward-upper surface 14b1 and upward of the base parts 20a of the slide rails 20. A battery-side channel (recessed part) 27 is provided partially rightward, partially leftward, and forward of the vent 26. The base or bottom of the battery-side channel 27 is provided (extends) slightly downward of (parallel to) the rearward-upper surface 14b2. That is, the rearward-upper surface 14b2 and the battery-side channel 27 together form a stepped shape. A charger-side ridge part (ridge) 306 (refer to FIG. 25B), which has a shape that matches (corresponds to, is complementary to) the battery-side channel 27, is provided on the charger 300. Consequently, when the battery pack 2 is to be mounted on the charger 300, the charger-side ridge part 306 is inserted into the battery-side channel 27.

Figure 4B:
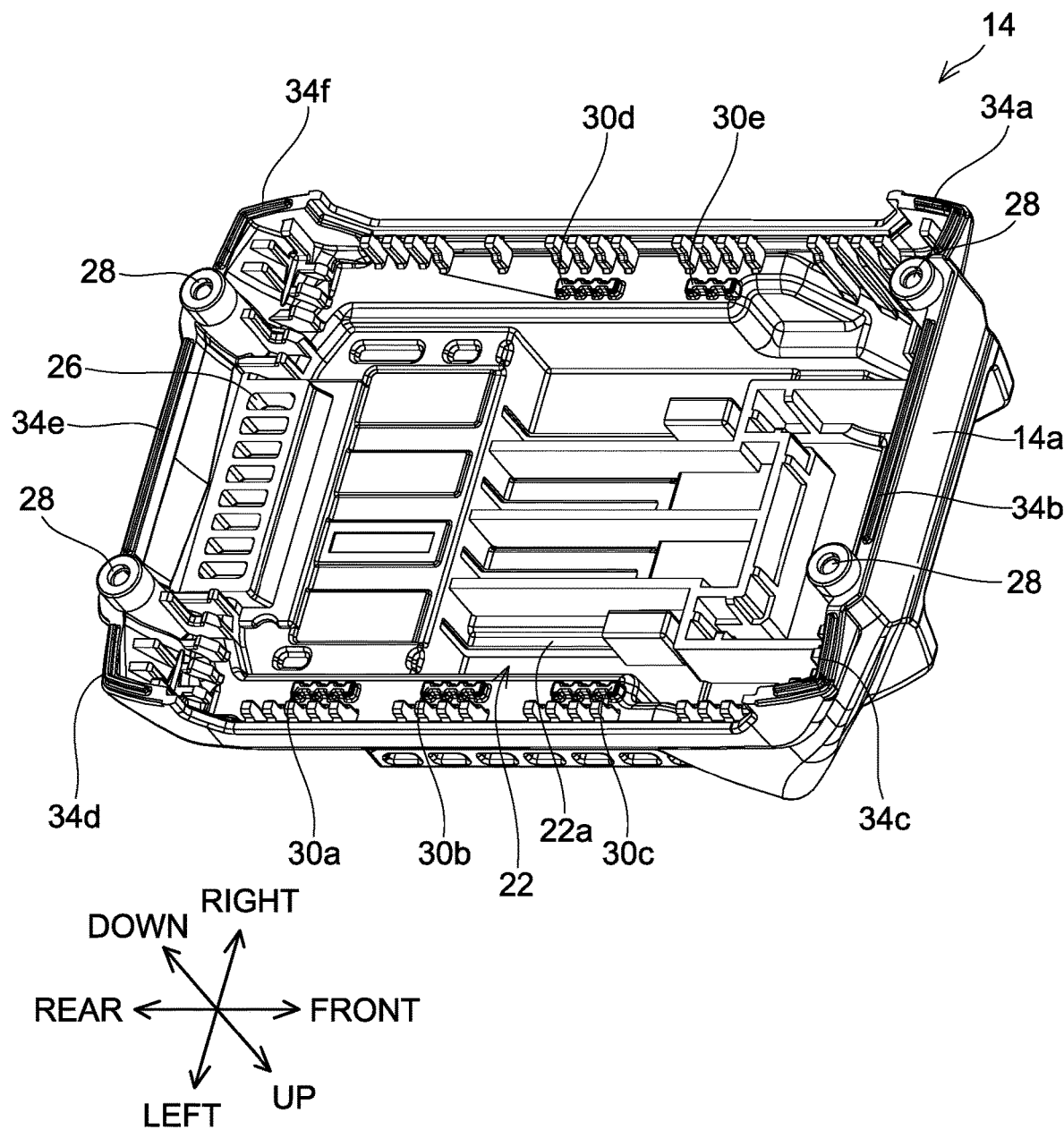
FIG. 4B is an oblique view, viewed from the front, the left, and below, of the upper-part case 14 according to the first embodiment.
Figure 5:
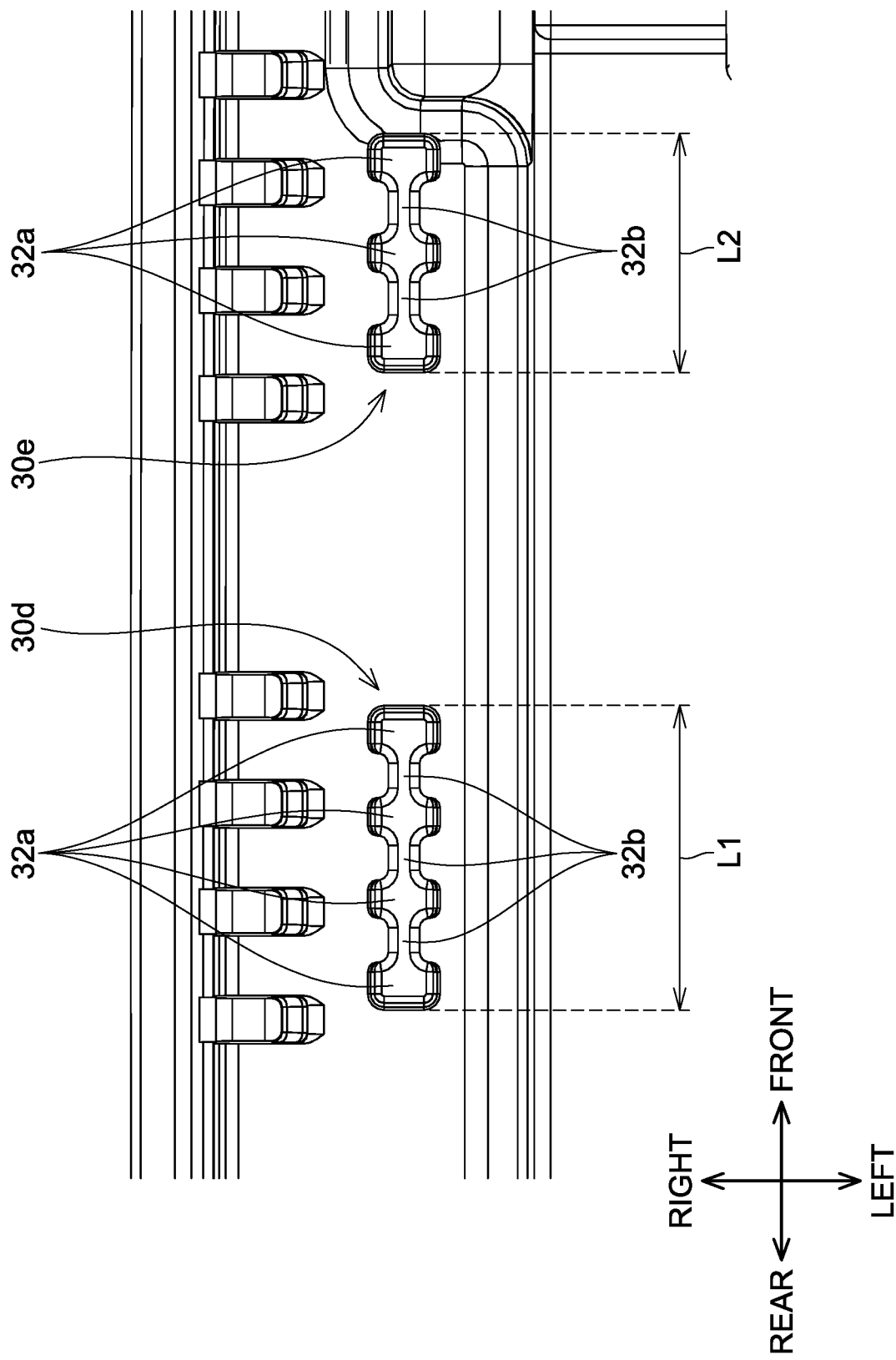
FIG. 5 is an enlarged view of the broken-line area V in FIG. 4A.

As shown in FIG. 4A, four screw holes 28 are provided in the upper-part case 14 and first ridge parts (first ridges, first projections) 30, more specifically five first ridge parts 30a-30e, are provided on the upper-part case 14. The screws 18 (refer to FIG. 2) are respectively screwed into the four screw holes 28. As shown in FIG. 4B, the five first ridge parts 30a-30e protrude downward (i.e., toward the side of a cell case 80) from the lower surface of the upper-part case 14. FIG. 4C shows one of the first ridge parts (30d), which is provided downward of (extends integrally downward from) the slide rail 20 (in greater detail, downward of (from) the base part 20a), i.e., inward of the upper-part case 14. The other first ridge parts 30, i.e. the other four first ridge parts 30a-30c, 30e, are likewise provided downward of the slide rails 20. As shown in FIG. 4A and in an enlarged view in FIG. 5, the first ridge parts 30 each comprise thick-wall parts 32a and thin-wall parts 32b. That is, the thickness (length, dimension) of each thick-wall part 32a in the left-right direction is greater than the thickness (length, dimension) of each thin-wall part 32b in the left-right direction. In each first ridge part 30, the thick-wall parts 32a and the thin-wall parts 32b are formed in an alternating manner in the front-rear direction. As shown in FIG. 4A, the first ridge parts 30a-30d each comprise four of the thick-wall parts 32a and three of the thin-wall parts 32b. The first ridge part 30e comprises three of the thick-wall parts 32a and two of the thin-wall parts 32b. As shown in FIG. 5, length L1 of the first ridge parts 30a-30d in the front-rear direction is longer than length L2 of the first ridge part 30e in the front-rear direction.

As shown in FIG. 4A, second ridge parts 34, more specifically six second ridge parts 34a-34f, for aligning the upper-part case 14 and the lower-part case 15 are provided on the upper-part case 14, as will be further explained below.

Configuration of Lower-Part Case 15

Figure 2:
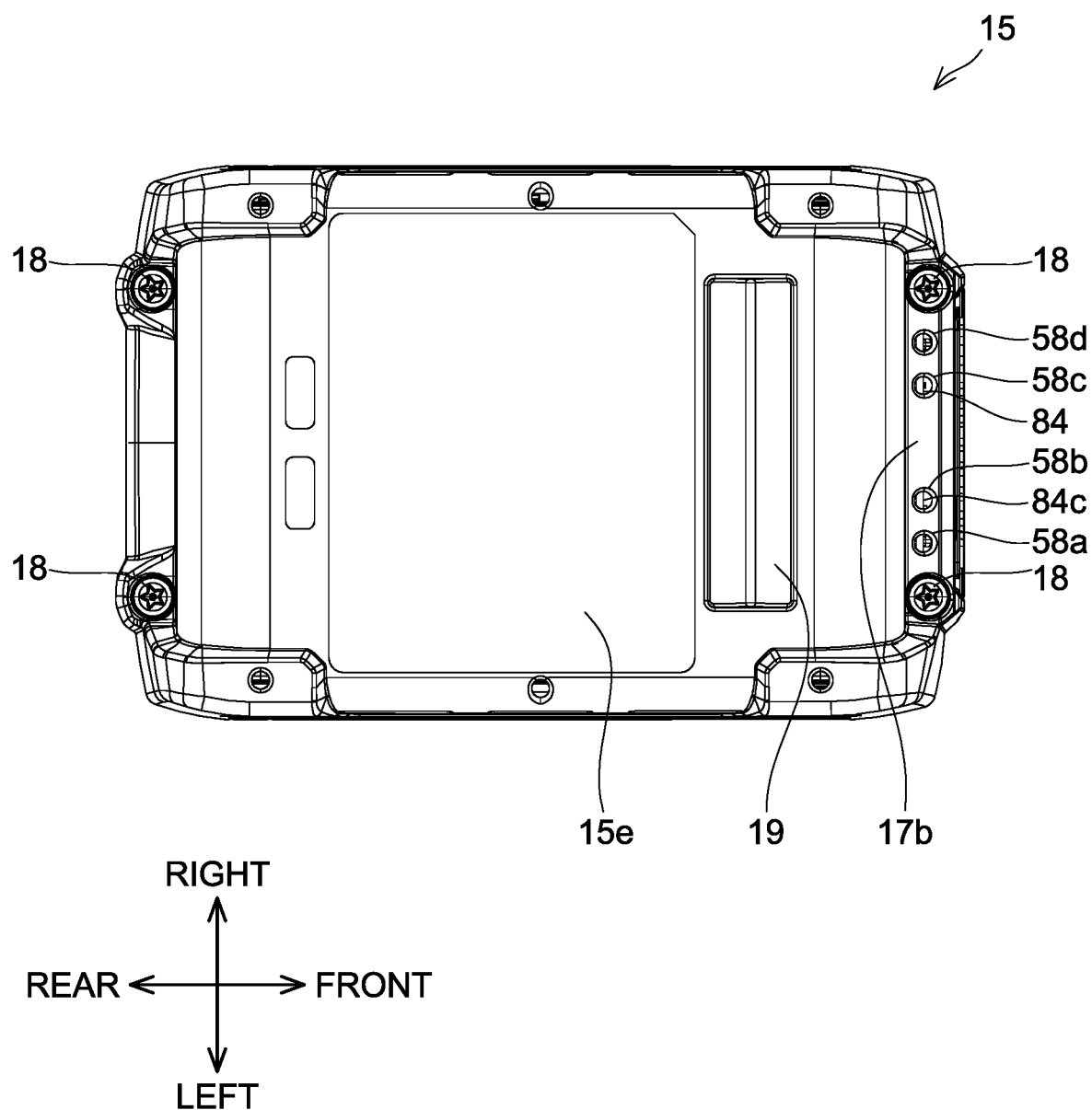
FIG. 2 is a bottom view, viewed from below, of the battery pack 2 according to the first embodiment.
Figure 8:
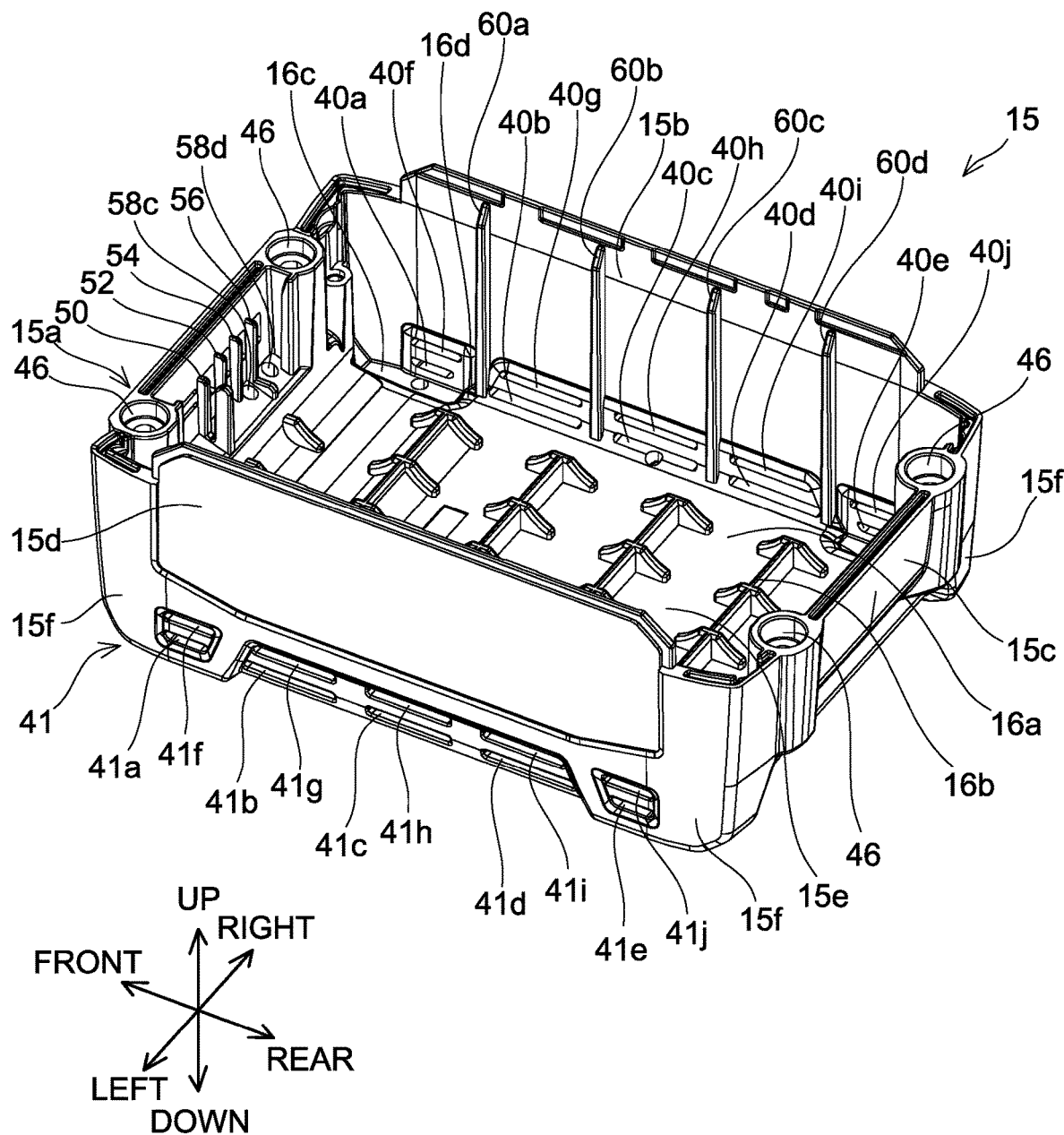
FIG. 8 is an oblique view, viewed from the left, the rear, and above, of the lower-part case 15 according to the first embodiment.
Figure 13A:
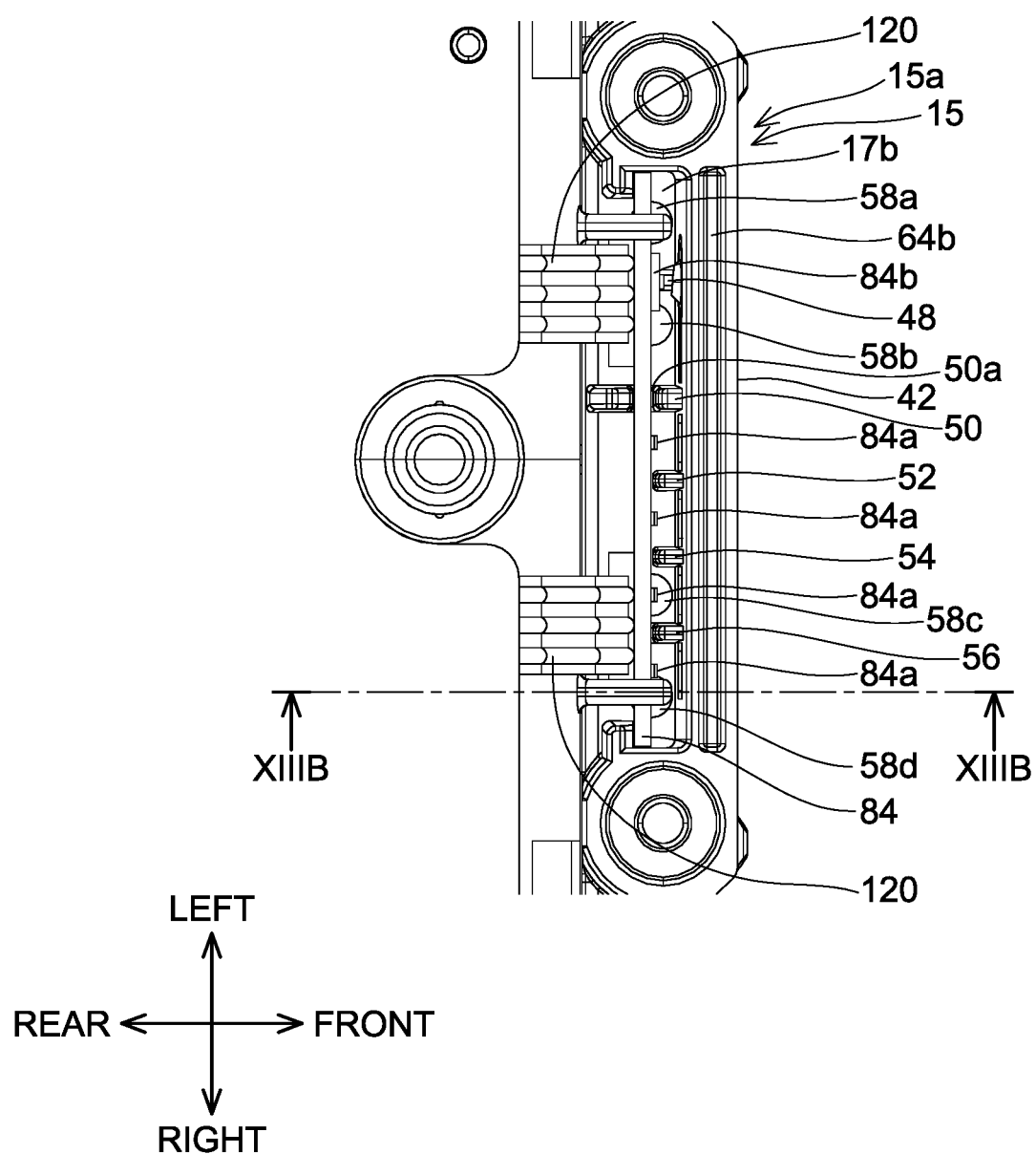
FIG. 13A is an enlarged view of the broken-line area XIII in FIG. 12A.
Figure 13B:
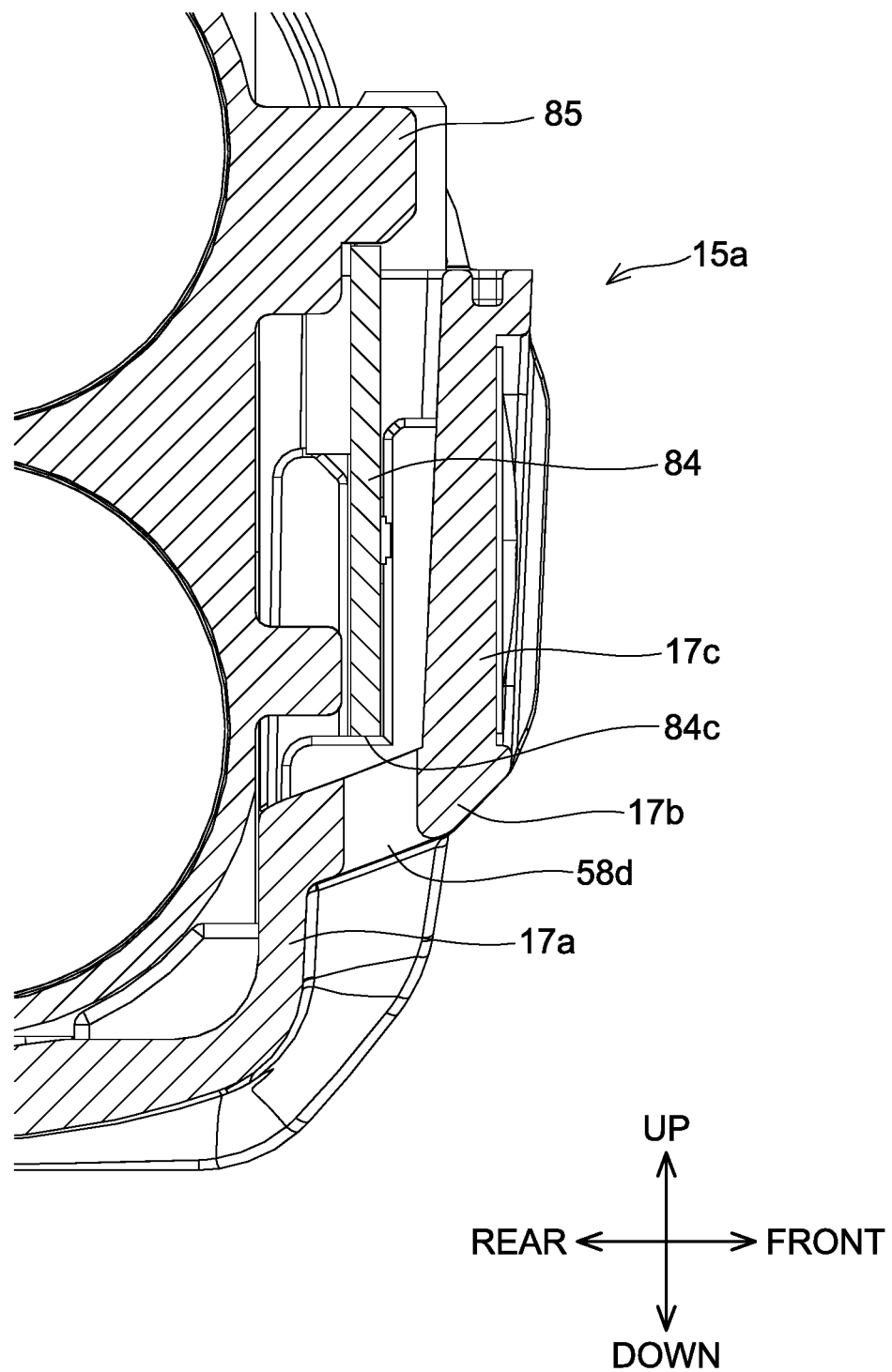
FIG. 13B is a cross-sectional view taken along line XIIIB-XIIIB in FIG. 13A.

As shown in FIG. 1B and FIG. 8, the lower-part case 15 has a front surface (front wall) 15a, a right-side surface (right-side wall) 15b, a rear surface (rear wall) 15c, a left-side surface (left-side wall) 15d, and a bottom wall (bottom plate) 15e. The front surface 15a has: a first upward-extending surface 17a, which extends perpendicularly to the lower surface of the bottom wall 15e; a tilted surface 17b, which is tilted (oblique) with respect to the lower surface of the bottom wall 15e; and a second upward-extending surface 17c, which extends perpendicularly to the lower surface of the bottom wall 15e. As shown in FIG. 13B, the tilted surface 17b is tilted such that it goes rearward as it goes downward. As shown in FIG. 1A, a vent 40 and a display part 42 are provided on the lower-part case 15. The display part 42 is provided on the front surface 15a of the lower-part case 15. The display part 42 comprises remaining-battery-charge display parts (e.g., LEDs) 42a, which are configured (adapted) to indicate (notify) the remaining charge of the battery pack 2 to the user, and a button 42b, which is depressible to switch ON and OFF the illumination of the remaining-battery-charge display parts (e.g., LEDs) 42a to indicate the amount of remaining charge in four levels (e.g., one illuminated LED means 0-25% remaining charge, two illuminated LEDs means 25-50% remaining charge, three illuminated LEDs means 50-75% remaining charge and four illuminated LEDs means 75-100% remaining charge). In addition, as shown in FIG. 1B, vents (drainage holes) 58a-58d are provided in the tilted surface 17b of the lower-part case 15. In addition, a hook part 19 is provided on the lower surface of the bottom wall 15e of the lower-part case 15. The hook part 19 is used when removing the battery pack 2 from the power tool 200 or the charger 300. Specifically, the user pushes the manipulatable part 24a (refer to FIG. 1A) downward with his or her thumb while his or her index finger and/or middle finger is hooked in the hook part 19.

As shown in FIG. 3, the vent 40 is provided at a lower portion of the right-side surface 15b of the lower-part case 15. The vent 40 is configured with ten holes 40a-40j. The ten holes 40a-40j are disposed such that they are lined up (colinear) in two levels: an upper level and a lower level. Of the five holes 40a-40e provided in the lower level, the length of the hole 40a, which is provided on the rearmost side, and of the hole 40e, which is provided on the frontmost side, in the front-rear direction is shorter than the length of the (middle) holes 40b-40d in the front-rear direction. In addition, of the five holes 40f-40j provided in the upper level, the length of the hole 40f, which is provided on the rearmost side, and of the hole 40j, which is provided on the frontmost side, in the front-rear direction is shorter than the length of the (middle) holes 40g-40i in the front-rear direction. In addition, as shown in FIG. 8, a vent 41, which is configured in the same manner as the vent 40, is also provided at the lower portion of the left-side surface 15d of the lower-part case 15. The vent 41 is also configured with ten holes 41a-41j. It is noted that holes 40a, 40e need not be the same width, but it is preferably that the width(es) of holes 40a, 40e is (are) shorter than the width(es) of holes 40b-40d. The same applies the width(es) of the (outer) holes 40f, 40j and the width(es) of the (inner) holes 40g-40h. Similarly, the same applies to the widths of the ten holes 41a-41j.

Figure 6:
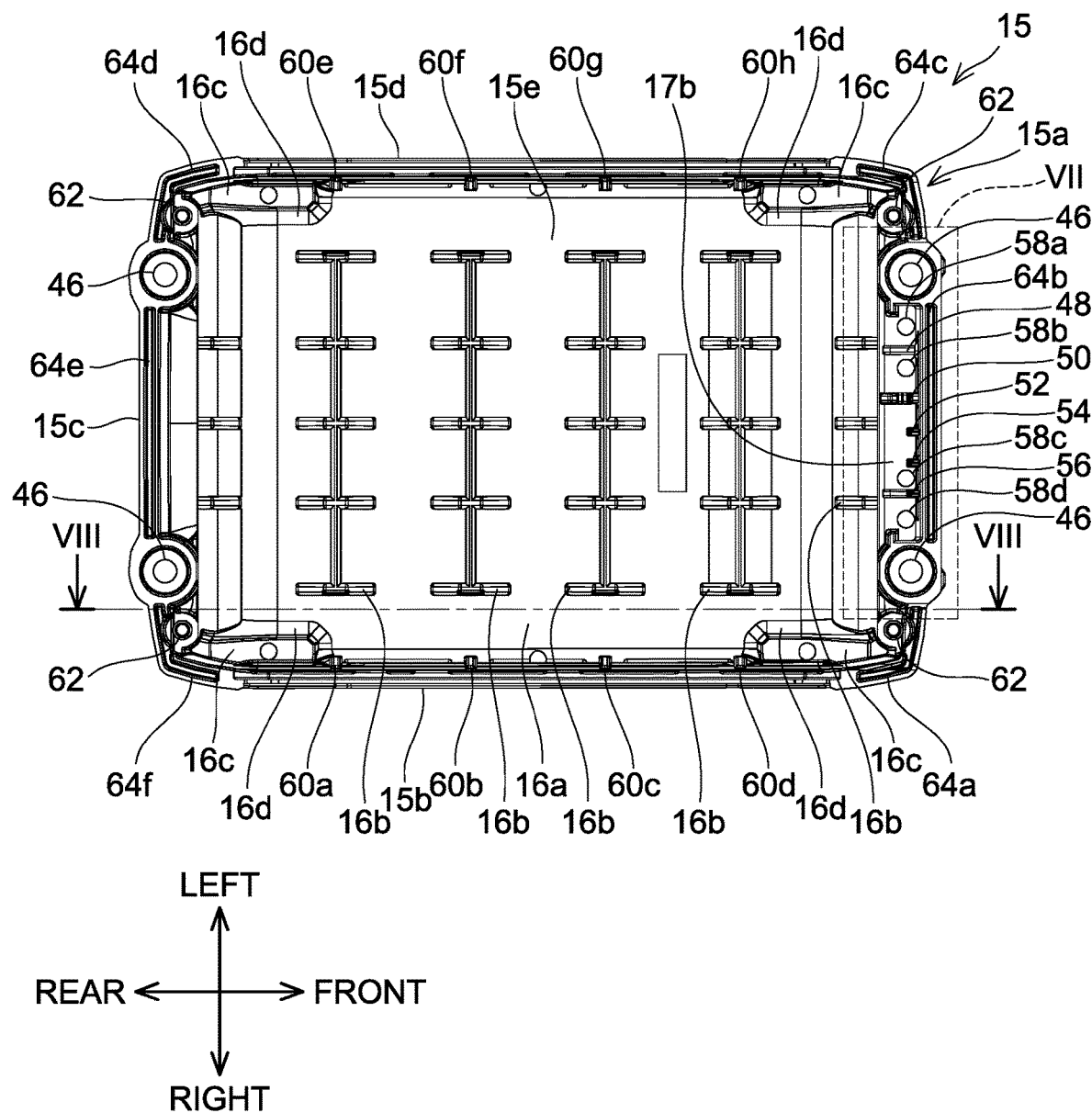
FIG. 6 is a top view, viewed from above, of a lower-part case 15 according to the first embodiment.
Figure 18:
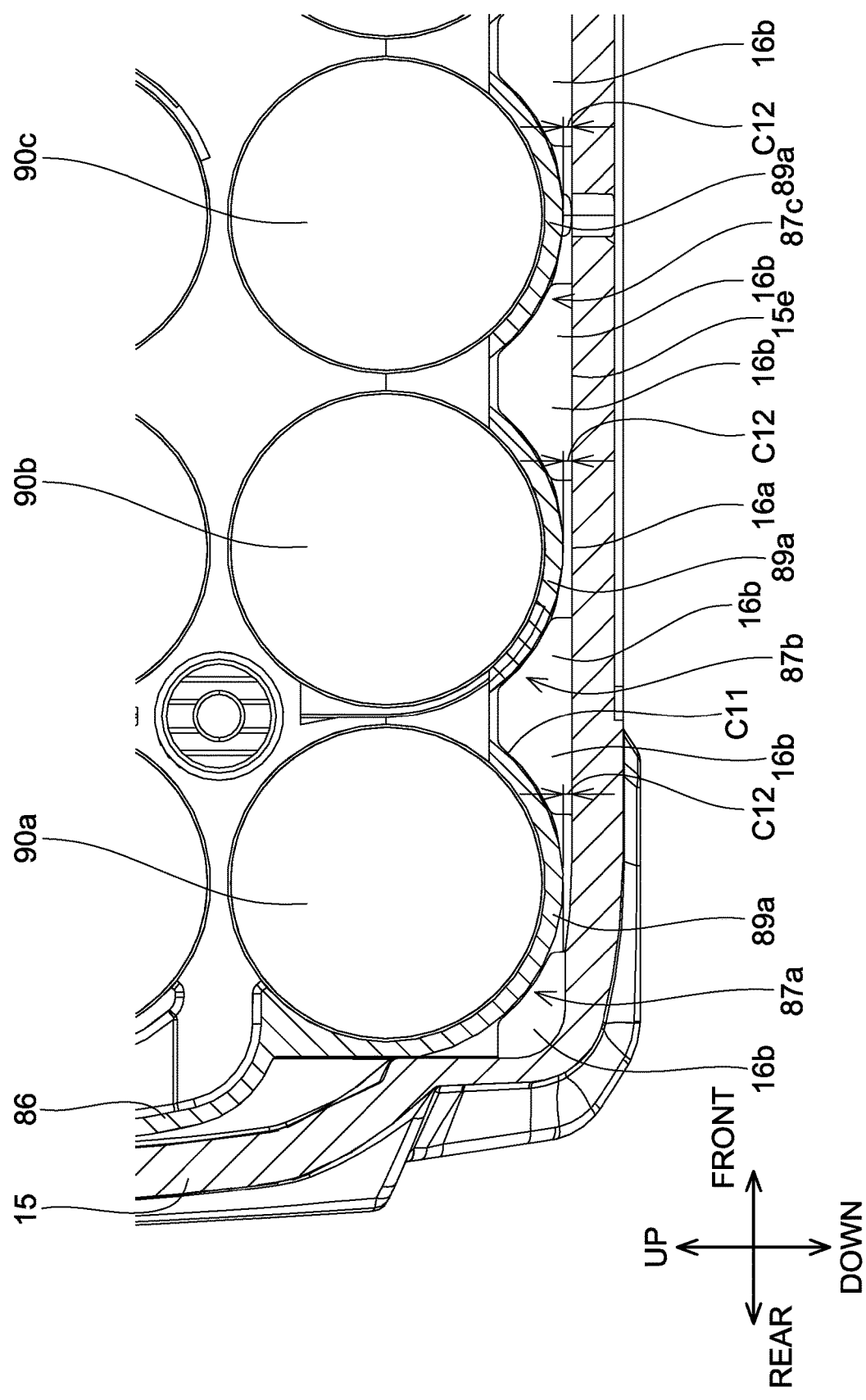
FIG. 18 is a cross-sectional view, viewed from the right, of the battery pack 2 according to the first embodiment.
Figure 19:
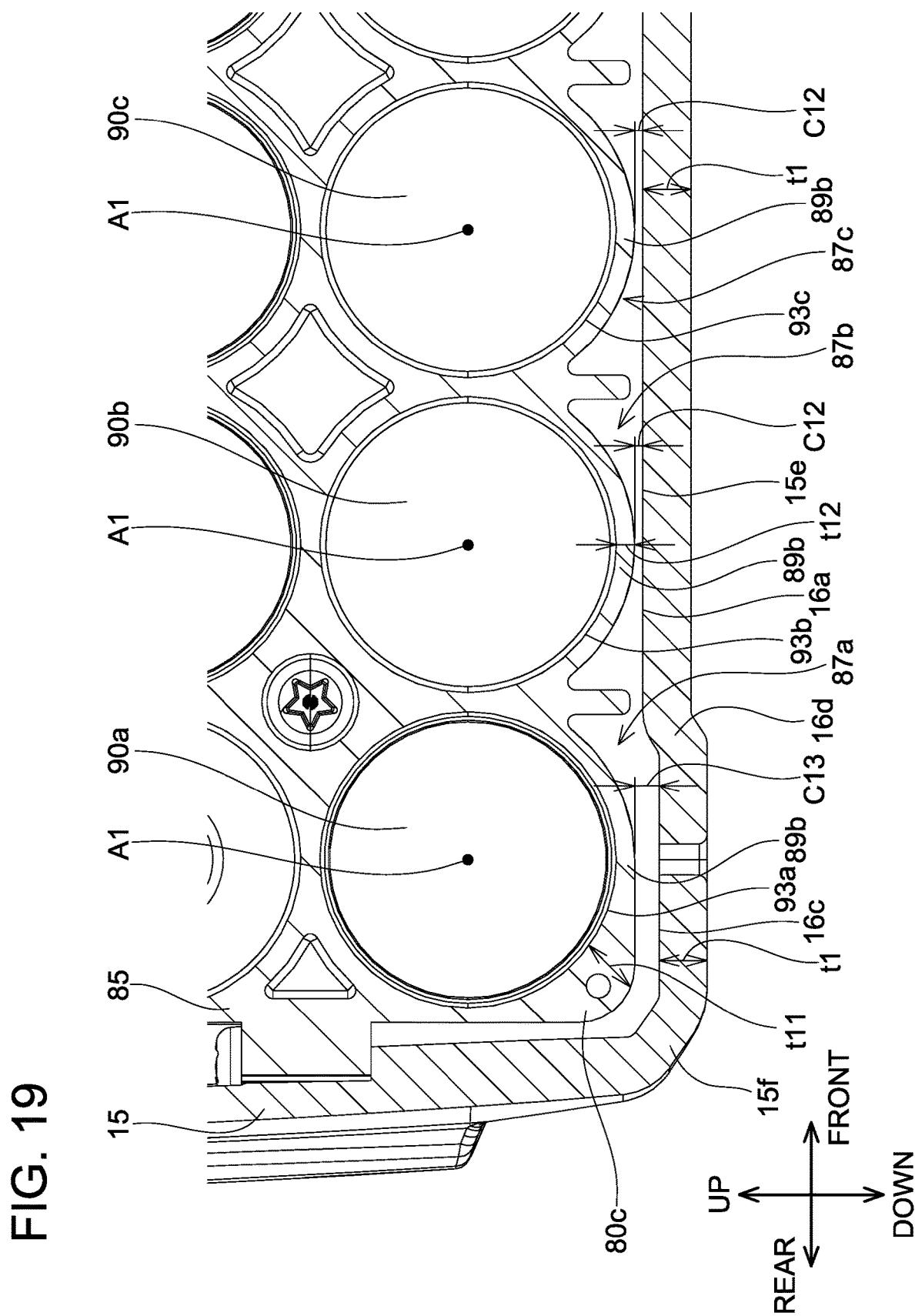
FIG. 19 is a cross-sectional view, viewed from the right, of the battery pack 2 according to the first embodiment.

In addition, as shown in FIG. 6, four screw holes 46, five front-part ribs 48, 50, 52, 54, 56, the four vents 58a-58d, eight side-part ribs (vertical ribs) 60a-60h, four screw holes 62, and six second recessed parts 64a-64f are provided on or in the lower-part case 15. The four screw holes 46 are provided at locations corresponding to the four screw holes 28 (refer to FIG. 4A) of the upper-part case 14. The four screw holes 62 are utilized to fix (secure) the lower-part case 15 and the battery module 10 to one another. The second recessed parts 64a-64f are provided at locations corresponding to the second ridge parts 34a-34f (refer to FIG. 4A), respectively, of the upper-part case 14. An upper surface of the bottom wall 15e of the lower-part case 15 comprises a flat part (planar portion) 16a, projections (protruding parts) 16b, depressions (recessed parts) 16c, and step parts (steps) 16d. The projections 16b protrude (project) upward from the flat part 16a. As shown in FIG. 18, the projections 16b each have a shape that conforms to a lower surface of the cell case 80, which is described below. As shown in FIG. 6, the depressions 16c are provided on (in, at) corner parts 15f at the four corners of the bottom wall 15e of the lower-part case 15. As shown in FIG. 19, each of the step parts 16d connects the flat part 16a and its corresponding depression 16c. The step parts 16d descend downward as they go from inward to outward of the lower-part case 15. As shown in FIG. 19, thickness t1 of the lower-part case 15 at the flat part 16a and thickness t1 of the lower-part case 15 at the depressions 16c are the same. Thus, corresponding step portions are formed at the four corners of the lower surface of the bottom wall 15e such that, when placed on a surface, the battery pack 2 contacts the surface only at the four corners 15f. This design helps to ensure that, if the battery pack 2 is placed on a surface having a water puddle thereon, it is less likely that water will enter into the vents 40, 41.

Figure 7:
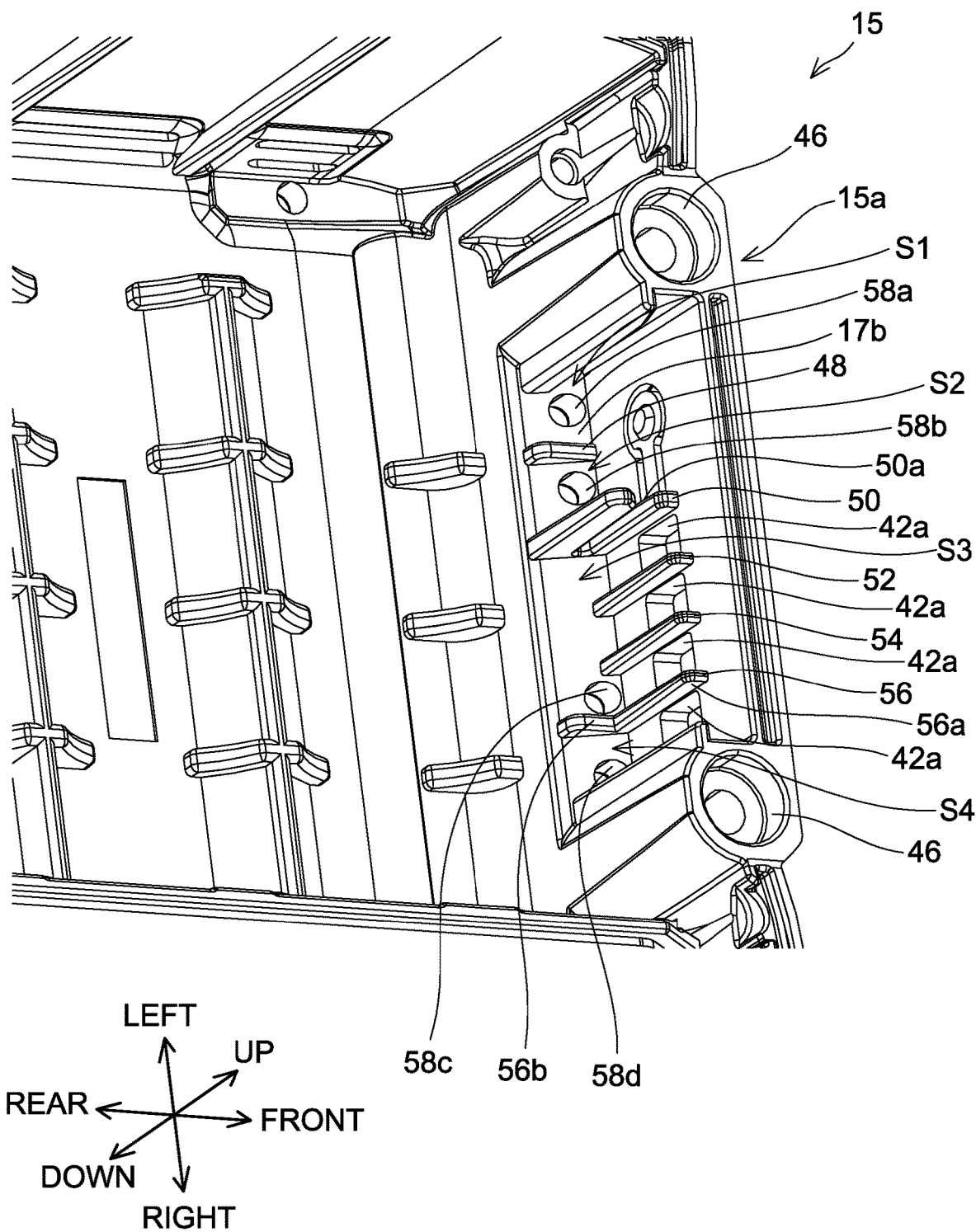
FIG. 7 is an enlarged, oblique view, viewed from the rear, the right, and above, of the broken-line area VII in FIG. 6.

As shown in FIG. 7, the front-part ribs 48, 50, 52, 54, 56 are provided on the tilted surface 17b. The front-part ribs 48, 50, 52, 54, 56 extend upward from the tilted surface 17b and rearward from the front surface 15a of the lower-part case 15. A rear end of the front-part rib 48 coincides substantially with a rear end of the tilted surface 17b, and an upper end of the front-part rib 48 coincides substantially with an uppermost end of the tilted surface 17b. The upper surface of the front-part rib 48 is a flat surface. The rear end of the front-part rib 50 substantially coincides with a rear end of the tilted surface 17b, and an upper end of the front-part rib 50 is located upward of an upper end of the remaining-battery-charge display parts 42a. In addition, a groove part (groove) 50a is provided on (in) the front-part rib 50. An LED board 84 (refer to FIG. 13A), which is described below, passes through the interior of the groove part 50a. Rear ends of the front-part ribs 52, 54 are located forward of a rear end of the tilted surface 17b. In addition, upper ends of the front-part ribs 52, 54 are located upward of upper ends of the remaining-battery-charge display parts 42a. The front-part rib 56 comprises a light-shielding wall part 56a and a flat part 56b. The structure of the light-shielding wall part 56a is the same as the front-part ribs 52, 54. The structure of the flat part 56b is the same as the front-part rib 48.

The front-part ribs 48, 50, 56 sectionalize (compartmentalize) the space upward of the tilted surface 17b into four spaces S1-S4. Specifically, the first space S1 is demarcated by the front-part rib 48, the second space S2 is demarcated by the front-part ribs 48, 50, the third space S3 is demarcated by the front-part ribs 50, 56, and the fourth space S4 is demarcated by the front-part rib 56. The vents 58a-58d are provided in the spaces S1-S4, respectively. The vents 58a-58d pass through the lower-part case 15 in the up-down direction. Consequently, if any water enters the interior of the outer case 12, such water can flow into the spaces S1-S4 and be discharged via the vents 58a-58d.

As shown in FIG. 6, the side-part ribs 60a-60d extend leftward from the right-side surface 15b of the lower-part case 15. In addition, as shown in FIG. 8, the lower ends of the side-part ribs 60a-60d extend upward from the upper surface of the bottom wall 15e of the lower-part case 15. The upper ends of the side-part ribs 60a-60d are located slightly downward of the upper end of the lower-part case 15. The side-part ribs 60a-60d are provided between respective holes 40a-40j of the vent 40 that are adjacent in the front-rear direction. Specifically, the (first) side-part rib 60a is provided between the holes 40a, 40f and the holes 40b, 40g, the (second) side-part rib 60b is provided between the holes 40b, 40g and the holes 40c, 40h, the (third) side-part rib 60c is provided between the holes 40c, 40h and the holes 40d, 40i, and the (fourth) side-part rib 60d is provided between the holes 40d, 40i and the holes 40e, 40j. The structures of side-part ribs 60e-60h are the same as the side-part ribs 60a-60d, with the exception that they extend rightward from the left-side surface 15d of the lower-part case 15. The side-part ribs 60a-60h define vertically isolated channels that reduce the likelihood of a short circuit between battery cells 90a-90j in the event that water were to penetrate into the interior of the battery pack 2 via the holes 40a-40j. The side-part ribs 60a-60h also position the battery module 10 in the left-right direction of the battery pack 2 so that vertical air channels for heat dissipation are defined between the left and right interior walls of the outer case 12 and the corresponding left and right sides of the battery module 10, as will further be described below.

Configuration of Battery Module 10

Figure 9A:
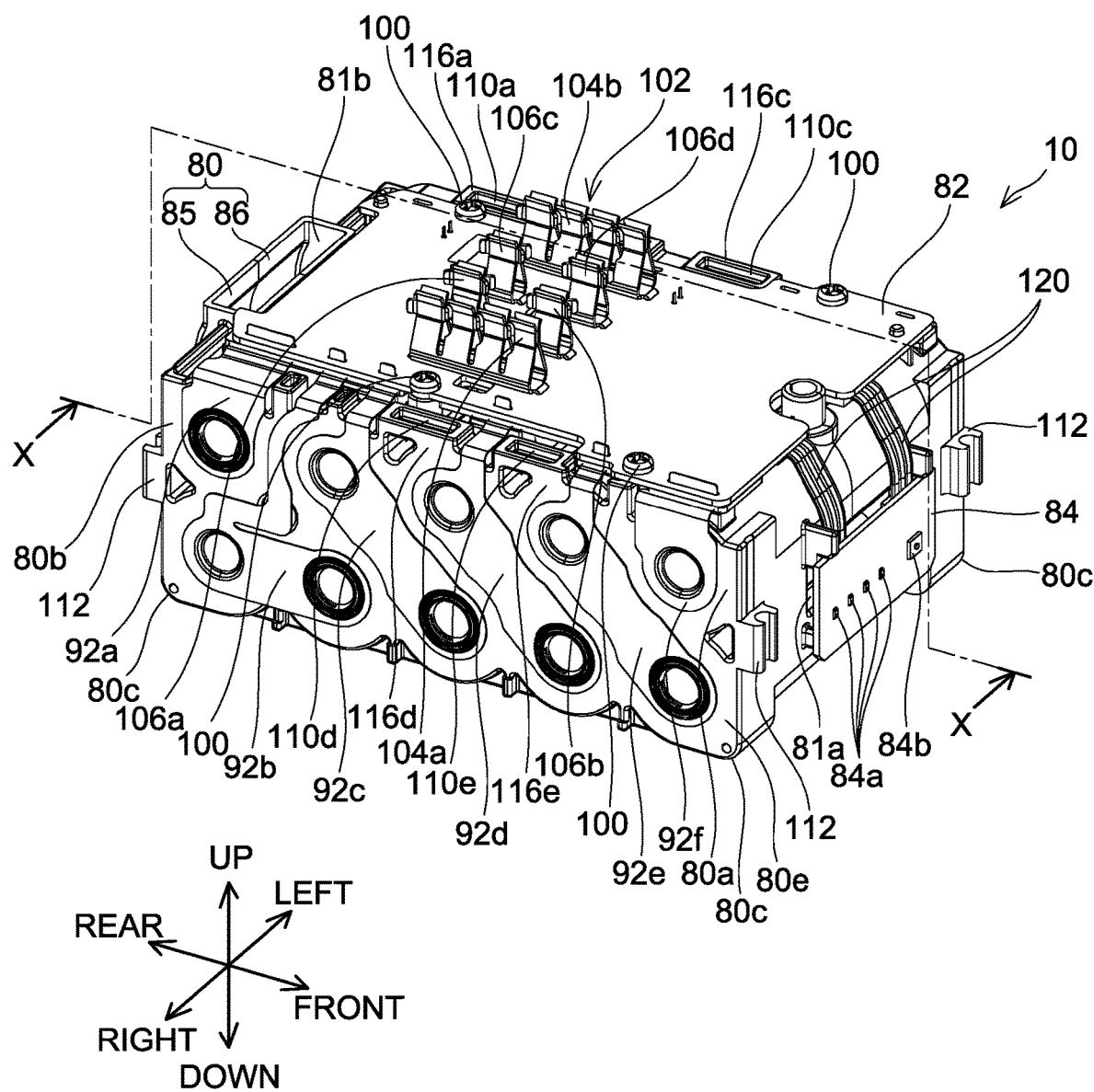
FIG. 9A is an oblique view, viewed from the front, the right, and above, of a battery module 10 according to the first embodiment.
Figure 9B:
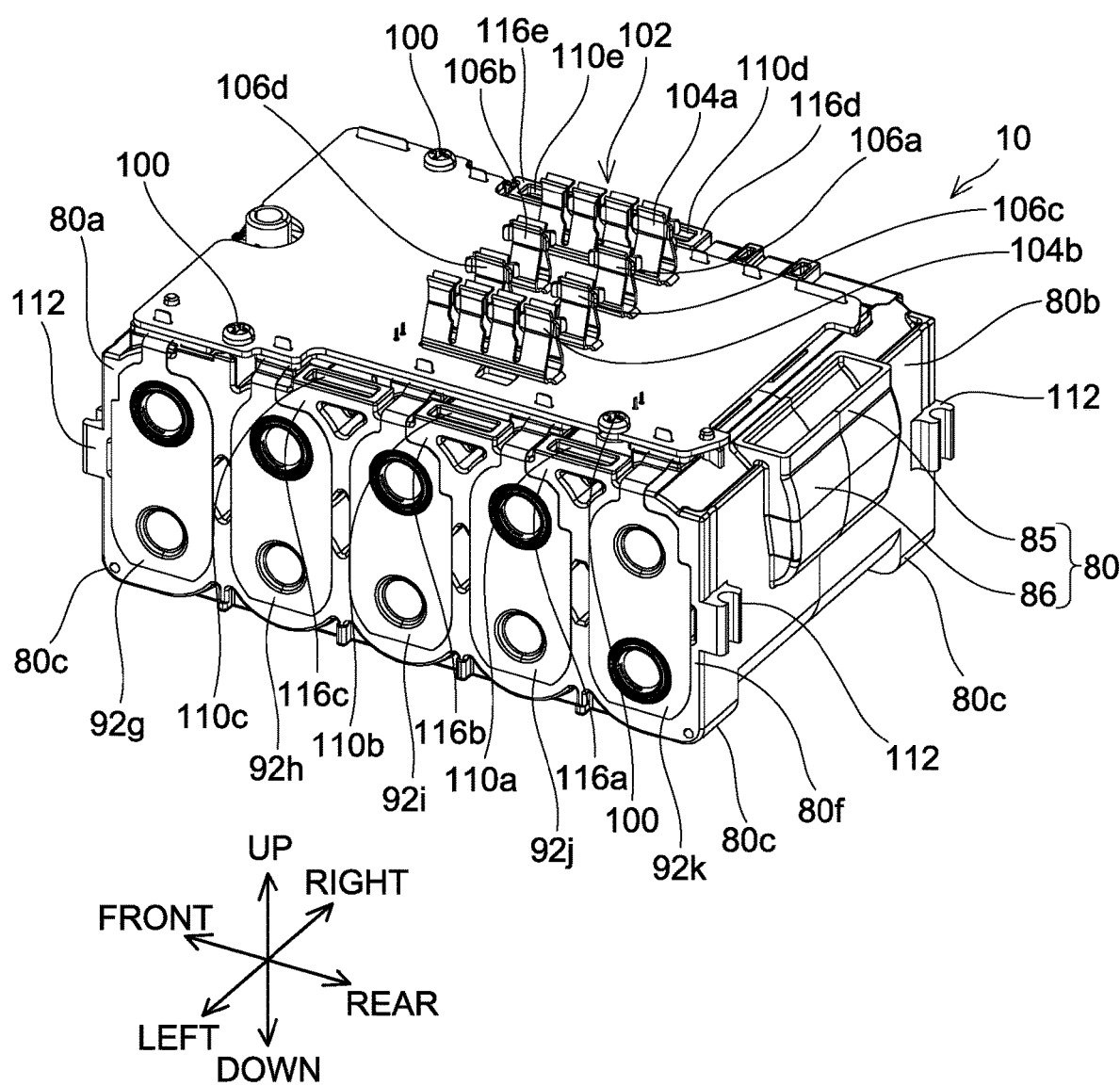
FIG. 9B is an oblique view, viewed from the rear, the left, and above, of the battery module 10 according to the first embodiment.

As shown in FIG. 9A, the battery module 10 comprises the cell case (battery cell case) 80, a control board (circuit board) 82, and the LED board 84. The cell case 80 is made of a rigid, electrically-insulating material, e.g., a synthetic resin (polymer) material such as polyamide. As shown in FIG. 11A, the cell case 80 is divided into a right cell case (right cell case half) 85 and a left cell case (left cell case half) 86. A (first) vent 81a is provided in a front part 80a of the cell case 80, and a (second) vent 81b is provided in a rear part 80b of the cell case 80. As shown in FIG. 11B, thick-wall parts 80c are respectively provided at corner portions at the four corners of a lower portion of the cell case 80. As shown in FIG. 19, thickness t11 of each of the thick-wall parts 80c is greater than thickness t12 of the respective cell-holding parts 87, which are described below. As shown in FIGS. 11A and 11B, an upper portion (that includes an upper surface 80d) of the cell case 80 has a shape that matches (corresponds to, is complementary with, fits with) side surfaces of battery cells 90f-90j (refer to FIGS. 10 and 16), which are described below, in the longitudinal direction. Hollow parts (depressions) 80g are provided on (in) the upper surface 80d of the cell case 80 between adjacent battery cells 90f-90j. Four screw bosses 83 are provided on the upper surface 80d of the cell case 80 and are used to connect the control board 82 and the cell case 80 to one another. As shown, e.g., in FIG. 9B, protruding parts (protrusions) 116a-116c protrude upward from the upper surface 80d of an upper portion of a left-side surface 80f of the cell case 80. As shown in FIG. 11C, the protruding parts 116a-116c are disposed such that they each span (partially overlap, bridge) two adjacent battery cells 90f-90i of the upper level of the battery cells 90a-90j. First recessed parts (recesses, blind holes) 110a-110c are respectively provided on (in) the protruding parts 116a-116c. The first recessed parts 110a-110c are provided at locations corresponding to the first ridge parts 30a-30c (refer to FIG. 4A), respectively, of the upper-part case 14. As shown in FIG. 9A, protruding parts 116d, 116e protrude upward from the upper surface 80d of an upper portion of a right-side surface 80e of the cell case 80. As shown in FIG. 11C, the protruding parts 116d, 116e are disposed such that they span two adjacent battery cells 90g-90i. First recessed parts 110d, 110e are provided on (in) the protruding parts 116d, 116e. The first recessed parts 110d, 110e are provided at locations corresponding to the first ridge parts 30d, 30e (refer to FIG. 4A), respectively, of the upper-part case 14. As shown in FIGS. 9B and 11C, the protruding parts 116a-116e and the first recessed parts 110a-110e are each provided outward of the control board 82 in the left-right direction when the battery module 10 is viewed from above (i.e. in plan view). In other words, in the left-right direction of the battery pack 2, the control board 82 is disposed entirely between the protruding parts 116a-116c on the left side and the protruding parts 116d-116e on the right side. The first recessed parts 110a-110e are respectively provided between two adjacent lead (conductive) plates 92. More specifically, as shown in FIG. 9A, the protruding part 116d and the first recessed part 110d are provided between lead plates 92c, 92d, and the protruding part 116e and the first recessed part 110e are provided between lead plates 92d, 92e. In addition, as shown in FIG. 9B, the protruding part 116a and the first recessed part 110a are provided between lead plates 92j, 92k, the protruding part 116b and the first recessed part 110b are provided between lead plates 92i, 92j, and the protruding part 116c and the first recessed part 110c are provided between lead plates 92h, 92i.

As shown in FIG. 11B, the cell-holding parts 87 include ten cell-holding parts 87a-87j that are provided on the right cell case 85. The ten cell-holding parts 87a-87j are disposed such that they are lined up in two levels: an upper level and a lower level. As shown in FIG. 18, which is a cross-sectional view of the battery pack 2 at its center position in the left-right direction, the cell-holding parts 87a-87c have center holding parts 89a, which hold the lower level of the battery cells 90a-90e at their centers and are described below. In addition, as shown in FIG. 19, which is a cross-sectional view of the battery pack 2 at the location at which the right-side, rearward depression 16c of the lower-part case 15 is provided, the cell-holding parts 87a-87c have end-surface-side holding parts 89b, which hold the right-end-surface sides of the battery cells 90a-90e in the longitudinal direction. Although not shown, the cell-holding parts 87d, 87e also have center holding parts and end-surface-side holding parts. As shown in FIG. 11B, coupling parts 88, which are for coupling the right cell case 85 and the left cell case 86, are provided between the cell-holding parts 87a, 87b, 87f, 87g and between the cell-holding parts 87d, 87e, 87i, 87j. It is noted that, although not shown, ten cell-holding parts, which correspond to the ten cell-holding parts 87a-87j of the right cell case 85, and two coupling parts, which correspond to the two coupling parts 88 of the right cell case 85, are also provided on the left cell case 86.

Figure 10:
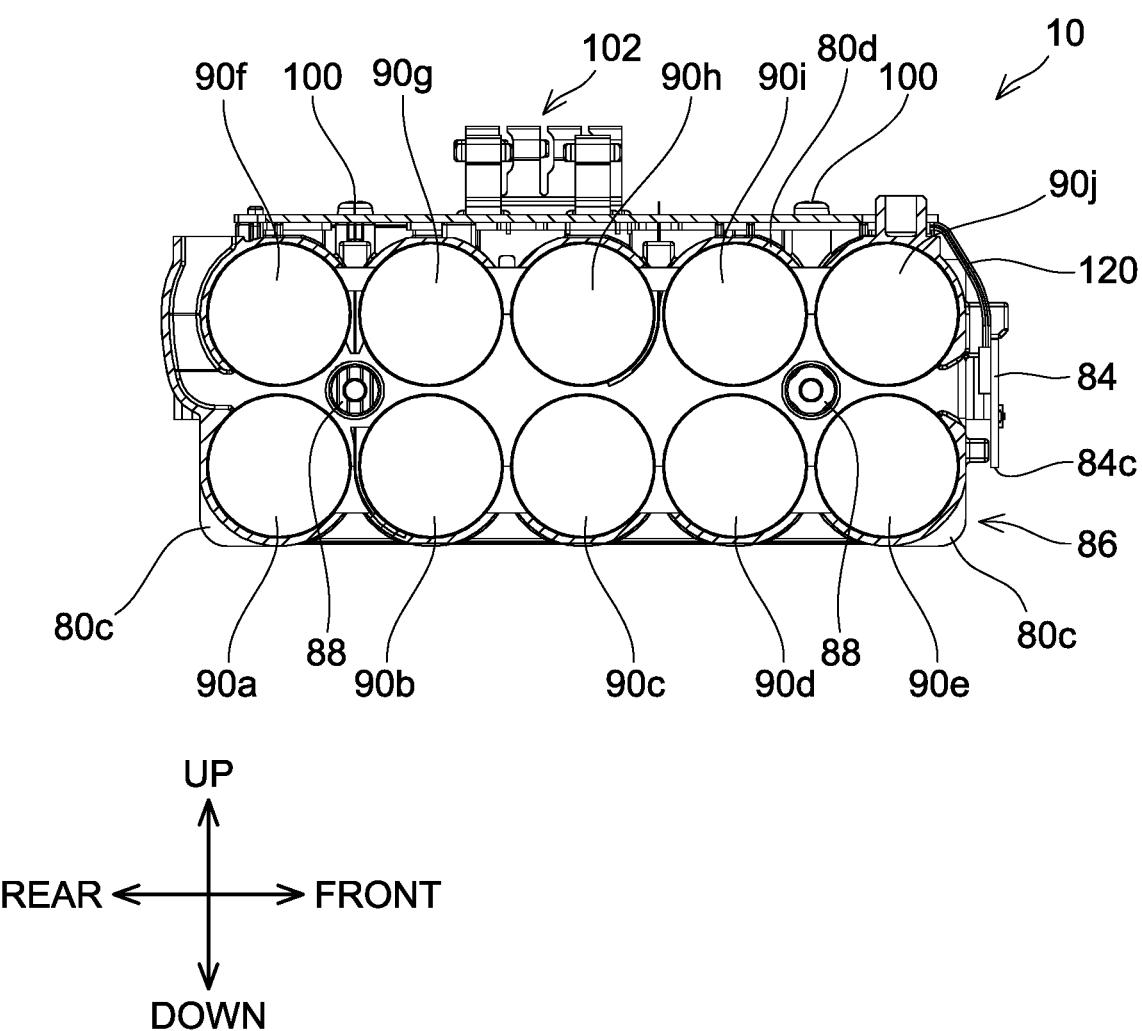
FIG. 10 is a cross-sectional view taken along line X-X in FIG. 9A.
Figure 11A:
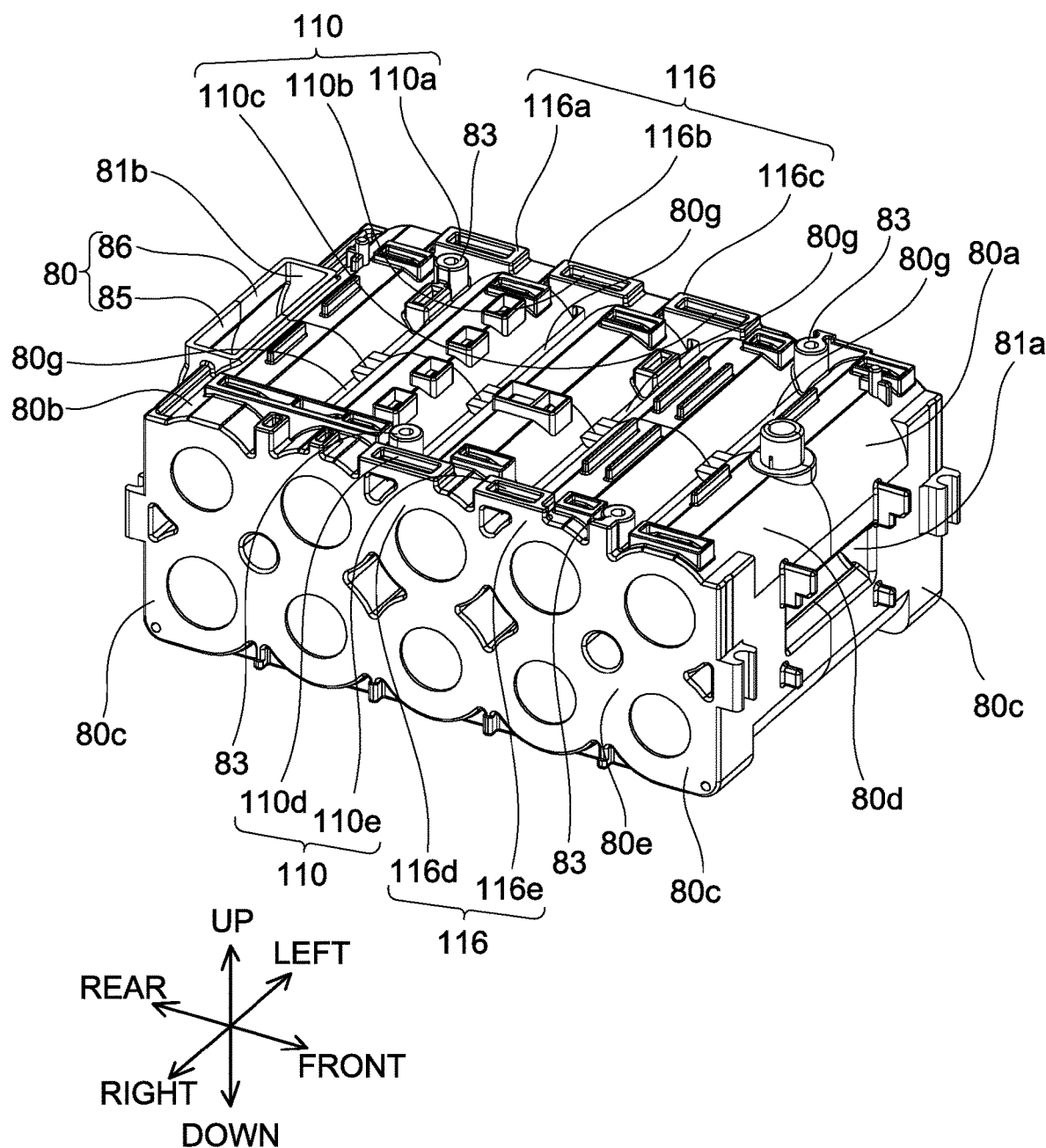
FIG. 11A is an oblique view, viewed from the front, the right, and above, of a cell case 80 according to the first embodiment.
Figure 11B:
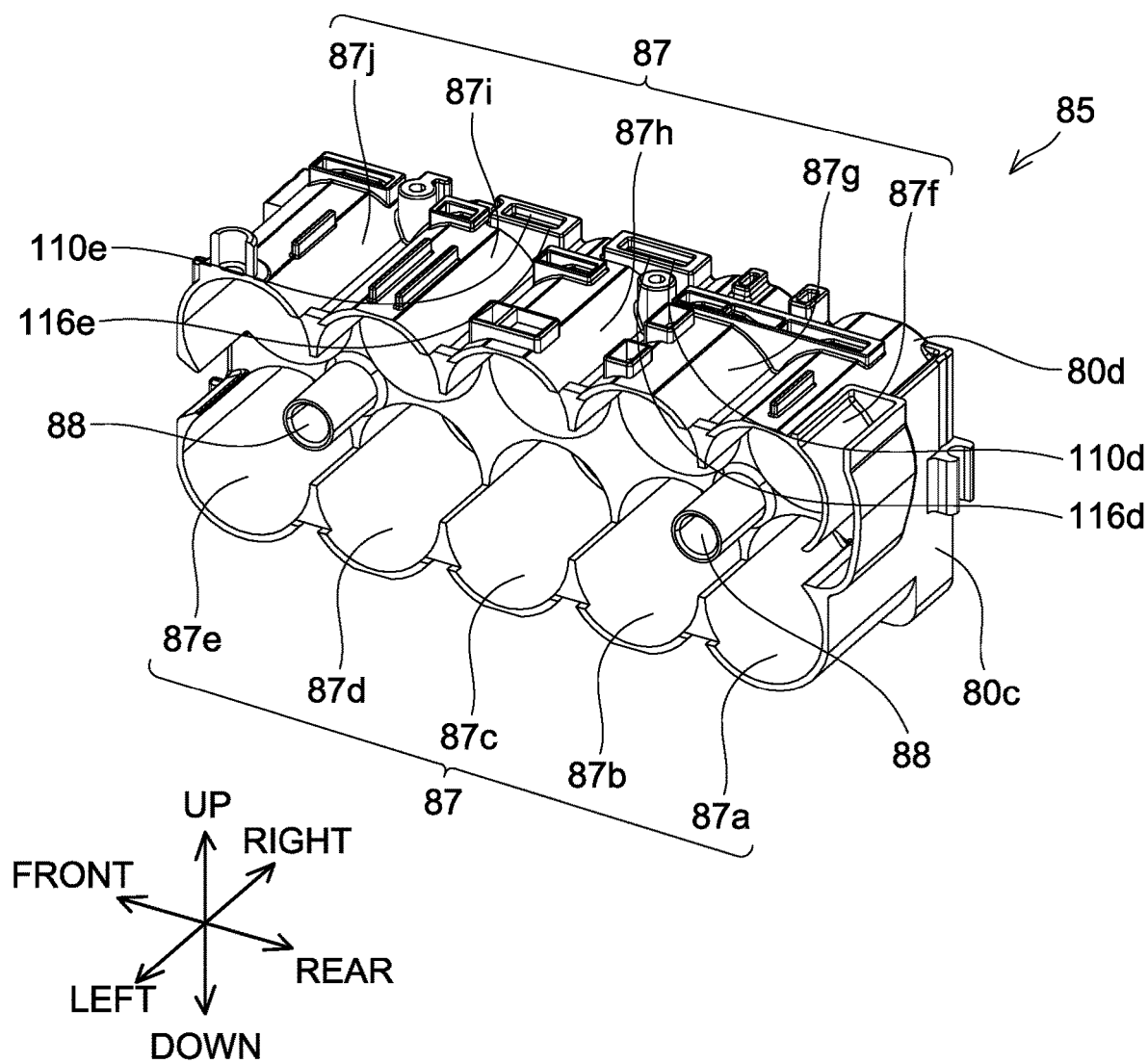
FIG. 11B is an oblique view, viewed from the rear, the left, and above, of a right cell case 85 according to the first embodiment.

As shown in FIG. 10, the ten battery cells 90a-90j are disposed, such that they are lined up in two levels, an upper level and a lower level, in the cell case 80. Each battery cell 90a-90j is a rechargeable battery cell, e.g., a lithium-ion battery cell, having a circular-cylinder shape and on which a positive electrode is formed on a first end portion and a negative electrode is formed on a second (opposite) end portion. In the present embodiment, the battery cells 90a-90j are 18650-type, lithium-ion battery cells having a rated voltage of 3.6V. The battery cells 90a-90j are disposed such that, among battery cells 90a-90j adjacent in the up-down direction, the positive electrodes and the negative electrodes are oriented in the reverse direction from one another. The battery cell 90a, which is the rearmost of the battery cells 90a-90e in the lower level, is disposed such that its right-end-surface side is its negative electrode and its left-end-surface side is its positive electrode. In addition, the battery cells 90b-90e are disposed such that their right-end-surface sides are their positive electrodes and their left-end-surface sides are their negative electrodes. In addition, the battery cell 90f, which is the rearmost of the battery cells 90f-90j in the upper level, is disposed such that its right-end-surface side is its positive electrode and its left-end-surface side is its negative electrode. In addition, the battery cells 90g-90j are disposed such that their right-end-surface sides are their negative electrodes and their left-end-surface sides are their positive electrodes. A metal part 91 (e.g., refer to FIG. 20), which constitutes the positive electrode of each battery cell 90a-90j, and a metal part, which constitutes the negative electrode of each battery cell 90a-90j, are respectively connected to the first and second end portions (surfaces) of each battery cell 90a-90j. The first end portions of the battery cells 90a-90j are connected via the metal parts to lead plates 92a-92f (refer to FIG. 9A), which are made of a conductive metal or alloy, such as copper, copper alloy, aluminum, aluminum alloy, etc., and are provided on the right-side surface 80e side of the cell case 80. The second end portions of the battery cells 90a-90j are connected via the metal parts to lead plates 92g-92k (refer to FIG. 9B), which are also made of a conductive metal or alloy, such as copper, copper alloy, aluminum, aluminum alloy, etc., and are provided on the left-side surface 80f side of the cell case 80. It is noted that, as shown in FIG. 20, for each of the battery cells 90a-90j, a waterproof ring 95 is provided on the metal part 91 that constitutes the positive electrode of the battery cell 90a-90j. In FIG. 9A and FIG. 9B, the portions denoted by thick-line circles on the surfaces of the lead plates 92 indicate that the waterproof rings 95 are disposed inward thereof. Accordingly, the positive electrodes of the battery cells 90a-90j are connected to the portions denoted by the thick-line circles on the surfaces of the lead plates 92.

As shown in FIG. 9A, the lead plates 92a-92f are disposed spaced apart from one another, i.e. there is no direct contact between the lead plates 92a-92f that could cause electrically shorting. Accordingly, the lead plates 92a-92f are electrically insulated from one another by the gaps therebetween. The lead plate 92a is connected only to the positive electrode of the battery cell 90f. The lead plate 92f is connected only to the negative electrode of the battery cell 90j. The lead plate 92b connects the two battery cells 90a, 90b, which are adjacent in the front-rear direction. The lead plates 92c-92e connect the two battery cells that are adjacent in a diagonal direction. Specifically, the lead plate 92c is connected to the negative electrode of the battery cell 90g and the positive electrode of the battery cell 90c. The lead plate 92d is connected to the negative electrode of the battery cell 90h and the positive electrode of the battery cell 90d. The lead plate 92e is connected to the negative electrode of the battery cell 90i and the positive electrode of the battery cell 90e.

In addition, as shown in FIG. 9B, the lead plates 92g-92k are disposed spaced apart from one another in a manner similar to the lead plates 92a-92f. Accordingly, the lead plates 92g-92k are electrically insulated from one another by the gaps therebetween. The lead plates 92g-92k connect the battery cells that are adjacent in the up-down direction. Specifically, the lead plate 92g connects the negative electrode of the battery cell 90e and the positive electrode of the battery cell 90j. In addition, the lead plate 92h connects the negative electrode of the battery cell 90d and the positive electrode of the battery cell 90i. In addition, the lead plate 92i connects the negative electrode of the battery cell 90c and the positive electrode of the battery cell 90h. In addition, the lead plate 92j connects the negative electrode of the battery cell 90b and the positive electrode of the battery cell 90g. In addition, the lead plate 92k connects the positive electrode of the battery cell 90a and the negative electrode of the battery cell 90f. According to the above-mentioned configuration, the ten battery cells 90a-90j are electrically connected in series. Accordingly, the rated voltage of the battery pack 2 is 36V. It is noted that, although not shown, electrically insulating sheets are affixed to the right-side surface 80e and the left-side surface 80f of the cell case 80.

According to the above-mentioned configuration, the lead plates 92a, 92f, which are connected to the control board 82 via respective power-supply lines (not shown), can be connected to the battery cells 90f, 90j, which are on the upper side. The electric current that flows in (through) the lead plates 92a, 92f, which are connected to the control board 82, is larger than the electric current that flows in (through) the other lead plates. Consequently, the width of each of the lead plates 92a, 92f is preferably large. Owing to the arrangement of parts in the above-mentioned configuration, the width of the lead plates 92a, 92f can be sufficiently ensured. In this regard, it is noted that, if at least one of the lead plates 92a, 92f connected to the control board 82 were to instead be connected to one of the lower level battery cells 90a-90e, then it would become necessary to wire the corresponding power-supply line from a lower portion of cell case 80 up to the control board 82 that is above the cell case 80. Because the clearance between the cell case 80 and a right-side surface of the outer case 12 is small in the lower portion of the cell case 80, wiring the power-supply line would be difficult in such an arrangement. On the other hand, according to the above-mentioned configuration of the present teachings, because both of the lead plates 92a, 92f, which are connected to the control board 82, are connected to the battery cells 90f, 90j, which are on the upper side, the power-supply lines that respectively connect the lead plates 92a, 92f and the control board 82 can be wired easily. In addition, because the length of the power-supply lines that connect the lead plates 92a, 92f and the control board 82 can be made shorter than in an embodiment in which at least one of the lead plates 92a, 92f is connected to a battery cell in the lower level, the resistance of the power-supply lines that connect the lead plates 92a, 92f and the control board 82 can be made smaller.

As shown in FIG. 10, when the cell case 80 holds the ten battery cells 90a-90j, the upper-level battery cells 90f-90j and the lower-level battery cells 90a-90e are disposed spaced apart from one another in the up-down direction. In addition, clearances (gaps) are provided between the battery cells 90a, 90b, 90f, 90g and the rearward-side coupling parts 88 and between the battery cells 90d, 90e, 90i, 90j and the forward-side coupling parts 88. Consequently, air that flows into the cell case 80 via the vent 81a or the vent 81b of the cell case 80 can pass between the upper-level battery cells 90f-90j and the lower-level battery cells 90a-90e, between the battery cells 90a, 90b, 90f, 90g and the rearward-side coupling parts 88, and between the battery cells 90d, 90e, 90i, 90j and the forward-side coupling parts 88.

As shown in FIG. 9A, the control board 82 is disposed upward of the cell case 80. The control board 82 is disposed along a plane orthogonal to the up-down direction and is fixed to the cell case 80 via fasteners 100.

A plurality of terminals 102 is provided on the upper surface of the control board 82. The terminals 102 include: a battery-side, negative-electrode terminal 104a and a battery-side, positive-electrode terminal 104b, which are used for discharging or charging when the battery pack 2 is mounted on the power tool 200 or the charger 300; and a plurality of battery-side signal terminals 106a-106d used for the transmission and receipt of signals. The battery-side, negative-electrode terminal 104a and the battery-side, positive-electrode terminal 104b are provided outward of the battery-side signal terminals 106a-106d in the left-right direction and may each be constituted by four discrete terminals that are electrically connected, as shown in FIG. 9A. The battery-side, negative-electrode terminal 104a is provided on the control board 82 on the right side thereof, and the battery-side, positive-electrode terminal 104b is provided on the control board 82 on the left side thereof. The battery-side signal terminals 106a, 106b are provided such that they are lined up (colinear) in the front-rear direction. The battery-side signal terminals 106c, 106d are provided such that they are lined up (colinear) in the front-rear direction and thus extend in parallel to the battery-side signal terminals 106a, 106b. As shown in FIG. 12B, the battery-side, negative-electrode terminal 104a is disposed at a location corresponding to the terminal-opening part 22a of the upper-part case 14, the battery-side signal terminals 106a, 106b are disposed at a location corresponding to the terminal-opening part 22b, the battery-side signal terminals 106c, 106d are disposed at a location corresponding to the terminal-opening part 22c, and the battery-side, positive-electrode terminal 104b is disposed at a location corresponding to the terminal-opening part 22d.

Figure 12A:
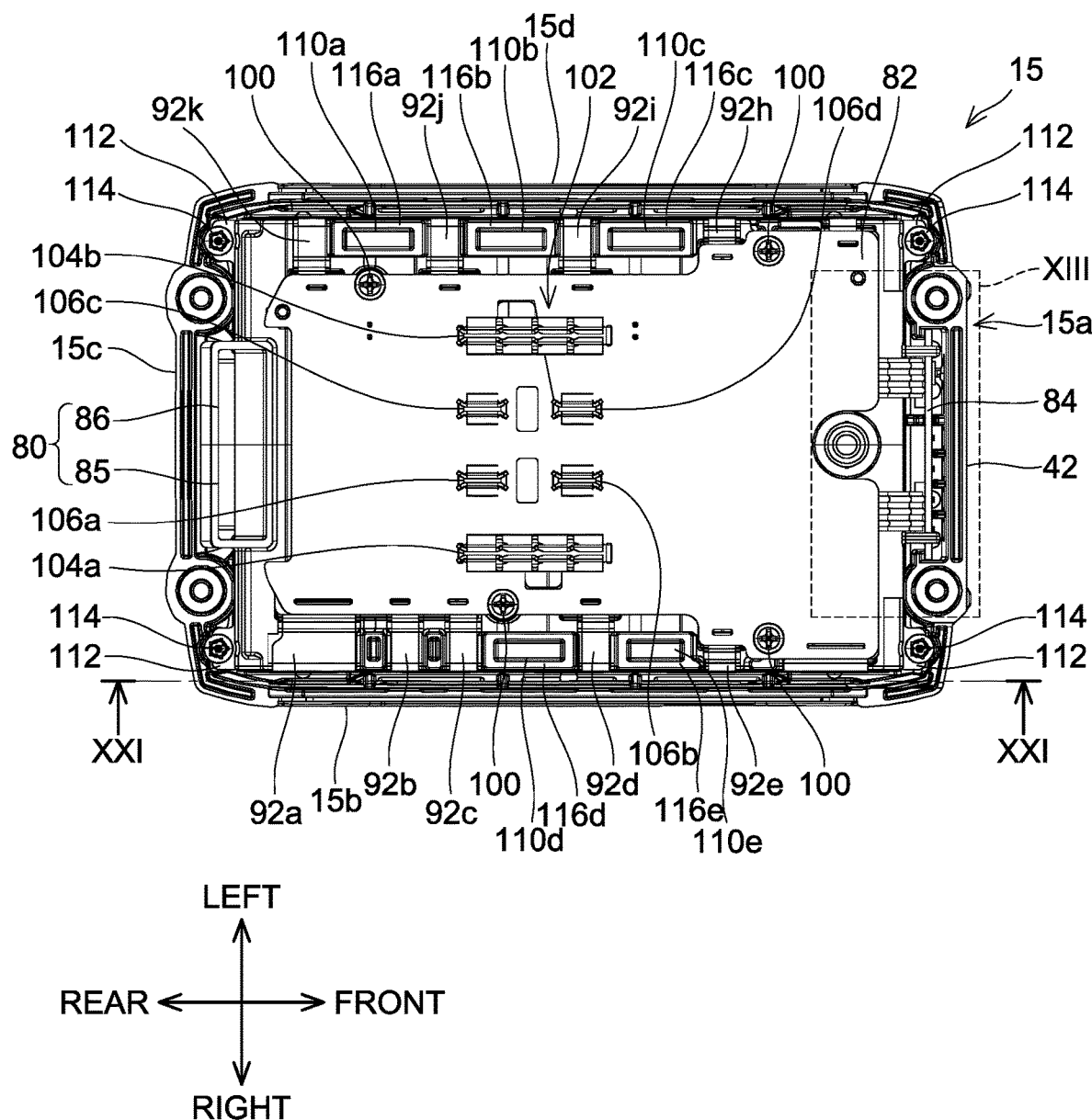
FIG. 12A is a top view that shows the state in which, in the first embodiment, the battery module 10 and the lower-part case 15 are fixed to one another.

As shown in FIGS. 9A, 9B, 11C and 12A, four screw holders (fixing parts) 112 are provided on the cell case 80. The screw holders 112 are provided at locations corresponding to the screw holes 62 (FIG. 6) of the lower-part case 15. As shown in FIG. 12A, the lower-part case 15 and the battery module 10 are fixed to one another by four screws 114 that respectively pass through the screw holes 62 and into the screw holders 112.

As shown in FIG. 9A, the LED board 84 is connected to the control board 82 via signal lines 120. The LED board 84 comprises four LEDs 84a and a switch 84b, which may be, e.g., a push-button switch. As shown in FIG. 13A, when the battery module 10 and the lower-part case 15 are fixed to one another, the LED board 84 is disposed in the vicinity of a rear surface of the display part 42 of the lower-part case 15. Specifically, the LEDs 84a are respectively disposed on the rear surfaces of the remaining-battery-charge display parts 42a, and the switch 84b is disposed on the rear surface of the button 42b. That is, inward of the lower-part case 15, the LED board 84 opposes the front surface 14a. In addition, the LED board 84 is inserted into the groove part 50a of the front-part rib 50 of the lower-part case 15 and is mounted on the front-part ribs 48, 56. Consequently, the LED board 84 is held by the lower-part case 15. In addition, a front surface of the LED board 84 makes contact with rear ends of the front-part ribs 52, 54 and the light-shielding wall part 56a of the front-part rib 56. In addition, the vents 58a-58d are provided in the surface that opposes a lower surface 84c of the LED board 84.

Engagement clearances C1, which are respectively located between the first ridge parts 30 of the upper-part case 14 and the first recessed parts 110 of the battery module 10, and engagement clearances C2, which are respectively located between second ridge parts 34a-34d of the upper-part case 14 and second recessed parts 64a-64d of the lower-part case 15, are explained below, with reference to FIG. 14 to FIG. 17.

Figure 14:
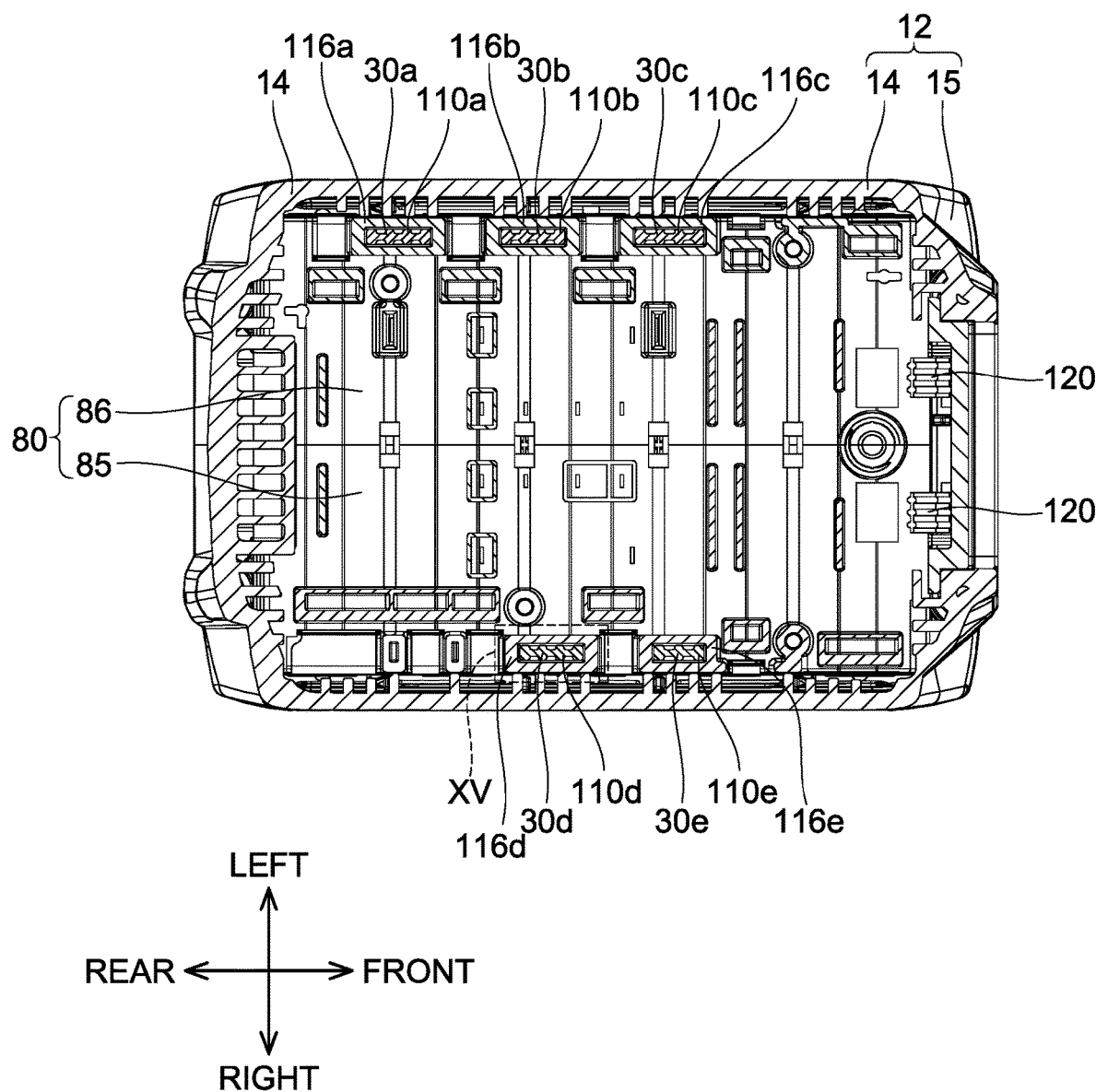
FIG. 14 is a cross-sectional view, viewed from above, of the battery pack 2 according to the present embodiment.

As shown in FIG. 14, the first ridge parts (protrusions) 30a-30e of the upper-part cases 14 are received in the first recessed parts (recesses, slots, blind holes) 110a-110e of the battery module 10, respectively. As shown in FIG. 15, engagement clearances (gaps) C1 are provided between the first ridge parts 30d and the first recessed part 110d in the front-rear direction and in the left-right direction. The same engagement clearances C1 are also provided with regard to the other first ridge parts 30a-30c and first recessed parts 110a-110c.

Figure 16:
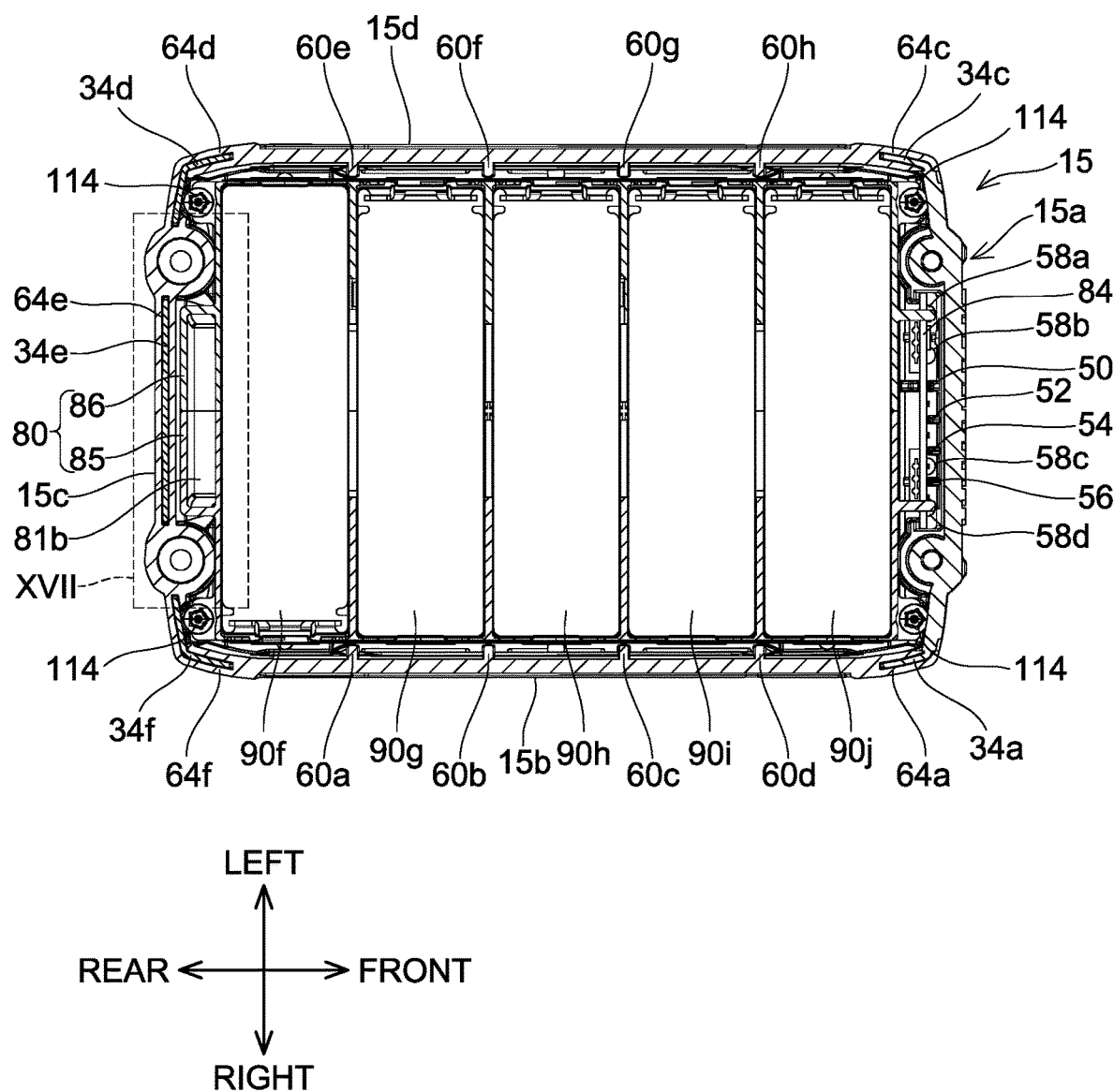
FIG. 16 is a cross-sectional view, viewed from above, of the battery pack 2 according to the present embodiment.
Figure 17:
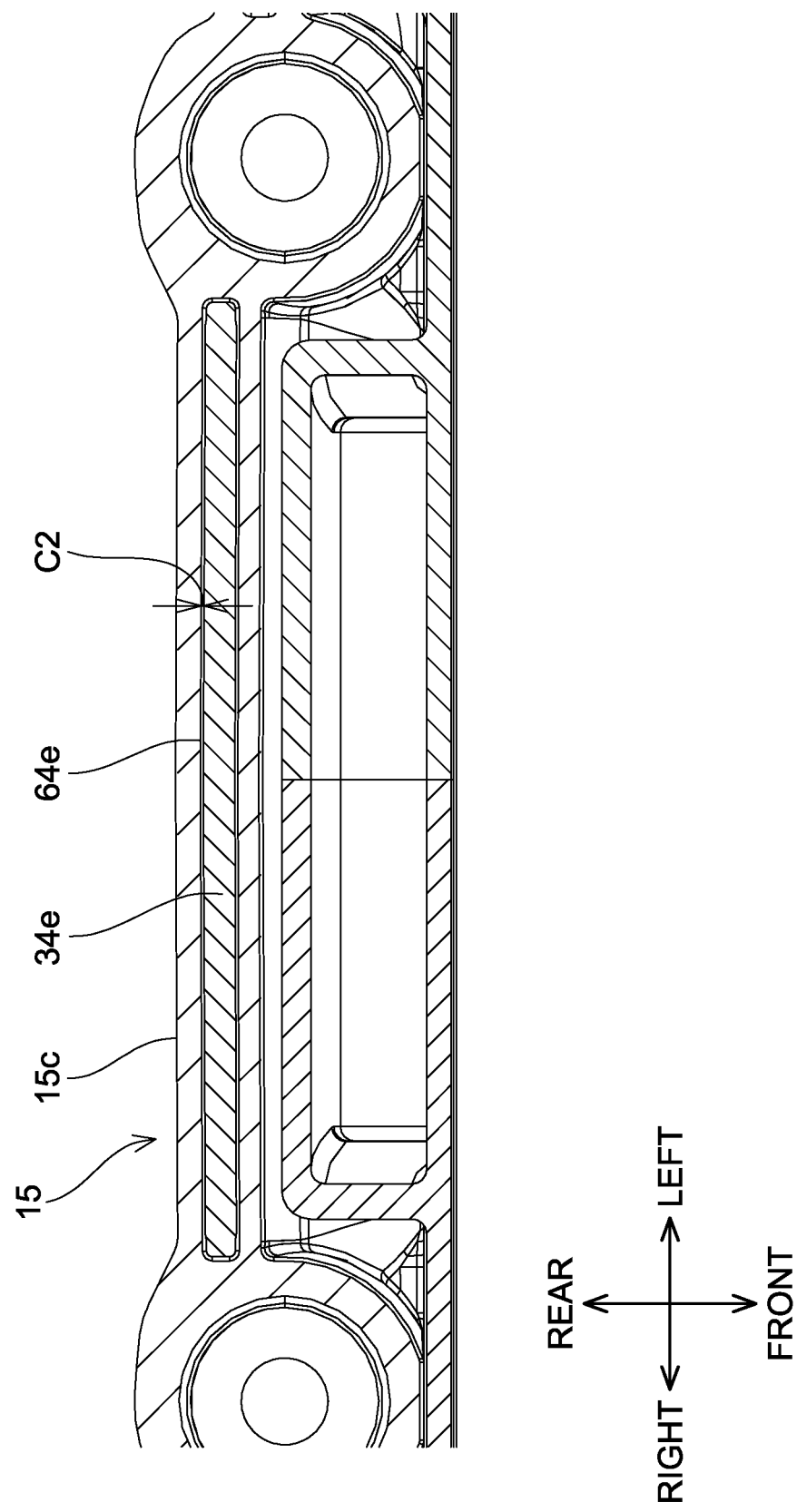
FIG. 17 is an enlarged view of the broken-line area XVII in FIG. 16.

In addition, as shown in FIG. 16, the second ridge parts (protrusions) 34a-34f of the upper-part case 14 are respectively received in the second recessed parts (recesses, slots, blind holes) 64a-64f of the lower-part case 15. As shown in FIG. 17, engagement clearance (gap) C2 is provided, e.g., between the second ridge part 34e and the second recessed part 64e. The same engagement clearances (gaps) C2 are also provided with regard to the other second ridge parts 34a-34d and 34f and second recessed parts 64a-64d and 64f. These engagement clearances C2 are designed (configured) to position (retain) the upper-part case 14 relative to the lower-part case 15 in directions perpendicular to the up-down direction, i.e. in a plane defined by the front-rear direction and the left-right direction. The engagement clearances C1 shown in FIG. 14 are designed (configured) to reduce the likelihood of mispositioning (misalignment) between the upper-part case 14 and the cell case 80. More specifically, the engagement clearances C1 should be set (designed, configured) such that mispositioning between the upper-part case 14 and the cell case 80 tends not to occur and contact between the upper-part case 14 and the control board 82 is thereby hindered or prevented. The engagement clearances C1 are preferably larger than the engagement clearances C2. It is noted that, as shown in FIG. 16, a labyrinth structure (tortious path) is formed by the interaction of the second ridge parts 34a-34f and the second recessed parts 64a-64f Thereby, the ingress of water into the outer case 12 via these parts is hindered.

Next, case clearances (gaps) C11-C13, which are located between the lower surface of the cell case 80 of the battery module 10 and the lower-part case 15, will be explained, with reference to FIG. 18 and FIG. 19. As described above, FIG. 18 is a cross-sectional view of the battery pack 2 at its center position in the left-right direction, and FIG. 19 is a cross-sectional view of the battery pack 2 at the location at which the right-side, rearward depression 16c of the lower-part case 15 is provided.

As shown in FIG. 18, the lower surface of the cell case 80 does not make contact with the upper surface of the bottom wall 15e of the lower-part case 15. Specifically, case clearances C11 are provided between the center holding parts 89a of the cell-holding parts 87a-87c and the projections 16b, which protrude upward (i.e., inward in the up-down direction) from the bottom wall 15e of the lower-part case 15. In addition, case clearances C12 are provided between the center holding parts 89a and the flat part 16a. The case clearances C12 are larger than the case clearances C11.

In addition, as shown in FIG. 19, case clearance C13 is provided between the depression 16c and the end-surface-side holding part 89b corresponding to the battery cell 90a disposed at the location closest to the corresponding corner part 15f of the lower-part case 15. The step part 16d is provided between the portion of the bottom wall 15e of the lower-part case 15 that opposes a side surface 93a of the battery cell 90a and the portion of the bottom wall 15e of the lower-part case 15 that opposes a side surface 93b of the battery cell 90b. The same case clearance C13 is provided at each of the recessed parts 16a, 16b and 16d. It is noted that the step part 16d is not provided between the portion of the bottom wall 15e of the lower-part case 15 that opposes the side surface 93b of the battery cell 90b and the portion of the bottom wall 15e of the lower-part case 15 that opposes a side surface 93c of the battery cell 90c. Consequently, the case clearances C13 are larger than the case clearances C12.

Next, the positional relationship between the battery cell 90c, from among the plurality of battery cells 90a-90j, located in (at) the center of the lower level and the holes 40c, 40h provided rightward of the battery cell 90c will be explained in an exemplary manner, with reference to FIG. 20. It is noted that, in FIG. 20, the lead plate 92i is omitted to facilitate understanding.

As shown in FIG. 20, holes 40c, 40h are provided in the right-side surface 15b at locations at which they face an end surface of the (lower level) battery cell 90c in the longitudinal direction. It is noted that a hole is not provided in the right-side surface 15b at a location facing an end surface of the (upper level) battery cell 90h, which is located upward of the battery cell 90c, in the longitudinal direction. At least a portion of the holes 40c, 40h faces an end surface of the battery cell 90c in the longitudinal direction.

The metal part 91, which constitutes the positive electrode of the battery cell 90c, is provided on the right-side end surface of the battery cell 90c. The lower end (edge) 43h of the hole 40h in the upper level and the lower end (edge) 43c of the hole 40c in the lower level are provided downward of an upper end 94a of the battery cell 90c and downward of longitudinal-direction axis A1 of the battery cell 90c. In addition, the lower end 43c of the hole 40c in the lower level is provided downward of a lower end 91a of the metal part 91 and downward of a lower end 94b of the battery cell 90c.

Figure 21:
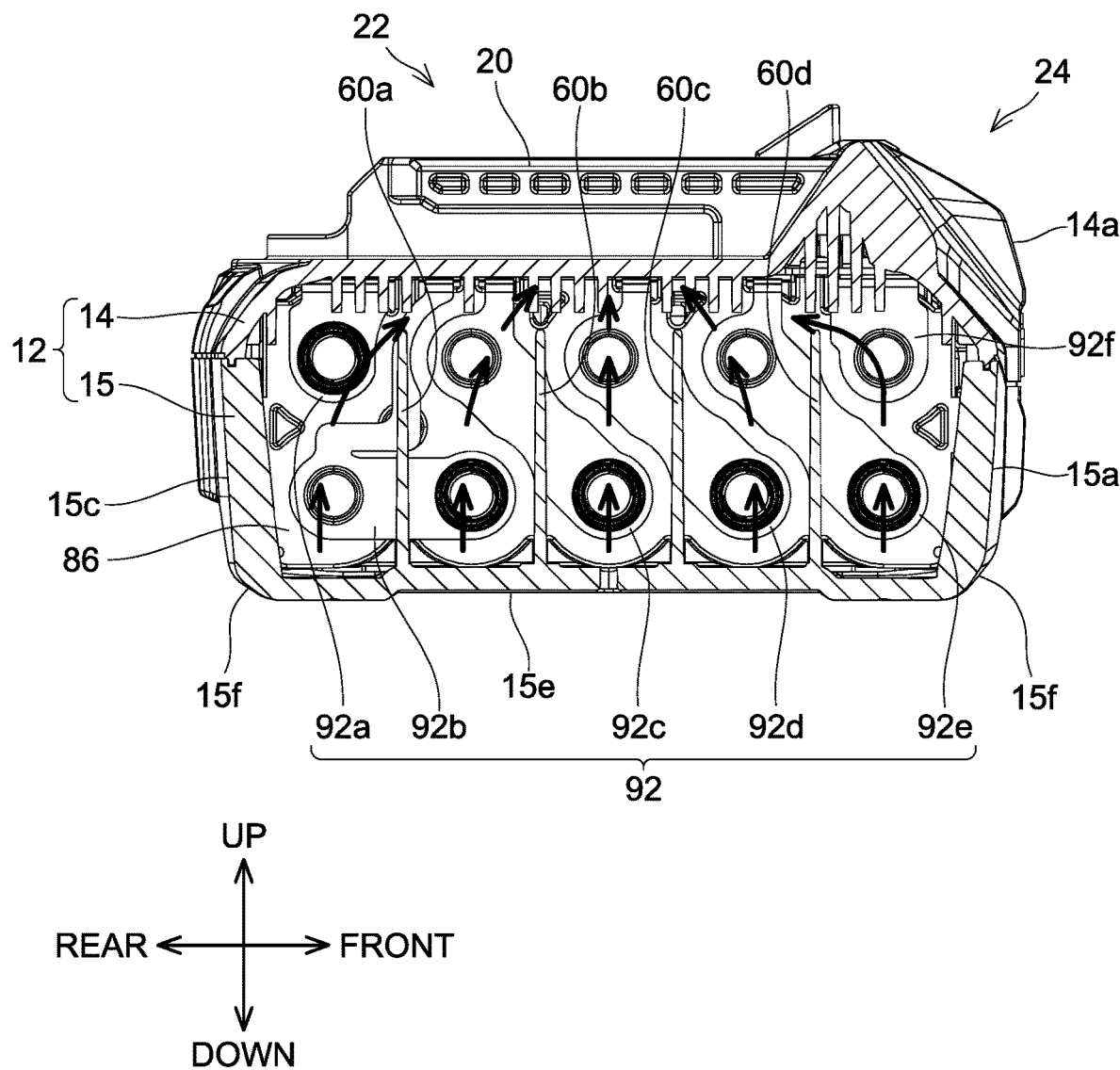
FIG. 21 is a cross-sectional view taken along line XXI-XXI in FIG. 12A and FIG. 12B.

Next, the flow of air inside the battery pack 2 will be explained, with reference to FIG. 21. Let us assume the circumstance in which, for example, the battery pack 2 was mounted on the power tool 200, the power tool 200 was used by the user, and then the battery pack 2 was removed from the power tool 200. During operation of the power tool 200, the temperature of the battery pack 2 increases owing to the discharge of current. Therefore, the vents 40, 41, which are provided at (in) the lower portion of the lower-part case 15, as shown in FIG. 1A, FIG. 3, and FIG. 8, function as air-suction holes through which air is introduced from outside into the interior of the battery pack 2. Specifically, the air around the battery cells 90a-90j within the battery pack 2 warms up, which causes the (cooler) air outside of the battery pack 2 to flow into the interior of the battery pack 2 via the vents 40, 41. The air introduced via the vent 40 (i.e. through the holes 40a-40j) into the battery pack 2 flows into the partitioned spaces defined between the plurality of battery cells 90a-90j and the lower-part case 15 in the following manner. As was described above, the side-part ribs 60a-60d are provided between the holes 40a-40j. Consequently, as shown in FIG. 20, the air introduced via the holes 40c, 40h flows into the space (vertical channel) between the battery cells 90c, 90h and the right-side surface 15b of the lower-part case 15. Likewise, the air introduced via the holes 40a, 40f flows into the space (vertical channel) between the battery cells 90b, 90g and the right-side surface 15b of the lower-part case 15, the air introduced via the holes 40b, 40g flows into the space (vertical channel) between the battery cells 90b, 90g and the right-side surface 15b of the lower-part case 15, the air introduced via the holes 40d, 40i flows into the space (vertical channel) between the battery cells 90d, 90i and the right-side surface 15b of the lower-part case 15, and the air introduced via the holes 40e, 40j flows into the space (vertical channel) between the battery cells 90e, 90j and the right-side surface 15b of the lower-part case 15. Accordingly, the plurality of battery cells 90a-90j is cooled reliably. After the air that has flowed into the spaces between the plurality of battery cells 90a-90j and the right-side surface 15b of the lower-part case 15 has cooled the plurality of battery cells 90a-90j, that heated air flows out to the exterior of the battery pack 2 via the terminal-opening part 22a, etc. of the terminal-receiving part 22 of the upper-part case 14. Thus, when the temperature of the battery cells 90a-90j inside the battery pack 2 is high, natural convection arises within the outer case 12. It is noted that the air introduced via the vent 41 into the battery pack 2 also flows into the spaces (vertical channels) between the battery cells 90a-90j and the left-side surface 15d of the lower-part case 15 and also is used in the cooling of the battery cells 90a-90j.

Next, the flow of air inside the battery pack 2 while the battery pack 2 is mounted on the charger 300 will be explained, with reference to FIG. 22 and FIG. 23. A ventilation fan (not shown) is installed in the charger 300 and is configured to suction air from the battery pack 2. In this state, the vents 40, 41 (refer to FIG. 1) and the vents 58a-58d (refer to FIG. 6) of the battery pack 2 function as air-suction holes through which air is introduced from the exterior into the interior of the battery pack 2, and the vent 26 (refer to FIG. 1) of the battery pack 2 functions as an air-exhaust hole through which heated air is exhausted from the interior of the battery pack 2 through the charger 300 to the outside (via a vent hole 310 in the charger 300 as shown in FIG. 25A).

As shown in FIG. 22, when the ventilation fan of the charger 300 is driven, air suctioned into the battery pack 2 via the vents 58a-58d (see also FIG. 1B) flows into the space between the front part 80a of the cell case 80 and the front surface 15a of the lower-part case 15. The LED board 84 is provided between the front part 80a of the cell case 80 and the front surface 15a of the lower-part case 15. Therefore, the air that flows into the space between the front part 80a of the cell case 80 and the front surface 15a of the lower-part case 15 passes between the front part 80a of the cell case 80 and the LED board 84, passes through the vent 81a of (in) the cell case 80, and flows into the interior of the cell case 80. The air introduced into the cell case 80 passes through the spaces between the battery cells 90f-90j in the upper level and the battery cells 90a-90e in the lower level, the spaces between the battery cells 90a, 90b, 90f, 90g and the rearward-side coupling part 88, and the spaces between the battery cells 90d, 90e, 90i, 90j and the forward-side coupling part 88. Therefore, the air that passes through the interior of the cell case 80 cools the plurality of battery cells 90a-90j. Then, the heated air is suctioned into the charger 300 via the vent 81b of the rear part 80b of the cell case 80, the vent 26 of the upper-part case 14, and a vent 308 (refer to FIG. 25B) of the charger 300, which corresponds to the vent 26. As described above, when the battery pack 2 is mounted on the charger 300, the charger-side ridge part 306 of the charger 300 is inserted into the battery-side channel 27, which surrounds the vent 26. Consequently, the amount of air suctioned into the charger 300 through a gap, which may be (undesirably) present between the battery pack 2 and the charger 300, e.g., due to manufacturing tolerances, can be made less than in an embodiment in which the battery-side channel 27 is not provided around the vent 26. Thereby, the amount of air that flows inside the battery pack 2 can be increased because suctioning losses via the undesired gap are reduced. Accordingly, the battery cells 90a-90j, the lead plates 92, and the like inside the battery pack 2 can be cooled efficiently.

In addition, as shown in FIG. 23, the air introduced via the vent 40 into the battery pack 2 flows into the spaces (vertical channels) between the plurality of battery cells 90a-90j and the right-side surface 15b of the lower-part case 15 (more precisely, between the lead plates 92 and the right-side surface 15b of the lower-part case 15). The air that flows into the spaces between the battery cells 90a-90j and the right-side surface 15b of the lower-part case 15 flows toward the forward side, upward of the plurality of side-part ribs 60a-60d, and flows into the space between the front part 80a of the cell case 80 and the front surface 15a of the lower-part case 15. The flow of air thereafter is the same as is shown in FIG. 22. Thus, the air introduced via the vents 58a-58d, 40, 41 is used to cool the plurality of battery cells 90a-90j. It is noted that, in the present embodiment, the vents 40, 41 are provided at the lower portion of the lower-part case 15. Therefore, when the battery pack 2 is mounted on the charger 300, the vents 40, 41 are located at a height that is higher than an upper surface of the charger 300. Because dust and the like tends to accumulate at lower locations, dust and the like tend not to be suctioned into the battery pack 2 owing to the fact the battery pack 2 is mounted above the charger 300 and the vents 40, 41 are located an upper most location at this time.

The effects of the battery-side channels (steps) 23a-23d of the upper-part case 14 of the battery pack 2 will be explained below, with reference to FIG. 24B. It is noted that FIG. 24B is a cross-sectional view, at the center position in the front-rear direction, of the battery-side signal terminal 106a (refer to FIG. 12A) of the battery pack 2 in the state in which the battery pack 2 is mounted on the power tool 200. As shown in FIG. 24B, the power tool 200 comprises a terminal-holding part 202. Tool-side ridge parts (protrusions) 206a-206d, which protrude toward the downward side (i.e., toward the battery pack 2), are provided on the terminal-holding part 202. The tool-side, negative-electrode terminal 208a, which corresponds to the battery-side, negative-electrode terminal(s) 104a, is provided on (in) the tool-side ridge part 206a, and the tool-side, positive-electrode terminal 208b, which corresponds to the battery-side, positive-electrode terminal(s) 104b, is provided on (in) the tool-side ridge part 206d. The tool-side signal terminal 210a, which corresponds to the battery-side signal terminal 106a, is provided on (in) the tool-side ridge part 206b. It is noted that a tool-side signal terminal (not shown), which corresponds to the battery-side signal terminal 106b, is provided, forward of the tool-side signal terminal 210a, on (in) the tool-side ridge part 206b. The tool-side signal terminal 210c, which corresponds to the battery-side signal terminal 106c, is provided on (in) the tool-side ridge part 206c. It is noted that, because the battery-side signal terminal 106d is configured (adapted) to be used only while the battery pack 2 is mounted on the charger 300, a tool-side signal terminal corresponding to the battery-side signal terminal 106d is not provided, forward of a tool-side signal terminal 210c, on (in) the tool-side ridge part 206c. When the battery pack 2 is mounted on the power tool 200, the tool-side ridge parts 206a-206d are inserted into the battery-side channels 23a-23d, respectively. Owing to this design, the creepage distance between adjacent terminals of the power tool 200 in the left-right direction can be made longer than in an embodiment in which the tool-side ridge parts 206a-206d are not provided on the terminal-holding part 202 of the power tool 200. More specifically, the increase of the creepage distance corresponds to the combined heights of each pair of adjacent tool-side ridge parts 206a-206d. Accordingly, a short circuit between two adjacent terminals of the power tool 200 in the left-right direction is less likely to occur.

As shown in FIG. 1A to FIG. 17, a battery pack 2 according to one aspect of the present teachings comprises: the outer case 12, which comprises the upper-part case 14 and the lower-part case 15 fixed to the upper-part case 14; and the cell case 80, which is housed in the outer case 12. The first ridge parts 30 (refer to FIG. 4A and FIG. 4B) are provided on the upper-part case 14, and the first recessed parts 110 (refer to FIG. 9) are provided on the cell case 80. In such a configuration, the first ridge parts 30, which are provided on the upper-part case 14, and the first recessed parts 110, which are provided on (in) the cell case 80, engage with one another, preferably in a form-fit (shape-fit, engineering fit) or interlocking manner. Herein, the term "engage" is intended to encompass, e.g., the state in which the first ridge parts 30 are received (disposed, submerged) in the first recessed parts 110, e.g., such that movement in directions perpendicular to the protrusion direction of the first ridge parts 30 is restricted (hindered). Consequently, even if, for example, mispositioning (misalignment) between the upper-part case 14 and the lower-part case 15 has occurred due to an impact produced when the power tool 200 (refer to FIG. 24) was dropped while the battery pack 2 was mounted thereon, mispositioning (misalignment) between the upper-part case 14 and the cell case 80 (adverse shifting of the upper-part case 14 relative to the cell case 80) is less likely to occur. Accordingly, it is less likely that the upper-part case 14 will make contact with the control board 82, which is fixed to the cell case 80. In addition, because the first ridge parts 30 and the first recessed parts 110 do not have complex shapes, they can be formed easily. Accordingly, it is possible to easily manufacture a battery pack 2 that reduces the likelihood of mispositioning between the upper-part case 14 and the cell case 80. In addition, because the first ridge parts 30 are provided on the upper-part case 14, it is possible to make the upper-part case 14 thicker than in an embodiment in which the first recessed parts 110 are provided on (in) the upper-part case 14. Accordingly, the stiffness (robustness) of the upper-part case 14 can be increased, and thereby the likelihood of deformation of the upper-part case 14 can be reduced.

In one or more embodiments, as shown in FIG. 4A, FIG. 4B, and FIG. 5, the thick-wall parts 32a and the thin-wall parts 32b may be provided on the first ridge parts 30 of the upper-part case 14. These thick-wall parts 32a and thin-wall parts 32b reduce the effects of shrinkage, which occurs when the first ridge parts 30 are formed and makes it difficult to form the first ridge parts 30 with a constant (uniform) thickness (dimensions). Therefore, by providing the thick-wall parts 32a and the thin-wall parts 32b in such embodiments of the present teachings, it is possible to more easily form first ridge parts 30 with the intended shape.

In one or more embodiments, as shown in FIG. 4A and FIG. 6, the second ridge parts 34a-34f are provided on the upper-part case 14, and the second recessed parts 64a-64f, which have shapes that respectively match the second ridge parts 34a-34f, are provided on (in) the lower-part case 15. As shown in FIG. 14 to FIG. 17, engagement clearances C1 (refer to FIG. 15) between the first ridge parts 30 and the first recessed parts 110 and the first ridge parts 30, which are formed when the upper-part case 14 and the lower-part case 15 are fixed to one another, are greater than engagement clearances C2 (refer to FIG. 17) between the second recessed parts 64 and the second ridge parts 34, which are formed when the second ridge parts 34 are respectively inserted into the second recessed parts 64. In such an embodiment, the upper-part case 14 and the lower-part case 15 can be assembled easily.

In one or more embodiments, as shown in FIG. 1, the upper-part case 14 comprises the slide rails 20 that receive (engage) the power tool 200 or the charger 300 by sliding the battery pack 2 relative to the power tool 200 or the charger 300. Furthermore, as shown in FIG. 4C, the first ridge parts 30, which are provided on the upper-part case 14, are provided downward of the slide rails 20. For example, if the user drops the power tool 200 (refer to FIG. 24A) while the battery pack 2 is mounted thereon, the battery pack 2 may hit the ground first. In this case, a large impact force may act on the slide rails 20 of the battery pack 2, which receive (hold, engage) the power tool 200. In this situation, there is a possibility that mispositioning between the upper-part case 14 and the lower-part case 15 could occur. However, by providing the first ridge parts 30 downward of the slide rails 20 in such an embodiment, the likelihood of mispositioning between the upper-part case 14 and the cell case 80 can be reduced more reliably.

In one or more embodiments, as shown in FIG. 9 to FIG. 11B, the battery pack 2 further comprises a plurality of battery cells 90a-90j housed in the cell case 80 and a plurality of lead plates 92 connected to the battery cells 90a-90j and disposed spaced apart from one another in the front-rear direction, i.e. with gaps therebetween. Furthermore, as shown in FIGS. 9A, 9B and 10, the first recessed parts 110, which are provided on (in) the cell case 80, are respectively provided between pairs of two adjacent lead plates 92. Therefore, the regions between the lead plates 92 can be utilized effectively and the battery pack 2 can be made compact.

Second Embodiment

The points of difference between a battery pack 402 according to a second embodiment of the present teachings and the battery pack 2 according to the first embodiment will now be explained, with reference to FIG. 26 and FIG. 27. It is noted that, in the second to fifth embodiments described below, structural elements in common with previously-described embodiment(s) are assigned the same symbols, and explanations thereof are omitted. In the battery pack 402 according to the second embodiment, the structures of outer case 412 and cell case 480 differ from the structures of the outer case 12 and the cell case 80 of the battery pack 2 according to the first embodiment.

As shown in FIG. 26, two screw holes 421 are provided in upper-part case 414 of the outer case 412. The two screw holes 421 are provided inward of (between) contact areas CA (hatched areas in the drawing), where the battery pack 2 makes contact with the power tool 200 while the battery pack 2 is mounted on the power tool 200. In addition, the two screw holes 421 are provided inward of (between) the left and right slide rails 20 in the left-right direction.

As shown in FIG. 27, two screw holes 481 are provided in the cell case 480. Specifically, one screw hole 481 is provided in each of the right cell case 485 and the left cell case 486. The screw holes 481 are provided at locations corresponding to the screw holes 421 of the upper-part case 414. Screws 423 (refer to FIG. 26) are respectively screwed into the screw holes 421 of the upper-part case 414 and the screw holes 481 of the cell case 480. Thereby, the upper-part case 414 and the cell case 480 are fixed to one another. It is noted that the structure of lower-part case 415 is the same as the lower-part case 15 according to the first embodiment.

In one or more embodiments, as shown in FIG. 26 and FIG. 27, the battery pack 2 comprises the outer case 412, which comprises the upper-part case 414 and the lower-part case 15 fixed to the upper-part case 414, and the cell case 480, which is housed in the outer case 412. As shown in FIG. 26, the upper-part case 414 comprises a pair of slide rails 20 that slidably receive (engage) corresponding rails on the power tool 200 or the charger 300. The screw holes 421 and the screws 423, which fix the upper-part case 414 and the cell case 480 to one another, are provided inward of (between) the contact areas CA, where the power tool 200 and the battery pack 402 contact one another while the power tool 200 is mounted on the battery pack 2. In the above-mentioned configuration, even if, for example, mispositioning between the upper-part case 414 and the lower-part case 415 were to have occurred due to an impact produced when the power tool 200 (refer to FIG. 24) was dropped while the battery pack 402 is mounted thereon, the likelihood of mispositioning between the upper-part case 414 and the cell case 80 can be reduced. Accordingly, the likelihood of contact of the upper-part case 414 with the control board 82, which is fixed to the cell case 80, can be reduced.

In one or more embodiments, the screw holes 421 are provided inward of (between) the slide rails 20. In such embodiments, the region between the slide rails 20 can be utilized effectively.

Third Embodiment

Battery pack 602 according to a third embodiment will now be explained, with reference to FIG. 28. In the battery pack 602, the structure of lower-part case 615 of outer case 612 differs from the structure of the lower-part case 15 of the outer case 12 of the battery pack 2 according to the first embodiment. In addition, in the battery pack 602, the size, etc. of the battery cells (not shown) housed inside the outer case 612 differ from those of the battery cells 90a-90j housed inside the outer case 12 according to the first embodiment. Specifically, the battery cells of the present embodiment are 21700-type, lithium-ion battery cells and have a rated voltage of 3.6V. Consequently, the size of the outer case 612 is larger than that of the outer case 12 in the first embodiment. It is noted that, because the ten battery cells 90a-90j are housed inside the outer case 612 in the same manner as in the battery packs 2, 402 of the first and second embodiments, the method of connecting the battery cells is the same as in the battery pack in the previous embodiments. Accordingly, the rated voltage of the battery pack 602 in the present embodiment is likewise 36V.

Figure 28:
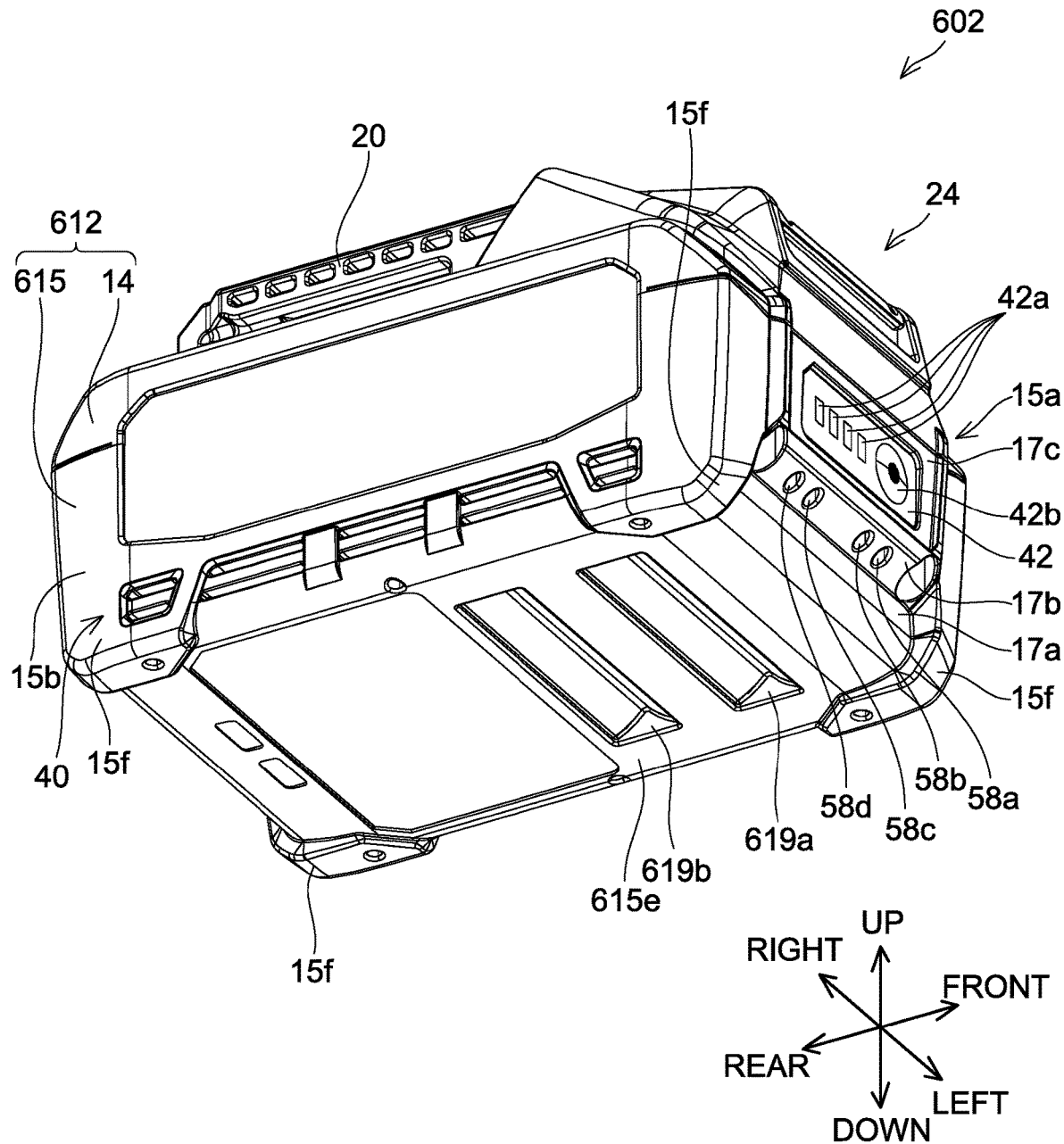
FIG. 28 is an oblique view, viewed from the front, the right, and below, of a battery pack 602 according to a third embodiment of the present teachings.

As shown in FIG. 28, two hook parts 619a, 619b, which are lined up (parallel) in the front-rear direction, are provided on bottom surface 615e of the lower-part case 615. Therefore, when the user wishes to remove the battery pack 2 from the power tool 200 or the charger 300, the user can insert one or more fingers into one of the two hook parts 619a, 619b that is best suited to the length of the user's finger(s). Accordingly, removal of the battery pack 2 from the power tool 200 or the charger 300 can be made easier.

Correspondence Relationship

The screw holes 421 and screws 423 are examples of "fixing parts."

Fourth Embodiment

The battery pack 2 according to a fourth embodiment will now be explained, with reference to FIG. 29A to FIG. 29C.

With regard to the battery pack 2 in the present embodiment, the structure of cell case 780 (right cell case 785 and left cell case 786) differs from the structure of the cell case 80 (the right cell case 85 and the left cell case 86) in the first embodiment.

Figure 29A:
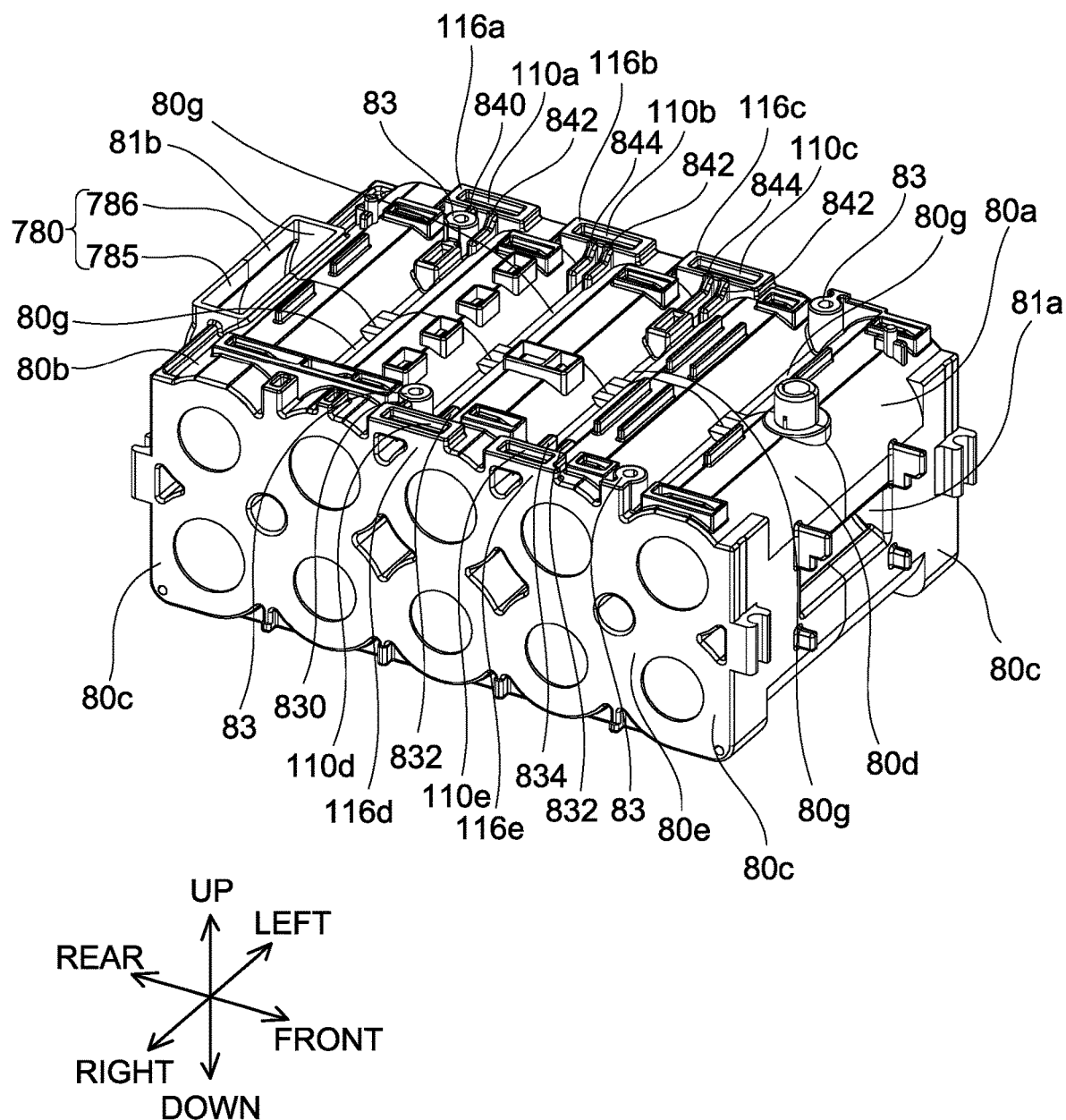
FIG. 29A is an oblique view, viewed from the front, the right, and above, of a cell case 780 according to a fourth embodiment of the present teachings.

As shown in FIG. 29A, reinforcing ribs 840, 842 extend rightward from a right-side surface of the protruding part 116a, in which the first recessed part 110a is provided. In addition, reinforcing ribs 842, 844 extend rightward from a right-side surface of the protruding part 116b, in which the first recessed part 110b is provided. In addition, reinforcing ribs 842, 844 extend rightward from a right-side surface of the protruding part 116c, in which the first recessed part 110c is provided. As shown in FIG. 29C, the reinforcing ribs 840, 844 are provided in three of the hollow parts 80g of the upper surface 80d of the cell case 780. Each of the reinforcing ribs 842 is provided on a surface, within the upper surface 80d of the cell case 80, having a shape that matches the side surface of the corresponding battery cell 90g-90i in the longitudinal direction. A right-end portion of the reinforcing rib 840 and a right-end portion of the reinforcing rib 844 extending rightward from the right-side surface of the protruding part 116c are connected to members (e.g., one of the screw bosses 83) that protrude upward from the upper surface 80d of the cell case 80. On the other hand, right-end portions of the reinforcing ribs 842 and a right-end portion of the reinforcing rib 844 extending rightward from the right-side surface of the protruding part 116b, are not connected to the members (e.g., the screw bosses 83) that protrude upward from the upper surface 80d of the cell case 80. The length of the reinforcing ribs 840, 844, which are provided in the hollow parts 80g, in the up-down direction is larger than the length of the reinforcing ribs 842 in the up-down direction.

Figure 29B:
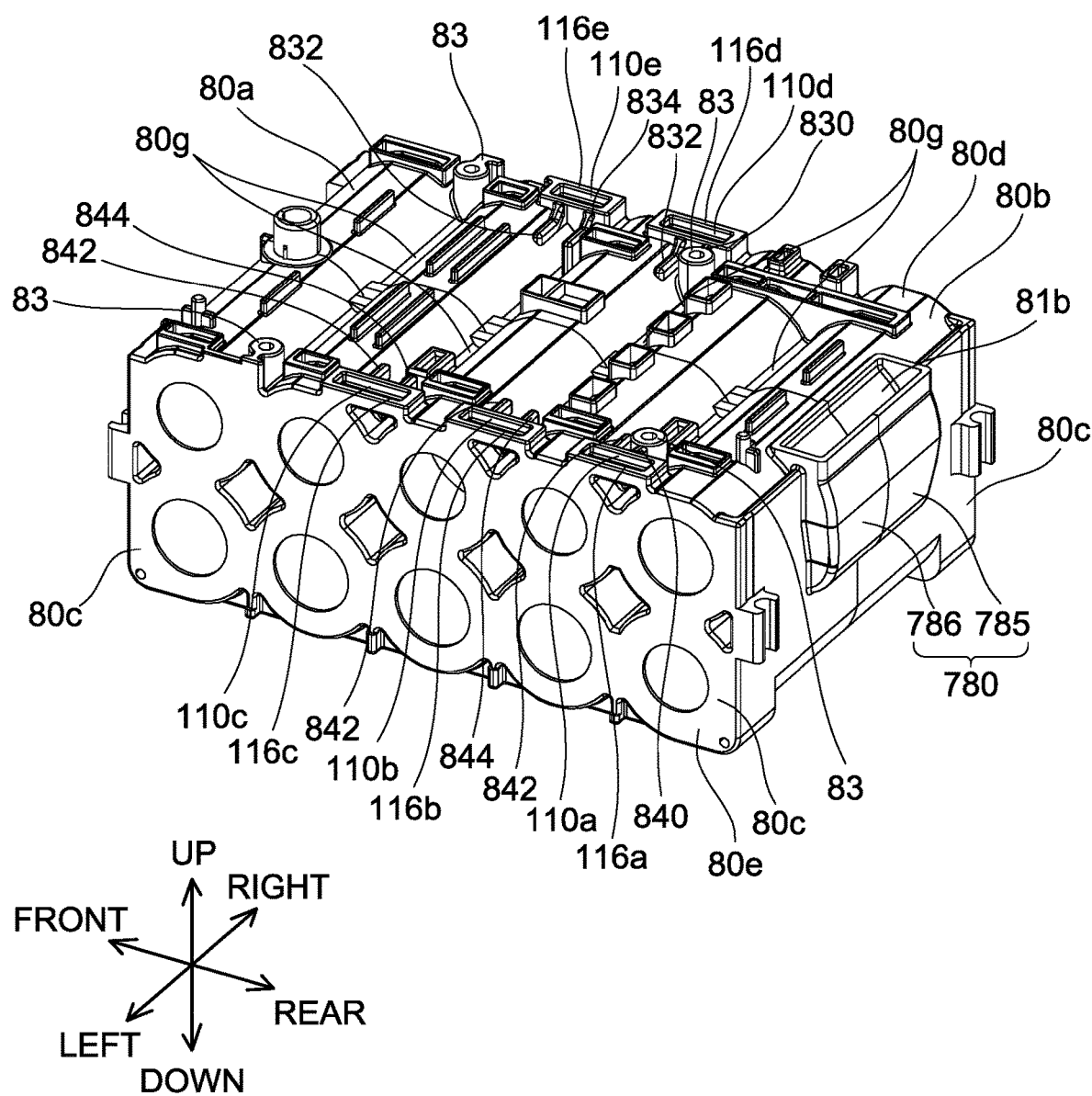
FIG. 29B is an oblique view, viewed from the rear, the left, and above, of the cell case 780 according to the fourth embodiment.

As shown in FIG. 29B, reinforcing ribs 830, 832 extend leftward from a left-side surface of the protruding part 116d, in which the first recessed part 110d is provided. In addition, reinforcing ribs 832, 834 extend leftward from a left-side surface of the protruding part 116e, in which the first recessed part 110e is provided. As shown in FIG. 29C, the reinforcing ribs 830, 834 are provided in two of the hollow parts 80g on the upper surface 80d of the cell case 780. Each of the reinforcing ribs 832 is provided on a surface, within the upper surface 80d of the cell case 80, having a shape that matches the side surface of the corresponding battery cell 90h-90i in the longitudinal direction. A left-end portion of the reinforcing rib 830 is connected to one of the screw bosses 83 that protrudes upward from the upper surface 80d of the cell case 80. On the other hand, left-end portions of the reinforcing ribs 832, 834 are not connected to the members (e.g., the screw bosses 83) that protrude upward from the upper surface 80d of the cell case 80. The length of the reinforcing ribs 830, 834, which are provided in the hollow parts 80g, in the up-down direction is larger than the length of the reinforcing ribs 832 in the up-down direction.

In one or more embodiments, as shown in FIG. 29A to FIG. 29C, the protruding parts 116a-116e are provided on the cell case 780. The first recessed parts 110a-110e are provided on or in the protruding parts 116a-116e, and the reinforcing ribs 830, 832, 834, 840, 842, 844 extend away from the protruding parts 116a-116e. In such an embodiment, the stiffness of the protruding parts 116a-116e can be increased by the reinforcing ribs 830, 832, 834, 840, 842, 844 that are integrally connected to the protruding parts 116a-116e. Accordingly, even if, for example, mispositioning between the upper-part case 14 and the lower-part case 15 were to have occurred due to an impact produced when the power tool 200 (refer to FIG. 24) was dropped while the battery pack 2 is mounted thereon, the likelihood of deformation of the protruding parts 116a-116e can be reduced, and the likelihood of mispositioning between the upper-part case 14 and the cell case 780 can be reduced. In particular, in the present embodiment, the length of the protruding parts 116a-116e in the left-right direction is smaller (shorter) than the length in the front-rear direction. Consequently, in the absence of the reinforcing ribs 830, 832, 834, 840, 842, 844, the protruding parts 116a-116e might be more prone to deform more in the situation in which a left-right-direction force acts on the protruding parts 116a-116e than in the situation in which a front-rear-direction force acts on the protruding parts 116a-116e. Accordingly, in the fourth embodiment, the reinforcing ribs 830, 832, 834 extend leftward from the left-side surfaces of the protruding parts 116d, 116e, and the reinforcing ribs 840, 842, 844 extend rightward from the right-side surfaces of the protruding parts 116a-116c. Accordingly, even if, for example, mispositioning between the upper-part case 14 and the lower-part case 15 were to have occurred due to an impact produced when the power tool 200 (refer to FIG. 24) was dropped while the battery pack 2 is mounted thereon and thereby a left-right-direction (lateral) force acts on the protruding parts 116a-116e, the likelihood of deformation of the protruding parts 116a-116e can be reduced.

Correspondence Relationship

The reinforcing ribs 830, 832, 834, 840, 842, 844 are examples of "reinforcing parts." The protruding parts 116a-116e are examples of "protruding parts."

Fifth Embodiment

The battery pack 2 according to a fifth embodiment will now be explained, with reference to FIG. 30. In the battery pack 2 according to the fifth embodiment, the structure of cell case 980 (right cell case 985 and left cell case 986) differs from the structure of the cell case 780 (the right cell case 785 and the left cell case 786) of the battery pack 2 in the fourth embodiment. Specifically, the arrangement of protruding parts 1016d, 1016e provided on the upper surface 80d of the cell case 980 differs from the arrangement of the protruding parts 116d, 116e provided on the upper surface 80d of the cell case 780 in the fourth embodiment. The protruding parts 1016d, 1016e are respectively provided between longitudinal-direction axes A1 of two adjacent ones of the battery cells 90a-90d. That is, in the present embodiment, all the protruding parts 116a-116c, 1016d, 1016e are respectively provided between longitudinal-direction axes A1 of two adjacent ones of the battery cells 90a-90d.

In one or more embodiments, as shown in FIG. 10 and FIG. 30, the battery pack 2 comprises the plurality of battery cells 90a-90j housed in the cell case 980 and lined up parallel to the bottom wall 15e of the lower-part case 15. Furthermore, the protruding parts 116a-116c, 1016d, 1016e are provided on the upper surface 80d of the cell case 80, and the first recessed parts 110a-110e are provided on or in the protruding parts 116a-116c, 1016d, 1016e. The upper surface 80d of the cell case 980 has a shape that conforms to the side surfaces of the upper level of the battery cells 90f-90j, and the hollow parts 80g are respectively provided on the upper surface 80d of the cell case 980 between two adjacent ones of the upper level of the battery cells 90f-90j. The protruding parts 116a-116c, 1016d, 1016e are provided such that they span the hollow parts 80g when the cell case 80 is viewed from above (in plan view) and are provided only between longitudinal-direction axes A1 of two adjacent battery cells 90f-90i. According to the above-mentioned configuration, the locations of the upper ends of the protruding parts 116a-116c, 1016d, 1016e can be made lower in an embodiment in which the lengths of the protruding parts 116a-116c, 1016d, 1016e in the up-down direction are the same than in an embodiment in which the protruding parts 116a-116c, 1016d, 1016e are provided upward of longitudinal-direction axes A1 of the upper level of the battery cells 90a-90e. Accordingly, the battery pack 2 can be designed in a compact manner.

In one or more embodiments, as shown in FIG. 30, the reinforcing ribs 830, 834, 840, 844 are integrally formed with and extend away from the protruding parts 116a-116c, 1016d, 1016e in the respective hollow parts 80g. Consequently, the locations of the upper ends of the reinforcing ribs 830, 834, 840, 844 can be made lower in an embodiment in which the lengths of the reinforcing ribs 830, 834, 840, 844 in the up-down direction are the same than in an embodiment in which the reinforcing ribs 830, 834, 840, 844 are provided upward of longitudinal-direction axes A1 of the battery cells 90f-90j. Accordingly, the battery pack 2 can be designed in a compact manner, and the likelihood of deformation of the protruding parts 116a-116c, 1016d, 1016e can be reduced.

Additional configurations of the battery pack disclosed by the present specification are described below.

(Configuration 1)

A battery pack mountable, by sliding, on a power tool, comprising:
　a first terminal;
　a second terminal;
　an outer case, which houses the first terminal and the second terminal;
　wherein:
　　a first terminal-opening part, which is provided at a location corresponding to the first terminal, and a second terminal-opening part, which is provided at a location corresponding to the second terminal, are provided in an upper surface of the outer case; and
　　a first battery-side channel (recessed part) is provided between the first terminal-opening part and the upper surface and a second battery-side channel (recessed part) is provided between the second terminal-opening part and the upper surface.

(Configuration 2)

The battery pack according to configuration 1, wherein the battery-side channels (recessed parts) have a shape that matches (corresponds to, is complementary to) tool-side ridge parts of the power tool.

(Configuration 3)

The battery pack according to configuration 1 or 2, wherein:
　the first terminal is a discharge terminal; and
　the second terminal is a signal terminal.

(Configuration 4)

A battery pack comprising:
　a first terminal;
　a second terminal;
　a third terminal;
　a fourth terminal; and
　an outer case, which houses the first terminal, the second terminal, the third terminal, and the fourth terminal;
　wherein:
　　the outer case comprises a pair of slide rails that receive a power tool by being slid;
　　a first terminal-opening part, which is provided at a location corresponding to the first terminal, a second terminal-opening part, which is provided at a location corresponding to the second terminal, a third terminal-opening part, which is provided at a location corresponding to the third terminal, and a fourth terminal-opening part, which is provided at a location corresponding to the fourth terminal, are provided in an upper surface of the outer case between the pair of slide rails;
　　the first terminal-opening part, the second terminal-opening part, the third terminal-opening part, and the fourth terminal-opening part are disposed, from one slide rail of the pair of slide rails toward the other slide rail, in the order of the first terminal-opening part, the second terminal-opening part, the third terminal-opening part, and the fourth terminal-opening part; and
　　a first battery-side channel (recessed part) is provided between the first terminal-opening part and the upper surface, a second battery-side channel (recessed part) is provided between the second terminal-opening part and the upper surface, a third battery-side channel (recessed part) is provided between the third terminal-opening part and the upper surface, and a fourth battery-side channel (recessed part) is provided between the fourth terminal-opening part and the upper surface.

(Configuration 5)

The battery pack according to configuration 4, wherein the battery-side channel (recessed parts) have a shape that matches (corresponds to, is complementary to) tool-side ridge parts of the power tool.

(Configuration 6)

The battery pack according to configuration 4 or 5, wherein:
　the first terminal and the fourth terminal are discharge terminals; and
　the second terminal and the third terminal are signal terminals.

(Configuration 7)

A battery pack, which is mountable, by the being slid from the front to the rear, on an external apparatus, comprising:
　an outer case;
　wherein:
　　the outer case comprises:
　　　a pair of slide rails that receive the external apparatus by being slid;
　　　a terminal-opening part, which is provided between the pair of slide rails;
　　　a surface that is between the pair of slide rails and rearward of the terminal-opening part;
　　　a vent; and
　　　a battery-side channel (recessed part), which is provided between the pair of slide rails and between the vent and the surface rearward of the terminal-opening part.

(Configuration 8)

The battery pack according to configuration 7, wherein the battery-side channel (recessed part) has a shape that matches a (corresponding, complementary, matching) apparatus-side ridge part of the external apparatus.

Concrete examples of the present invention are explained above in detail, but these are merely illustrative examples and do not limit the claims. The techniques described in the claims include variations and modifications of the concrete examples illustrated above.

(First Modified Example) "Engaging part" and "engaged part" are not limited to the first ridge parts 30 and the first recessed parts 110 and may be, for example, a hook shape or the like.

(Second Modified Example) The first recessed parts 110 may be provided on (in) the upper-part case 14, and the first ridge parts 30 may be provided on the cell case 80.

(Third Modified Example) The thickness (width, dimension) of the first ridge parts 30 in the left-right direction may be constant.

(Fourth Modified Example) Engagement clearances C1 between the first ridge parts 30 of the upper-part case 14 and the first recessed parts 110 of the battery module 10 may be the same size or length as engagement clearance C2 between the second ridge parts 34 and the second recessed parts 64 of the lower-part case 15 or may be smaller than engagement clearance C2.

(Fifth Modified Example) The first ridge parts 30 of the upper-part case 14 may be provided at locations spaced apart from the slide rails 20. For example, they may be provided in the vicinity of the vent 26.

(Sixth Modified Example) The first recessed parts 110a-110e do not have to be provided between two adjacent lead plates 92. For example, the first recessed part 110a may be provided inward of the lead plates 92a-92e and inward of the lead plates 92f-92h in the left-right direction.

(Seventh Modified Example) In the second embodiment, the upper-part case 414 may be configured without the first ridge parts 30, and the cell case 480 may be configured without the first recessed parts 110.

Figure 31:
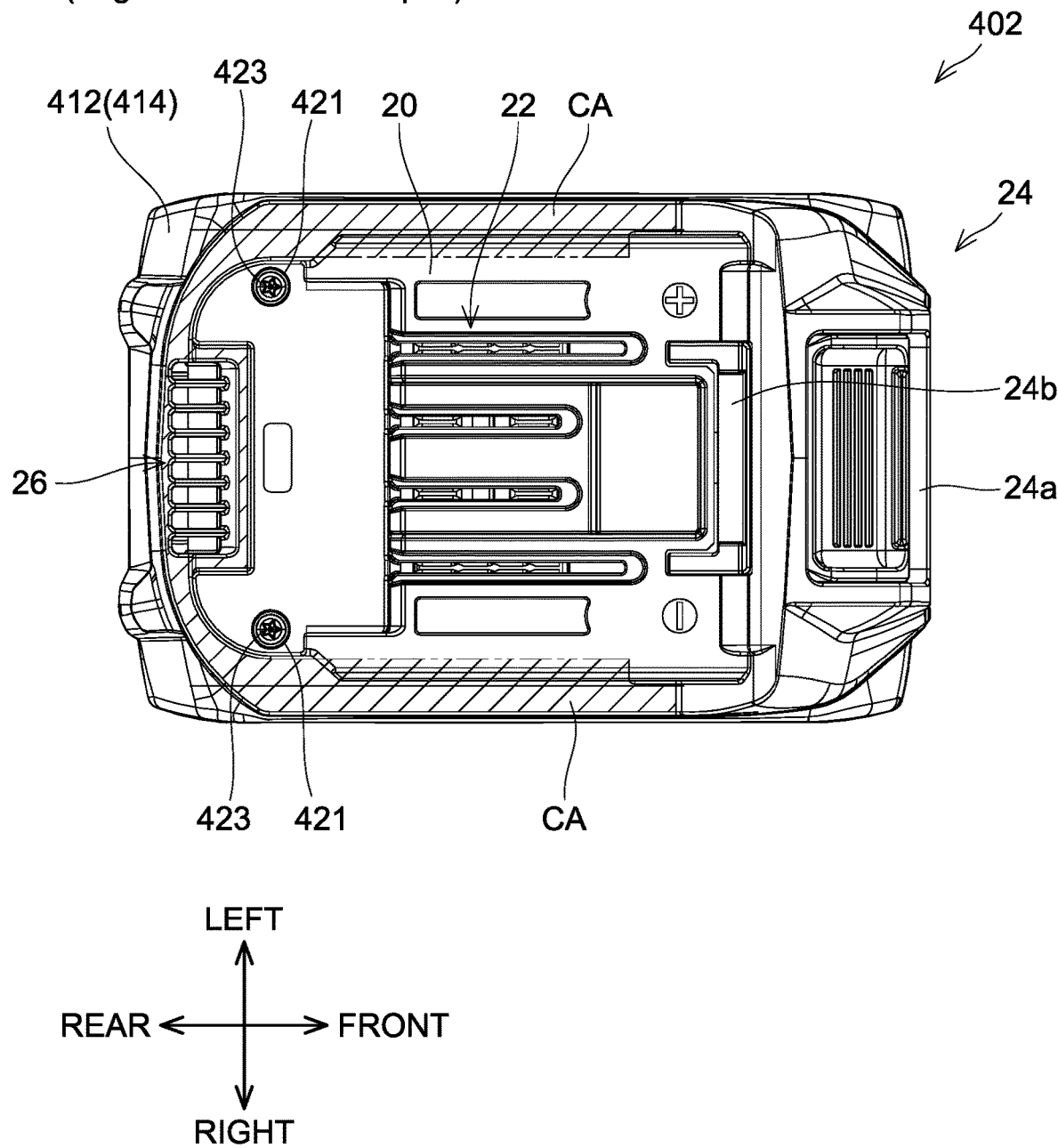
FIG. 31 is a top view of a battery pack 402 according to a modification of the second embodiment of the present teachings.

(Eighth Modified Example) In a modification of the second embodiment, the screw holes 421 provided inward of (between) contact areas CA are located on the rearward side of the slide rails 20 as shown in FIG. 31.

(Ninth Modified Example) The reinforcing ribs may extend from the protruding parts 116a-116e in the front-rear direction, which is a direction orthogonal to the left-right direction, or may extend in a direction that is tilted (oblique) relative to the left-right direction.

(Tenth Modified Example) The reinforcing ribs may be provided only on the surface, within the upper surface 80d of the cell case 80, having a shape that matches the upper surfaces of the upper level of the battery cells 90f-90j.

The technical elements explained in the present specification and the drawings exhibit technical utility on their own or in various combinations and are not limited to the combinations recited in the claims at the time of application. In addition, the techniques illustrated in the present specification and the drawings can simultaneously achieve multiple objects and, by achieving one among those objects, have technical utility on their own.

This application hereby incorporates by reference the entire disclosure of application Ser. No. 17/036,411, and the entire disclosure of application Ser. No. 17/036,435.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery packs for cordless tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

2 Battery pack
10 Battery module
12 Outer case
14 Upper-part case
14a Front surface
14b1 Forward-upper surface
14b2 Rearward-upper surface
15 Lower-part case
15a Front surface
15b Right-side surface
15c Rear surface
15d Left-side surface
15e Bottom surface
15f Corner part
16a Flat part
16b Projection
16c Depression
16d Step part
17a First upward-extending surface
17b Tilted surface
17c Second upward-extending surface
18 Screw
19 Hook part
20 Slide rail
20a Base part
20b Upward-extending part
20c First rightward-extending part
20d Second rightward-extending part
20e Slots
22 Terminal-receiving part
22a-22d Terminal-opening parts
23a-23d Battery-side channels
24 Hook
24a Manipulatable part
24b Projection
26 Vent
27 Battery-side channel
28 Screw hole
30a-30e First ridge parts
32a Thick-wall part
32b Thin-wall part
34a-34f Second ridge parts
40 Vent
40a-40j Holes
41 Vent
41a-41j Holes
42 Display part
42a Remaining-battery-charge display part
42b Button 43c Lower end
43h Lower end
46 Screw hole
48 Front-part rib
50 Front-part rib
50a Groove part
52 Front-part rib
54 Front-part rib
56 Front-part rib
56a Light-shielding wall part
56b Flat part
58a-58d Vents
60a-60h Side-part ribs
62 Screw hole
64a-64f Second recessed parts
80 Cell case
80a Front part
80b Rear part
80c Thick-wall part
80d Upper surface
80e Right-side surface
80f Left-side surface
80g Hollow part
81a Vent
81b Vent
82 Control board
83 Screw boss
84 LED board
84a LED
84b Switch
84c Lower surface
85 Right cell case
86 Left cell case
87a-87j Cell-holding parts
88 Coupling part
89a Center holding part
89b End-surface-side holding part
90a-90j Battery cells
91 Metal part
91a Lower end
92a-92k Lead plates
93a-93c Side surfaces
94a Upper end
94b Lower end
95 Waterproof ring
100 Fastener
102 Terminal
104a Battery-side, negative-electrode terminal
104b Battery-side, positive-electrode terminal
106a-106d Battery-side signal terminals
110a-110e First recessed parts
112 Screw holder
114 Screw
116a-116e Protruding parts
120 Signal line
200 Power tool
202 Terminal-holding part
206a-206d Tool-side ridge parts
208a Tool-side, negative-electrode terminal
208b Tool-side, positive-electrode terminal
210a, 210c Tool-side signal terminals
300 Charger
302 Slide rail
304 Housing
306 Charger-side ridge part
308 Vent
402 Battery pack
412 Outer case
414 Upper-part case
415 Lower-part case
421 Screw hole
423 Screw
480 Cell case
481 Screw hole
485 Right cell case
486 Left cell case
602 Battery pack
612 Outer case
615 Lower-part case
615e Bottom surface
619 Hook part
780 Cell case
785 Right cell case
786 Left cell case
830, 832, 834, 840, 842, 844 Reinforcing ribs
980 Cell case
985 Right cell case
986 Left cell case
1016d, 1016e Protruding parts

The invention claimed is:

1. A battery pack comprising:
an outer case comprising a lower case fixed to an upper case;
a battery cell case housed within the outer case, the battery cell case having an upper surface that includes at least one protrusion;
a plurality of battery cells housed in the battery cell case and lined up in a first direction that is parallel to a bottom surface of the lower case;
a control board disposed between the upper case and the plurality of battery cells;
one or more terminals disposed on the control board and respectively extending in a second direction perpendicular to the first direction into one or more terminal openings in the upper case;
at least one first ridge provided on the upper case and projecting towards the battery cell case; and
at least one first recess provided in the at least one protrusion and having a wall or walls extending in the second direction, the wall or walls entirely surrounding the at least one first ridge in a plane defined by the first direction and a third direction, the third direction being perpendicular to both the first direction and the second direction,
wherein:
the at least one protrusion protrudes in the second direction towards the upper case,
the battery cell case includes at least one screw boss having a screw hole,
at least one fastener having a head extends through the control board and into the at least one screw hole such that the head of the at least one fastener contacts the control board,
the at least one first recess is spaced from each of the at least one screw boss, and
the at least one first recess is located between a first battery cell and a second battery cell of the plurality of battery cells.

2. The battery pack according to claim 1, wherein:
the at least one first recess has a shape that matches a shape of the at least one first ridge.

3. The battery pack according to claim 1 further comprising:

at least one reinforcing part extending from the at least one protrusion.

4. The battery pack according to claim 1, wherein:
the at least one first ridge includes a first wall part that is thicker than a second wall part; and
the first wall part has a first length in a direction orthogonal to a protrusion direction of the at least one first ridge that is larger than a second length of the second wall part in said direction orthogonal to the protrusion direction.

5. The battery pack according to claim 1, wherein:
the upper case comprises at least one slide rail configured to slidably receive and hold an external apparatus; and
the at least one first ridge is disposed downward of the at least one slide rail.

6. The battery pack according to claim 1, further comprising:
a pair of slide rails configured to slidably receive and hold an external apparatus, the slide rails being disposed on the upper case; and
at least one screw fixing the upper case and the battery cell case to one another, the at least one screw being disposed between or rearward of the slide rails.

7. The battery pack according to claim 1, wherein the at least one first recess is a blind hole.

8. The battery pack according to claim 1, wherein the upper case directly contacts the lower case.

9. The battery pack according to claim 8, wherein a bottom surface of the battery cell case is located above the lower wall of the outer case in the second direction.

10. The battery pack according to claim 1, wherein:
the at least one protrusion comprises a first plurality of protrusions lined up in the first direction and a second plurality of protrusions lined up in the first direction, and
the first plurality of protrusions is spaced apart from the second plurality of protrusions in the third direction.

11. A battery pack comprising:
an outer case comprising a lower case fixed to an upper case;
a battery cell case housed within the outer case and holding a plurality of battery cells;
a control board disposed between the upper case and the plurality of battery cells;
one or more terminals disposed on the control board and respectively extending into one or more terminal openings in the upper case;
at least one first ridge provided on the upper case; and
at least one first recess provided on or in the battery cell case and having a shape that matches the at least one first ridge, the at least one first ridge extending into the at least one first recess,
at least one protruding part provided on an upper surface of the battery cell case;
at least one reinforcing part extending from the at least one protruding part; and
a plurality of battery cells housed in the battery cell case and lined up parallel to a bottom surface of the lower case;
wherein:
the at least one first recess is provided in the at least one protruding part;
the upper surface of the battery cell case has a shape that conforms to side surfaces of at least some of the battery cells;
at least one hollow part is provided on the upper surface of the battery cell case between two adjacent ones of the battery cells;
the at least one protruding part spans the at least one hollow part in a plan view of the battery cell case and is provided only between longitudinal-direction axes of the two adjacent ones of the battery cells; and
the at least one reinforcing part that extends from the at least one protruding part is disposed in the at least one hollow part.

12. The battery pack according to claim 11, wherein:
the at least one first ridge includes a first wall part that is thicker than a second wall part; and
the first wall part has a first length in a direction orthogonal to a protruding direction of the at least one first ridge that is larger than a second length of the second wall part in said direction orthogonal to the protruding direction.

13. The battery pack according to claim 12, further comprising:
at least one second ridge provided on one of the upper case and the lower case; and
at least one second recess provided on the other of the upper case and the lower case, the at least one second recess having a shape that matches the at least one second ridge;
wherein in the state in which the upper case and the lower case are fixed to one another, a first clearance between the at least one first ridge and the at least one first recess is larger than a second clearance between the at least one second ridge and the at least one second recess.

14. The battery pack according to claim 13, wherein:
the upper case comprises at least one slide rail configured to slidably receive and hold an external apparatus; and
the at least one first ridge is disposed proximal to the at least one slide rail.

15. The battery pack according to claim 14, wherein the at least one first ridge is disposed downward of the at least one slide rail.

16. The battery pack according to claim 11, wherein the at least one first recess is a blind hole provided in the at least one protruding part.

17. A battery pack comprising:
an outer case comprising a lower case fixed to an upper case;
a battery cell case housed within the outer case and holding a plurality of battery cells and including a first protrusion and a second protrusion that protrude from an upper surface of the battery cell case;
a control board disposed between the upper case and the plurality of battery cells;
one or more terminals disposed on the control board and respectively extending into one or more terminal openings in the upper case;
a recess provided on or in the first protrusion and the second protrusion; and
a plurality of lead plates electrically connecting the battery cells and disposed spaced apart from one another in a direction orthogonal to a longitudinal direction of the battery cells, a first one of the plurality of lead plates including a tab extending between the first protrusion and the second protrusion;
wherein the tab and the first and second protrusions are configured such that a plane orthogonal to the longitudinal direction of the battery cells intersects the first protrusion, the second protrusion and the tab.

18. The battery pack according to claim 17, further comprising:
a plurality of battery cells housed in the battery cell case and lined up parallel to a bottom surface of the lower case;
wherein:
an upper surface of the battery cell case has a shape that conforms to side surfaces of at least some of the battery cells;
at least one hollow part is provided on the upper surface of the battery cell case between two adjacent ones of the battery cells; and
the at least one protrusion spans the at least one hollow part in a plan view of the battery cell case and is provided only between longitudinal-direction axes of the two adjacent ones of the battery cells.

19. The battery pack according to claim 17, wherein:
the recess is elongated and has a length perpendicular to the longitudinal direction of the plurality of battery cells and a width less than the length of the at least one first recess, and
the first protrusion is separated from the control board by a gap.

20. A battery pack, comprising:
an outer case comprising a lower case fixed to an upper case;
a battery cell case housed within the outer case;
at least one first ridge provided on one of the upper case and the battery cell case;
at least one first recess provided on or in the other of the upper case and the battery cell case and having a shape that matches the at least one first ridge, the at least one first ridge engaging with the at least one first recess;
at least one second ridge provided on one of the upper case and the lower case; and
at least one second recess provided on the other of the upper case and the lower case, the at least one second recess having a shape that matches the at least one second ridge and the at least one second ridge engaging with the at least one second recess;
wherein in the state in which the upper case and the lower case are fixed to one another, a first clearance between the at least one first ridge and the at least one first recess is larger than a second clearance between the at least one second ridge and the at least one second recess.

21. A battery pack comprising:
an outer case comprising a lower case fixed to an upper case;
a battery cell case housed within the outer case, the battery cell case having an upper surface that includes at least one protrusion;
a plurality of battery cells housed in the battery cell case and lined up in a first direction that is parallel to a bottom surface of the lower case;
a control board disposed between the upper case and the plurality of battery cells;
one or more terminals disposed on the control board and respectively extending in a second direction perpendicular to the first direction into one or more terminal openings in the upper case;
at least one first ridge provided on the upper case and projecting towards the battery cell case; and
at least one first recess provided in the at least one protrusion and having a wall or walls extending in the second direction, the wall or walls entirely surrounding the at least one first ridge in a plane defined by the first direction and a third direction, the third direction being perpendicular to both the first direction and the second direction,
wherein:
the at least one protrusion protrudes in the second direction towards the upper case,
the at least one first ridge is elongated and has a length perpendicular to a longitudinal axis of the plurality of battery cells and a width less than the length of the at least one first ridge,
the at least one first recess is elongated and has a length perpendicular to the longitudinal direction of the plurality of battery cells and a width less than the length of the at least one first recess,
the at least one first recess has a shape that matches a shape of the at least one first ridge and a cross sectional shape complementary to a cross sectional shape of the at least one first ridge, and
the at least one first ridge extends past an outer peripheral edge of the control board.

22. The battery pack according to claim 21, wherein:
the battery cell case includes at least one screw boss having a screw hole,
at least one fastener having a head extends through the control board and into the at least one screw hole such that the head of the at least one fastener contacts the control board,
the at least one first recess is spaced from each of the at least one screw boss, and
the at least one first recess is located between a first battery cell and a second battery cell of the plurality of battery cells.

23. The battery pack according to claim 21, further comprising:
at least one reinforcing part extending from the at least one protrusion.

24. The battery pack according to claim 21, wherein:
the at least one first ridge includes a first wall part that is thicker than a second wall part; and
the first wall part has a first length in a direction orthogonal to a protrusion direction of the at least one first ridge that is larger than a second length of the second wall part in said direction orthogonal to the protrusion direction.

25. The battery pack according to claim 21, wherein:
the upper case comprises at least one slide rail configured to slidably receive and hold an external apparatus; and
the at least one first ridge is disposed downward of the at least one slide rail.

26. The battery pack according to claim 21, further comprising:
a pair of slide rails configured to slidably receive and hold an external apparatus, the slide rails being disposed on the upper case; and
at least one screw fixing the upper case and the battery cell case to one another, the at least one screw being disposed between or rearward of the slide rails.

27. The battery pack according to claim 21, wherein a bottom surface of the battery cell case is located above the lower wall of the outer case in the second direction.

* * * * *